United States Patent
Chatterton

(10) Patent No.: US 7,116,894 B1
(45) Date of Patent: Oct. 3, 2006

(54) SYSTEM AND METHOD FOR DIGITAL MULTIMEDIA STREAM CONVERSION

(75) Inventor: Geoff Chatterton, Santa Clara, CA (US)

(73) Assignee: Digeo, Inc., Kirkland, WA (US)

( * ) Notice: Subject to any disclaimer, the term of this patent is extended or adjusted under 35 U.S.C. 154(b) by 889 days.

(21) Appl. No.: 10/155,955

(22) Filed: May 24, 2002

(51) Int. Cl.
 H04N 5/91 (2006.01)
 H04N 5/85 (2006.01)
 H04N 11/04 (2006.01)
 H04N 9/475 (2006.01)

(52) U.S. Cl. ............... 386/95; 386/125; 386/126; 348/512; 348/513; 348/514; 348/515

(58) Field of Classification Search ......... 704/500; 714/18; 348/426.1, 423.1, 512, 513, 514, 348/515; 386/95, 125, 126
See application file for complete search history.

(56) References Cited

U.S. PATENT DOCUMENTS

| | | | |
|---|---|---|---|
| 5,745,643 A | | 4/1998 | Mishina |
| 5,805,821 A | * | 9/1998 | Saxena et al. ............... 709/231 |
| 5,995,161 A | | 11/1999 | Gadre et al. |
| 6,169,843 B1 | * | 1/2001 | Lenihan et al. ............... 386/46 |
| 6,233,253 B1 | * | 5/2001 | Settle et al. ................ 370/474 |
| 6,233,393 B1 | | 5/2001 | Yanagihara et al. |
| 6,249,640 B1 | | 6/2001 | Takiguchi et al. |
| 6,272,625 B1 | | 8/2001 | deCarmo |
| 6,285,408 B1 | | 9/2001 | Choi et al. |
| 6,456,783 B1 | * | 9/2002 | Ando et al. .................. 386/125 |
| 6,801,544 B1 | * | 10/2004 | Rijckaert et al. ........... 370/535 |
| 6,973,258 B1 | * | 12/2005 | Yoo et al. .................... 386/111 |
| 2002/0018643 A1 | * | 2/2002 | Okada et al. ................ 386/95 |
| 2003/0021298 A1 | * | 1/2003 | Murakami et al. .......... 370/535 |
| 2003/0043924 A1 | * | 3/2003 | Haddad et al. .......... 375/240.28 |

OTHER PUBLICATIONS

Information Technology—Generic Coding of Moving Pictures and Associated Audio, Recommendation H.222.0, ISO/IEC 13818-1, 124 pages, June.
http://www.iec.org/online/tutorials/test_dv/topic01.html, International Engineering Consortium, "Testing Digital Video", 8 pages.
http://members.aol.com/mpucoder/DVD/pes-hdr.html, "Packetized Elementary Stream Headers".
Tektronix, A Guide to MPEG Fundamentals and Protocol Analysis (Including DVB and ATSC). Oct. 1997, 48 pages.

* cited by examiner

*Primary Examiner*—Richemond Dorvil
*Assistant Examiner*—Myriam Pierre
(74) *Attorney, Agent, or Firm*—Kory D. Christensen; Stoel Rives, LLP

(57) ABSTRACT

A method for converting a program stream to a transport stream is described comprising: reading program stream packets from a digital versatile disk ("DVD") based on user selections and navigation metadata contained on the DVD; extracting audio and video content packetized within the program stream packets; reading system clock reference ("SCR") timestamps from the program stream packets, the SCR timestamps indicating relative times at which the audio and video should be rendered; determining a point within consecutively read program stream packets at which the SCR timestamps are non-consecutive; converting the SCR timestamps to program clock reference ("PCR") timestamps interpretable by a transport stream decoder; and generating a transport stream of transport stream packets containing the audio and video content and using the PCR timestamps to provide for decode timing at the transport stream decoder; and generating a resynchronization signal causing the transport stream decoder to resynchronize with the transport stream when it receives corresponding non-consecutive PCR timestamps associated with the non-consecutive SCR timestamps.

16 Claims, 48 Drawing Sheets

SYSTEM AND METHOD FOR DIGITAL MULTIMEDIA STREAM CONVERSION

BACKGROUND

1. Field of the Invention

This invention relates generally to the field of multimedia playback systems. More particularly, the invention relates to a system and method for converting digital multimedia streams from a first format playable on a first type of system to a second format playable on a second type of system.

2. Description of the Related Art

The MPEG-2 standard is one of the most popular audio/video compression standards and is used in a wide range of multimedia applications. For example, MPEG-2 is used as the underlying compression algorithm for both digital cable and satellite broadcast channels and for Digital Versatile Disks ("DVDs") (also referred to as "Digital Video Disks"). In addition, MPEG-2 is used as the compression algorithm for a vast number of computer-based multimedia applications.

Although the underlying MPEG-2 compression algorithm is similar for each application, the manner in which the compressed audio/video content is packetized, transmitted, stored and otherwise processed varies considerably from one application to the next. For example, cable and satellite companies transmit the MPEG-encoded channels within a multiplexed "transport streams" comprising transport packets of a fixed 188 bytes in length. Transport streams follow the T-STD (transport system target decoder) model defined in ISO/IEC 13818-1.

By contrast, MPEG content is stored on DVDs in a unique "program stream" format, using packets of 2048 bytes in length. Normal program streams follow P-STD (program stream target decoder) model defined in ISO/IEC 13818-1. The DVD specification defines a new target decoder model, E-STD (extended system target decoder), which is an extension of the P-STD model and which is outside of the MPEG-2 specification. More specifically, the DVD specification defines additional media types and data structures that are stored and transmitted within MPEG data packets but are not part of the MPEG specification including, for example, sub-picture data defining graphics to be displayed on the television/computer screen (e.g., interactive navigation menus, subtitles, overlays, . . . etc), AC-3 audio, Presentation Control Information ("PCI") used to navigate a play path through DVD multimedia files, and Data Search Information ("DSI") used to provide different types of playback timing information. In addition, DVD defines a large amount of sideband metadata that is not contained within the MPEG stream itself but which is used to locate content within the DVD given a set of user selections and/or predefined navigation parameters.

As such, DVD players must be equipped with the hardware and/or software capable of decoding these additional media types and metadata in order to create a compliant DVD viewing experience. By contrast, the hardware and/or software used in typical cable and satellite set-top boxes ("STBs") are only capable of decoding standard MPEG-2 transport streams.

Given the increasing popularity of DVDs and the fact that most users already subscribe to cable and/or satellite services, it would be practical to develop a multimedia system which would allow DVDs and (potentially) other media types to be properly decoded and rendered using a standard transport stream decoder.

BRIEF DESCRIPTION OF THE DRAWINGS

A better understanding of the present invention can be obtained from the following detailed description in conjunction with the following drawings, in which:

FIGS. 9e–m illustrate histograms of normalized bitrate data for various DVDs.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Introduction

An advanced digital recorder system (hereinafter "Media Server") is described in the co-pending application entitled MULTIMEDIA AND COMPUTING SYSTEM, Ser. No. 09/653,964, Filed Sep. 1, 2000, which is assigned to the assignee of the present application and which is incorporated herein by reference. Certain aspects of this advanced digital recorder system will now be described followed by a detailed description of embodiments of a system and method for digital multimedia stream conversion. It should be noted, however, that the underlying principles of the invention may be implemented on virtually any type of digital multimedia receiver system. For example, the embodiments of the invention described below may be employed on both advanced multimedia recorder systems such as a "Media Server" and standard cable and satellite set-top boxes (e.g., such as those described above in the background section).

Embodiments of a Media Server

Figure 1:
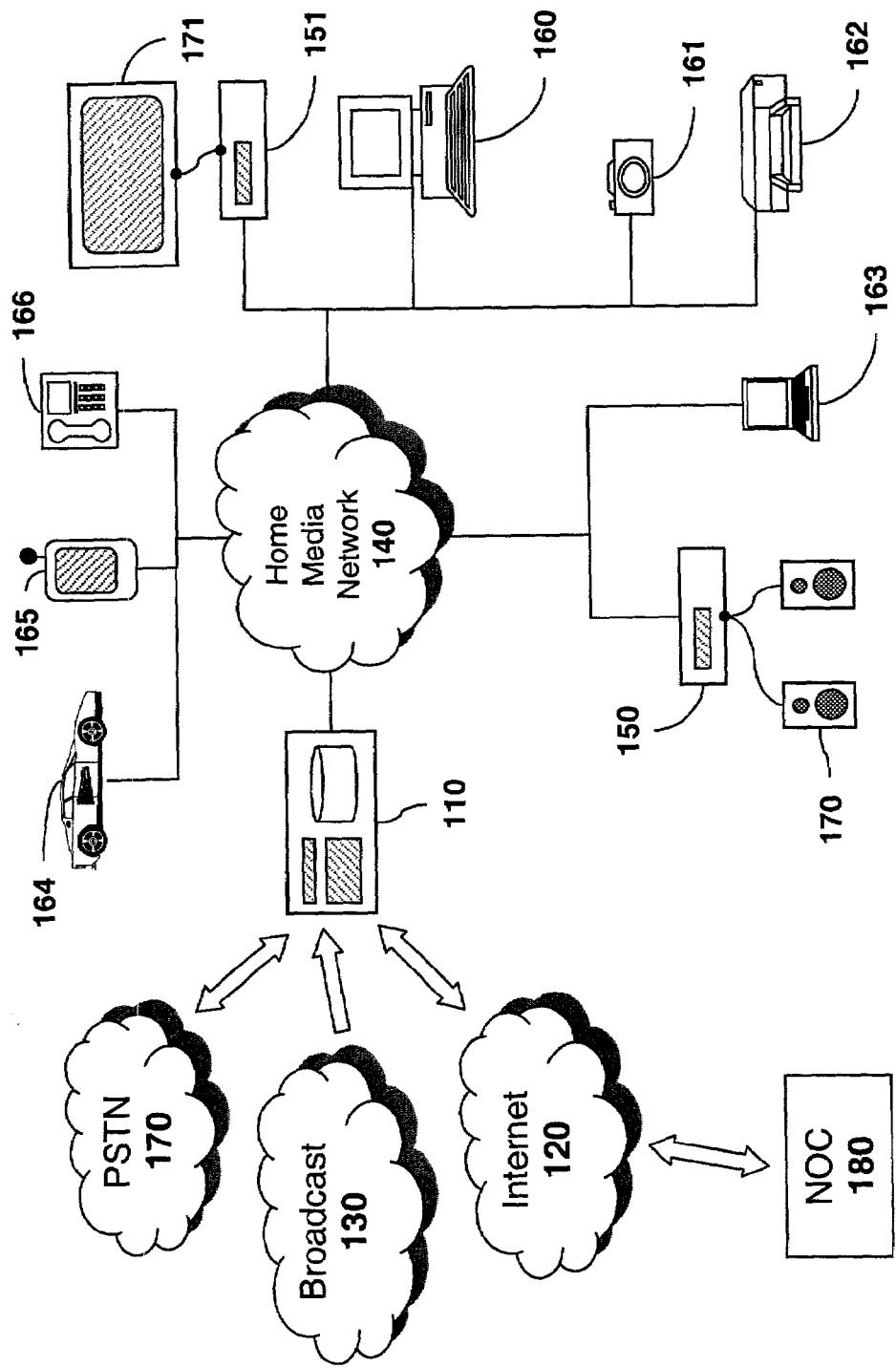
FIG. 1 illustrates a network architecture for implementing embodiments of the invention.

As illustrated in FIG. 1, in one embodiment of the invention, a digital media server 110 equipped with a processor and a mass storage device acts as a central repository for decoding, storing and distributing multimedia content and data. More particularly, the digital media server 100 coordinates multimedia content from Internet communication channels 120 (e.g., DSL, cable Internet), broadcast communication channels 130 (e.g., digital/analog cable, satellite), and/or Public Switched Telephone Network ("PSTN") communication channels 170 (i.e., standard telephone) to provide a stable, real-time home media network 140 for a plurality of network devices 150–151, 160–166.

Figure 2A:
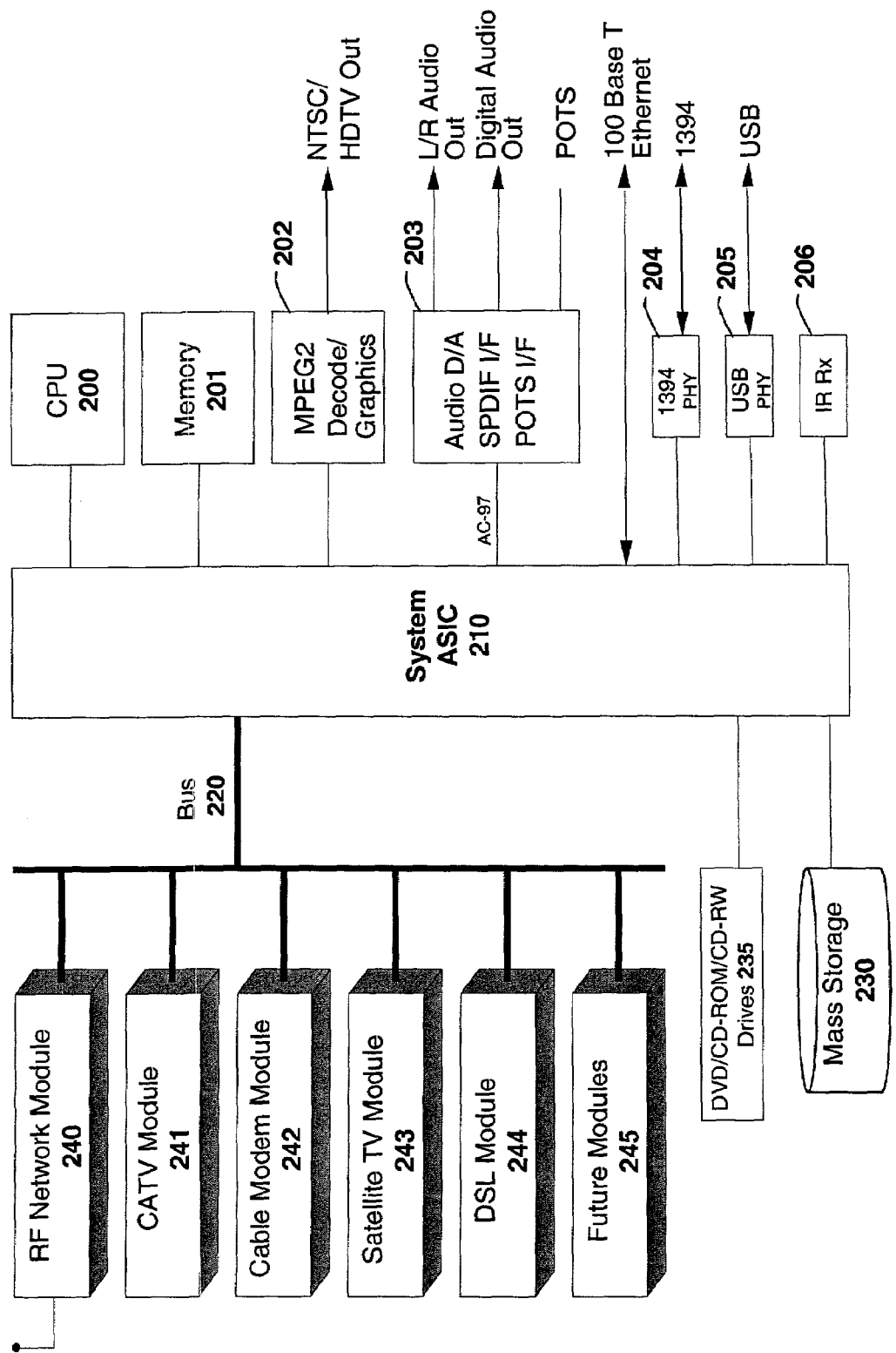
FIG. 2a illustrates one embodiment of a home media server hardware architecture.

As illustrated in FIG. 2a, one embodiment of a home media server 110 computing architecture includes a central processing unit 200 capable of processing data and multimedia content stored in main memory 201 and a mass storage device 230 for storing data and multimedia content. In one embodiment, the central processing unit 200 is a Pentium®-class processor such as a Pentium III® operating at a 1 GHz or faster clock frequency. It should be noted, however, that the underlying principles of the invention are not limited to any particular processor speed or processor type. The main memory 201 may be a random access memory or any other dynamic storage medium (e.g., SDRAM, DDRAM, RD-RAM, . . . etc). The mass storage device 230 of one embodiment is capable of storing hundreds, or even thousands of hours of multimedia content (e.g., movies, digital audio, . . . etc) as well as other types of digital data (e.g., computer programs, word processing documents, . . . etc). Devices transmit and receive data to/from the mass storage device 230 over a high speed interface such as an enhanced IDE interface with Ultra DMA capabilities or a Small Computer System Interface ("SCSI"). However, various other interfaces may be employed while still complying with the underlying principles of the invention.

An application-specific integrated circuit ("ASIC") 210 coordinates communication between the various system components and offloads certain designated processing tasks from the CPU. The ASIC may be custom built based on the requirements of the home media server 110 or may be built using gate arrays, standard cells or programmable logic devices.

Communication modules 240–245 electrically coupled to the home media server 110 via a system bus 220, allow the home media server 110 to communicate over different local and remote communication channels. In one embodiment, the system bus 220 is a peripheral component interconnect ("PCI") bus, although various other bus types may be configured within the home media server 110 (e.g., ISA, EISA, Micro Channel, VL-bus . . . etc).

In the particular embodiment illustrated in FIG. 2a, the communication modules 240–245 electrically coupled to the system bus 220 include an RF network module 240 for communicating over the home media network 140 (i.e., via a wireless RF channel), a cable TV module 241 for receiving broadcast cable channels, a cable modem module 242 for providing Internet access via a cable system (i.e., using the TCP/IP protocol), a satellite TV module 243 for receiving satellite broadcasts, and a DSL module 244 for DSL Internet access. Moreover, a virtually unlimited number of new modules may be added as necessary to support new or existing communication channels/protocols (as indicated by module 245).

Other components within the home media server 110 architecture include an MPEG-2 decode module 202 (and/or other decode modules such as AC3, MPEG-1, . . . etc); an audio module 203 comprised of a digital-to-analog converter, a Sony-Philips Digital Interconnect Format ("SPDIF") interface and a standard telephony interface for providing digital and analog audio and standard telephone service to external audio/telephony devices; an Ethernet port provided directly the system ASIC 210 (as indicated by the "100 Base-T Ethernet" designation); a Firewire (IEEE 1394) port 204; a Universal Serial Bus ("USB") port 205; and an infrared port 206. Various other communication interfaces may be configured in the system, either directly on the primary home media server architecture 110 (e.g., on the media server 110 "motherboard"), or as an add-on module 240–245. Moreover, the communication modules (e.g., 202–206), the CPU 200 and/or the memory 201 may be incorporated within the system ASIC 210, rather than as separate modules as illustrated in FIG. 2a.

Embodiments of the home media server 110 may also be equipped with a DVD drive, CD player, CD Read-Write drive, recordable DVD drive (as described in greater detail below), and/or any other type of portable storage medium 235. In one embodiment, these devices may communicate with the home media server 110 via an AT Attachment Packet Interface ("ATAPI"), although the type of interface used is not pertinent to the underlying principles of the invention.

Figure 2B:
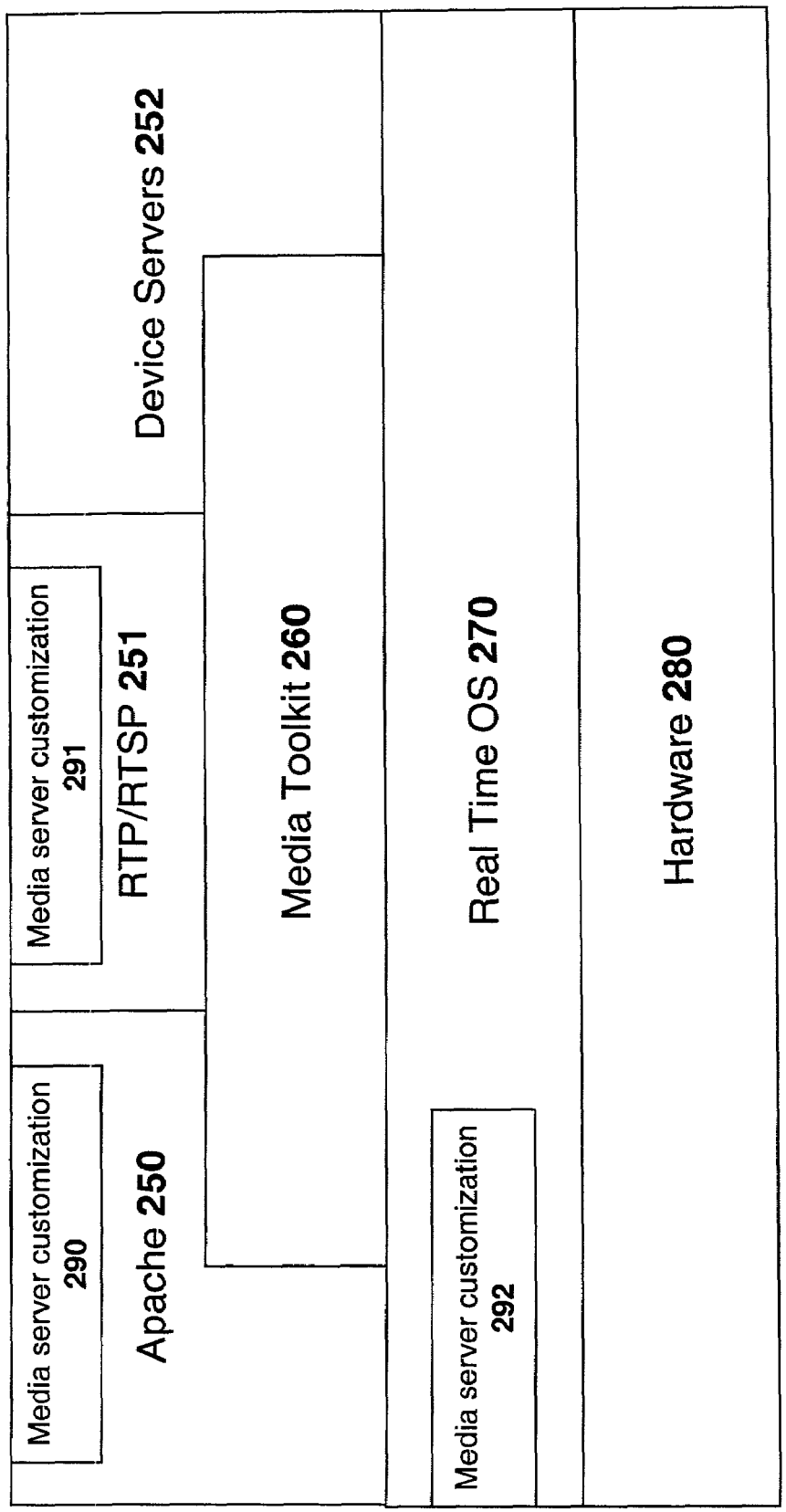
FIG. 2b illustrates one embodiment of a home media server software architecture.

FIG. 2b illustrates a software architecture employed in one embodiment of the home media server 110. Different hardware architectures 280 may be used to support the software, including the hardware architecture illustrated in FIG. 2a. A multitasking, multithreaded operating system ("OS") 270 (e.g., Linux, UNIX, Windows NT®) with real time streaming support is executed on the hardware 280. In one embodiment, certain proprietary customizations 292 are programmed in the media server OS 270 including, for example, real time services for streaming audio and video (real time OSs typically do not include these features).

A media toolkit 260 executed within the home media server 110 provides an application programming interface ("API") for the different media server 110 applications described herein as well as a set of media server 110 utilities. In one embodiment, a minimum quality of service ("QoS") is defined within the media toolkit 260. The media toolkit 110 may be comprised of several functional layers including a media stream abstraction layer; a media stream resource management layer; a security/conditional access layer; and a transport/storage abstraction layer.

In one embodiment, the home media server 110 is configured with support for the realtime transport protocol ("RTP") and the realtime streaming protocol ("RTSP") (see, e.g., RTP/RTSP module 251). Briefly, RTP is an IP protocol which supports real time transmission of voice and video. An RTP packet typically resides on top of a user datagram protocol ("UDP") and includes timestamping and synchronization information in its header for proper reassembly at the receiving end. RTSP is a well known protocol for streaming multimedia content over a network. It should be noted, however, that various other streaming protocols may be implemented while still complying with the underlying principles of the invention (e.g., Quicktime®, Windows Media, . . . etc).

RTP and RTSP were designed primarily for PC to PC communication over non-realtime networks. Accordingly, because one embodiment of the home media server 110 operates over a realtime home media network 140 and communicates to devices other than PCs (e.g., media nodes 150, 151), certain optimizations 290 may be programmed within the RTP/RTSP component 251. These include, for example, support for multiple data streams between the home media server 110 and the various multimedia devices 150, 151; 160–166 (e.g., one or more video streams and several audio streams)

Apache HTTP server support 250 is also included in one embodiment of the home media server 110. Apache is an open-source HTTP server software product which may be executed on various modern desktop and server operating systems. Once again, certain media server customizations 290 may be included within the Apache component 250, further refining HTTP support for the home media network 140 environment.

In one embodiment, a plurality of device servers 252 are executed on the home media server 110. These devices servers provide application support for each of the media nodes 150–151 and other devices 160–166 communicating with the home media server 110 over the home media network 140. For example, in response to a "tune" command sent from a media node 150, a tuning device server will cause the home media server to tune to a broadcast channel specified by the tune command. The tuning server may also include conditional access functionality (i.e., only allowing tuning to occur for channels to which the user has access rights).

Although described above as a "software" architecture, it should be noted that various elements illustrated in FIG. 2b may also be implemented in firmware and/or hardware while still complying the underlying principles of the invention.

Referring again to FIG. 1, numerous digital and analog devices may be configured to communicate with the home media server 110 over the home media network 140. By way of example, and not limitation, these include personal computers 160, cameras or digital camcorders 161, printers 162, notebook computers 163, automotive audio/video systems 164, cell phones or personal digital assistants 165, standard telephones 165 (including fax machines), home security systems (not shown); and/or home climate control systems (not shown).

In one embodiment, complex multimedia and data processing such as tuning to selected channels, recording of specified programs/music, storing phone numbers and personal data, connecting to remote network sites, etc., is performed at the media server 110, rather than at the individual network devices 160–166. As such, these devices 160–166 may be manufactured relatively inexpensively. For example, multimedia nodes 150, 151 may be equipped with just enough processing power and memory to receive and play back a multimedia signal, with storage and control (e.g., tuning) functions offloaded to the home media server 110. Similarly, a telephone 166 may be designed with nothing more than a low power microcontroller coupled to an RF transmitter, with telephony functions and contact data storage provided by the home media server 110. In addition, because these network devices 160–166 do not require as much circuitry, they will be lighter than currently-existing devices, and will consume less power.

In one embodiment, the primary communication medium over which the home media server 110 and the various devices 150–151, 160–166 communicate is wireless RF (e.g., via network module 240), with terrestrial transport connections such as Ethernet reserved for devices which are not within RF transmission range. Moreover, certain devices which require a substantial amount of home media network 140 bandwidth (e.g., high definition television 170), and/or devices which are in close proximity to the media server 110 may be configured to communicate over terrestrial transports, depending on the requirements of the particular configuration.

One Embodiment of a Multimedia Node Architecture

Distributed multimedia nodes 150 and 151 illustrated in FIG. 1 provide an interface to the home media network 140 for audio systems 170 (e.g., audio amplifiers and speakers) and/or video systems 171 (e.g., standard television sets, wide screen television sets, high definition television ("HDTV") sets, or any other device capable of displaying video).

As, illustrated in FIG. 6, one particular embodiment of a multimedia node architecture (see, e.g., node 150 in FIG. 1), is comprised of a network interface 605 coupled to the multimedia node bus 610 (e.g., a PCI bus); a system ASIC 620, including MPEG-2 decode/graphics logic 630 (or other multimedia decode logic); a central processing unit 640 and memory 650; an audio processing unit 660; and/or an infrared port 670.

The local central processing unit 640 and memory 650 execute programs and process data locally (i.e., at the multimedia nodes 150, 151). The network interface 605, which may be an RF interface or a terrestrial interface (e.g., Ethernet), receives/transmits multimedia content and control data from/to the home media server 110 over the home media network 140. The system ASIC 620 decodes and processes incoming multimedia content transmitted from the home media server 110 via MPEG-2 decode/graphics logic 630 (or other multimedia compression standard) to produce one or more video outputs 680 (e.g., an NTSC output, an HDTV output, ... etc). In one embodiment, a separate audio processing unit 660 produces both digital and analog audio outputs, 681 and 682, respectively. Moreover, one embodiment also includes a local mass storage device (not shown) for storing certain multimedia content and/or data (e.g., frequently-requested content/data).

In one embodiment, the local infrared interface 670 receives control commands from a remote control unit (e.g., unit 532 in FIG. 5) operated by a user. As described below with reference to FIG. 5, control data/commands received through the infrared interface 670 may subsequently be transmitted to the home media server 110 for processing. For example, in one embodiment, if a user selects a command to change to a live broadcast channel (e.g., the evening news), the command is transmitted from multimedia node 151 to a home media server 110 tuning application, which forwards the command to a video module (e.g., CATV module 241, satellite TV module 243). The tuner in the video module (see, e.g., tuner 910 in FIG. 9) then tunes to the requested frequency and the new video signal is streamed from the home media server 110 to the multimedia node 151. Alternatively, or in addition, if the requested content was previously stored on the home media server 110 (e.g., on mass storage device 230), then no broadcast tuning is necessary—the content is simply read from the storage device 230 and transmitted to the multimedia node 150. Accordingly, as described in greater detail below, the amount of audio/video content which must be broadcast to the home media server 110 (i.e., over dedicated broadcast channels) is significantly reduced.

Figure 6A:
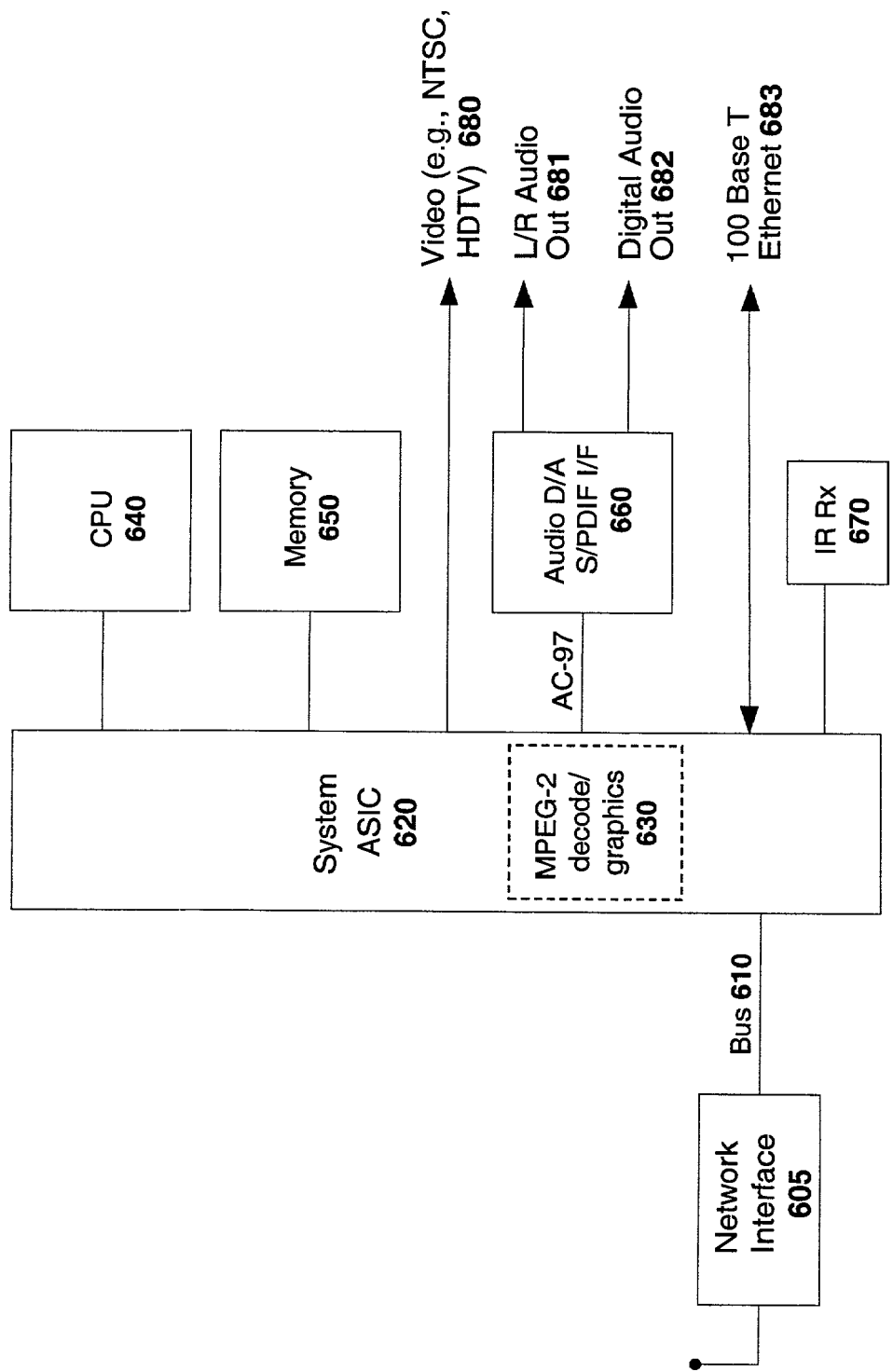
FIG. 6a illustrates one embodiment of a multimedia node hardware architecture.
Figure 6B:
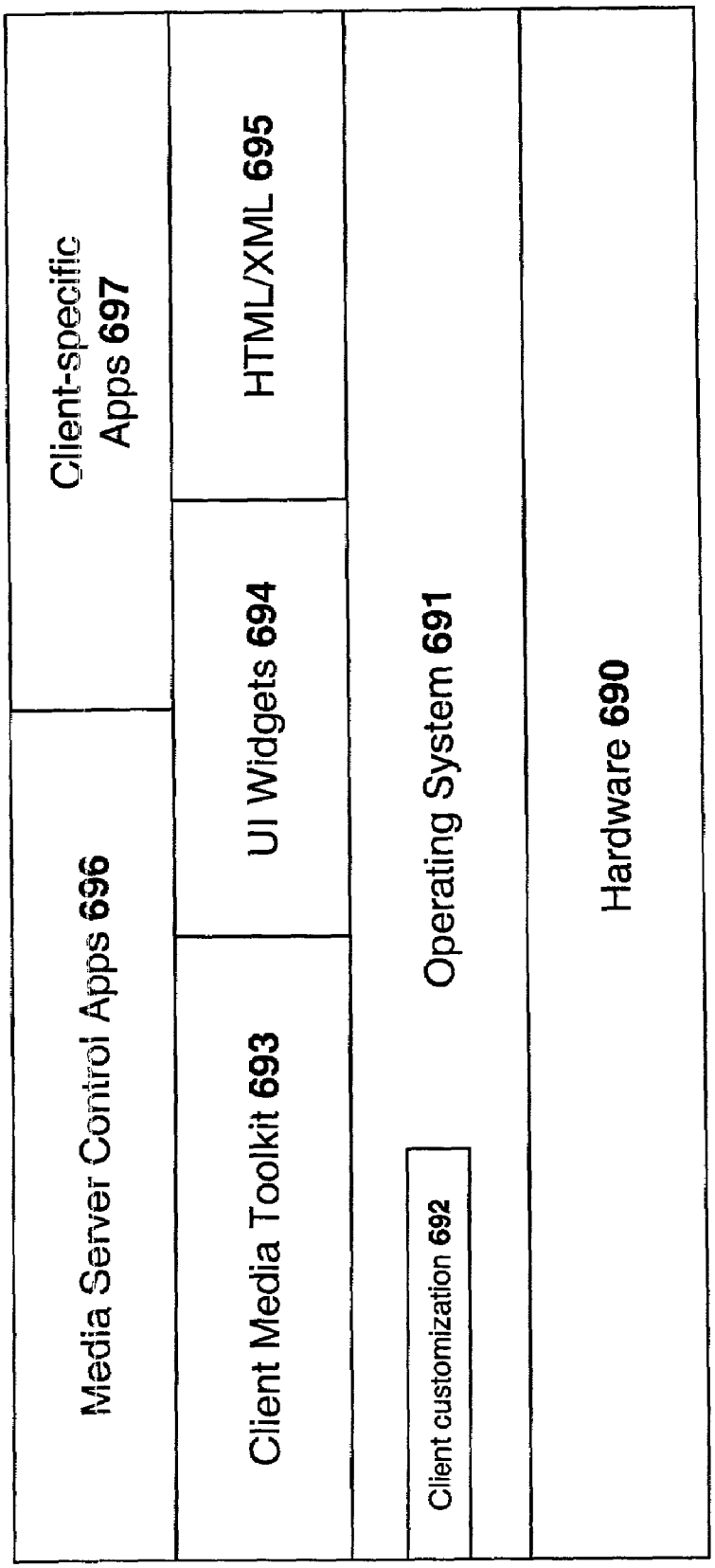
FIG. 6b illustrates one embodiment of a multimedia node software architecture.

One embodiment of a multimedia node 150 software architecture is illustrated in FIG. 6b. Various hardware architectures 690 may be used to support the software architecture, including the architecture illustrated in FIG. 6a. An operating system 691 executed on hardware 690 (e.g., Windows '98, Linux, ... etc) includes client customizations for optimizing communication over the home media network 140 (e.g., providing low level support for real time streaming of audio and video).

A standard set of user interface components 694 included in one embodiment may be employed (e.g., by application developers) to generate unique interactive interfaces at each of the media nodes 150, 151. For example, a user-navigable tuning index may be included which lists available content by dates/times and allows users to graphically select a particular broadcast channel and/or stored content from the mass storage device 230.

In addition, support for the hypertext markup language ("HTML") and/or the extensible markup language ("XML") are included in one multimedia node 150 embodiment, allowing users to download, view and modify various types of Internet content (e.g., Web pages).

Applications executed on multimedia nodes 150, 151 may include client-specific applications 697 and/or home media server 110 control applications 696. Two examples of media server control application 696 will now be described with reference to FIGS. 6c–6d. It should be noted, however, that these examples are for the purpose of illustration only and should not be read to limit the scope of the invention.

Figure 6C:
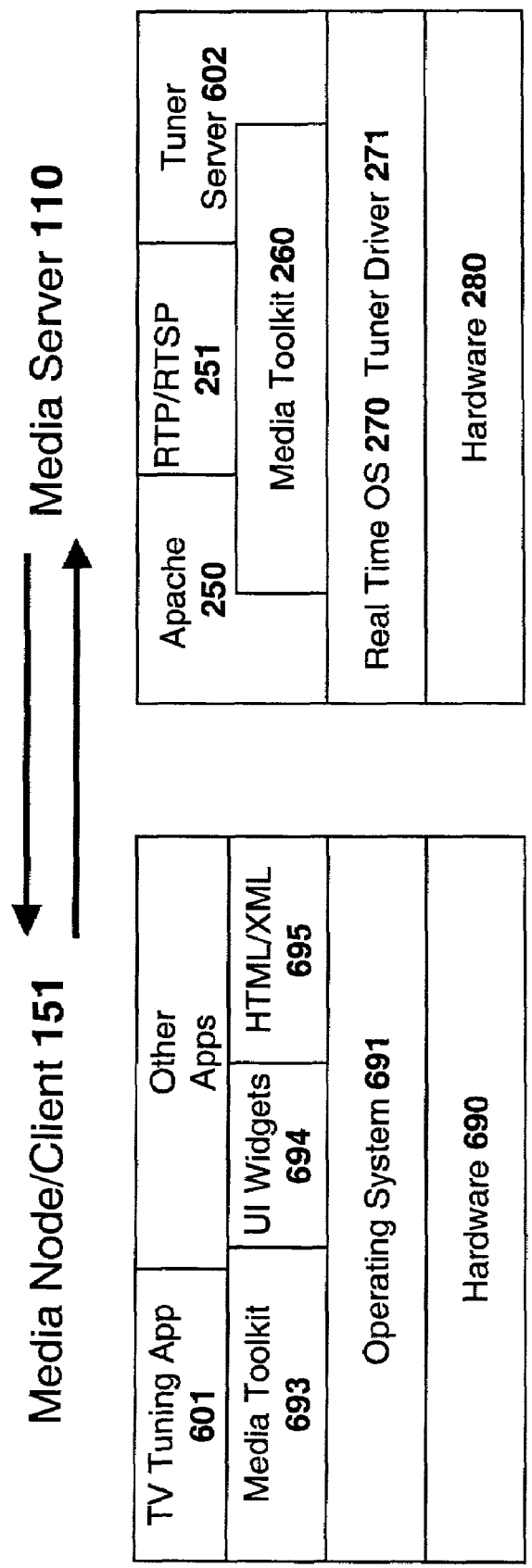
FIG. 6c illustrates one embodiment of the system for tuning between multimedia channels.

FIG. 6c illustrates an embodiment for tuning to a particular broadcast channel (e.g., cable, satellite broadcast). A user initially selects a particular channel (e.g., via a remote control device) to be viewed at the local multimedia node 151. The command is received by the local TV tuning application 601 executed on the multimedia node 151, which sends a tuning request to the home media server 110 over the home media network 140. A tuner server module 602 executed on the home media server 110 receives the request and forwards the request to the tuner driver 271 (e.g., through the media toolkit 260). In response to the command, the tuner driver 271 directs the tuner hardware (see, e.g., tuner 910 in FIG. 9 described below) to tune to the specified channel. The tuner driver also communicates with the conditional access subsystem (see, e.g., module 930 in FIG. 9) to determine whether the user has the right to view the particular channel (e.g., the channel may be a subscription-based channel such as HBO).

If the user has access rights, then the tuner server module 252 creates video stream for the specified broadcast channel and feeds the stream to the multimedia node 151. In one embodiment, the tuner server module 602 creates the stream using the RTP/RTSP protocol (i.e., by communicating with the RTP/RTSP module 251). The media node receives the stream through the local TV tuning application 601 and decodes the stream using a codec embedded within the media toolkit 260 (various additional encoding features of the system are set forth below). Once decoded, the video image is generated on the video display.

Figure 6D:
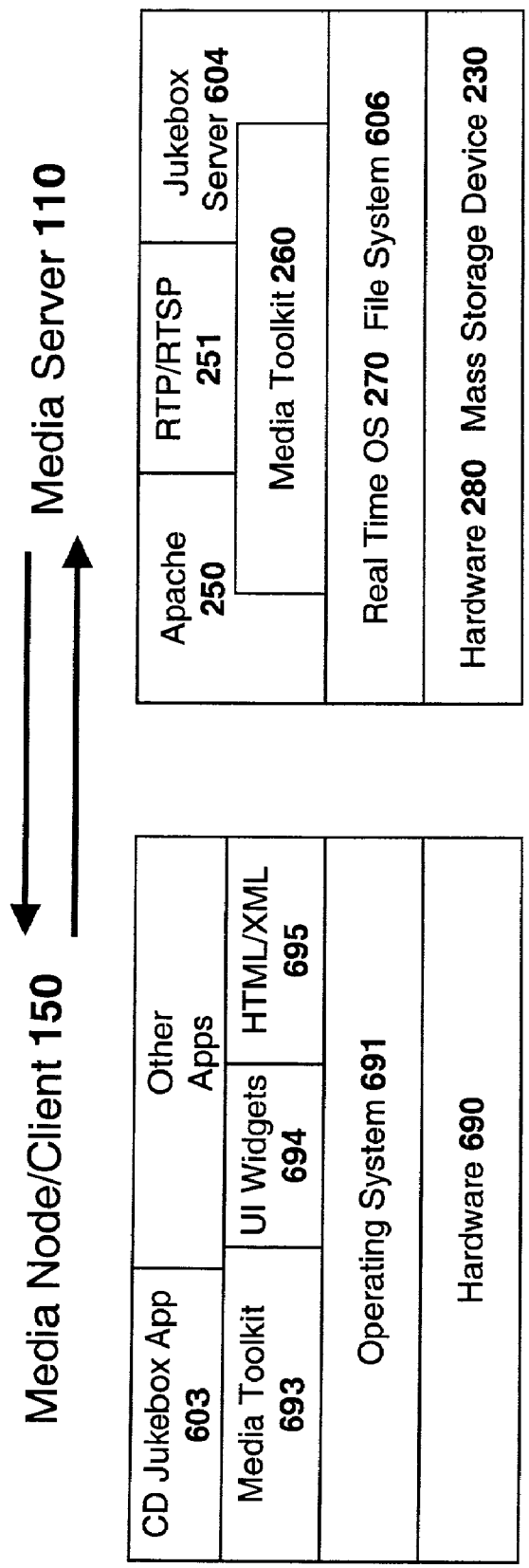
FIG. 6d illustrates one embodiment of the system for playing a CD jukebox.

FIG. 6d illustrates an embodiment for employing a music jukebox at a multimedia node 150. A user initially selects a particular music play list (e.g., via a remote control device) to be played at the multimedia node 150. The request is received by a music jukebox application 601 executed on the multimedia node 150, which forwards the request to the home media server 110. A jukebox server module 604 executed on the home media server 110 receives the request and forwards the request to the media server file system 606 (through the media toolkit 260), which retrieves the music files from the mass storage device 230. The jukebox server module 604 then creates the audio stream for the specified files and feeds the stream to the multimedia node 150. In one embodiment, the tuner server module 252 uses the RTP/RTSP protocol to create the stream (e.g., through communication with the RTP/RTSP module 251). The multimedia node 150 receives the stream through its jukebox application 601 and decodes the stream using a codec embedded within the media toolkit 260. Once decoded, the music tracks are reproduced on a set of speakers.

Network Operations Center

In one embodiment, a network operation center ("NOC") 180 illustrated in FIG. 1 provides data and multimedia services for the home media server 110. The NOC may be comprised of one or more servers communicating with the home media server 110 over the Internet 120 (or other network). In one embodiment, the NOC performs one or more of the following functions:

Remote Monitoring and Maintenance. The NOC 180 monitors the home media server to ensure that it is operating within normal parameters. In one embodiment, the home media server 110 periodically transmits a status update to the NOC 180, indicating whether any particular services are required and/or whether arty problems have arisen. If the home media server 110 fails to transmit a status update after a predetermined period of time, the NOC 180 may take steps to determine the cause of the problem and/or take steps to contact the user. For example, diagnostic tests may be performed to evaluate the network connection between the home media server 110 and the NOC 180. If the diagnostic tests do not provide an answer, then the user may be contacted via telephone to determine the next course of action. In one embodiment the NOC 180 is staffed by engineers or other technical assistance personnel 24-hours a day.

In one embodiment, the user's home security system and/or fire system communicates with the home media server 110 over the home media network 140. Accordingly, the home media server 110 may be programmed to relay home security and/or fire system data to the NOC 180 on a periodic basis during certain periods of time (e.g., every minute). If a security problem or fire trouble indication is encountered during this period of time (e.g., a door/window is opened without the proper security access code), the NOC 180 may notify a local law enforcement agency and/or the local fire department.

Automatic Downloading and Upgrades. In one embodiment, the NOC 180 provides automated software downloading and upgrades to the home media server 110. For example, when a new software interface/program (e.g., a new graphical user interface) is developed for the home media server 110 it may be automatically downloaded from the NOC 180 and installed. Whether the NOC 180 should upgrade software on the home media server 110 automatically may be determined by each individual user. Certain users may opt to manually upgrade all of their software while other users may specify a particular subset of software to be automatically upgraded. For example, a user may specify automatic upgrades for graphical user interface software and manual upgrades for email clients and word processors.

In addition, the NOC 180 may store up-to-date drivers for various home media network devices 160–166. In one embodiment, when a user purchases a new device, such as a new telephone, the device may automatically identify itself to the home media server 110 (e.g., via USB, IEEE 1394 or other device identification technology). The home media server 110 will then determine whether the device is supported by the system and, if so, query the NOC 180 for the latest driver. In one embodiment, once the driver is identified, it is automatically downloaded from the NOC 180 and installed on the home media server 110. Once installed, the driver may be updated automatically as new updates become available. Accordingly, driver software will no longer need to be bundled with home network devices 160–166, resulting an additional cost savings to the end-user. In addition, users will not be required to install and configure device drivers for each new network device they purchase.

In addition, the home media server 110 may check the NOC 180 to determine whether the home network device has been certified by the NOC 180 as meeting some minimum level of quality and/or performance. In one embodiment, device drivers will be downloaded and installed on the system only if the device has been certified. In this manner, a minimum quality of service may be maintained for all devices employed on the system.

The same type of device identification, certification, and driver installation may be performed for communication modules 240–245 such as those described above. Thus, as with home network devices 160–166, certain communication modules 240–245 which do not meet a minimum quality of service requirement (e.g., those which perform inefficient bus transactions which tie up the system bus 220) will not be certified by the NOC 180 and will not be permitted to be installed in the home media server 110.

In addition, in one embodiment the communication modules 240–245 are manufactured and certified by third party content providers (e.g., satellite broadcast operators). In this embodiment, the content providers may configure the modules 240–245 to work with their own proprietary communication protocols, encryption techniques, and/or application programs. For example, DirecTV™ may develop a proprietary interface for its users so that when a user selects his DirecTV feed he will be presented with a unique user interface and/or channel programming environment. Accordingly, while the present invention provides a standard media transport interface for a variety of different communication channels, service providers can still distinguish their services based on the proprietary applications/transports which they develop.

Logging/Data Warehousing. In one embodiment, the NOC 180 may perform logging and data warehousing for the home media server 110. More specifically, the NOC 180 may maintain a log of network transactions for each home media server 110 and subsequently evaluate the log for a variety of reasons (e.g., to troubleshoot system problems, to determine a user's preferences and tailor services and/or advertising to that user, . . . etc). For example, by monitoring usage patterns, the NOC 180 may determine that every time a certain Java applet is downloaded, the home media server 110 crashes. As such, the NOC 180 may takes steps to ensure that the applet in question is no longer downloaded by the home media server 110 (e.g., by notifying the user or automatically blocking the applet). The NOC 180 could then notify the technical support staff to determine the problem with the applet.

Similarly, the usage log may be evaluated to determine the preferences of a user and to provide specialized services to that user based on those preferences. For example, based on the Web sites the user visits and/or the channels that the user watches, the NOC 180 may determine that the user is interested in baseball. As such, the NOC 180 may automatically provide baseball-related content to the user such as, for example, broadcast schedules for upcoming games, a subscription offer to a sports magazine, advertisements, and various other baseball-related content. Similarly, the NOC 180 may determine that the user watches certain television shows on a regular basis, and may automatically download/record those shows on the home media server 110 (e.g., via TCP/IP), so that they will be readily available for the user (e.g., during non-broadcast periods of time).

Archiving. In one embodiment, users may backup multimedia content and other types of data at the NOC 180. For example, a user may take a series of pictures with a digital camera and transmit the originals to the NOC 180 for developing. In one embodiment, the NOC will transmit the pictures to a developer on behalf of the user and will store a backup copy of each of the originals (the NOC 180 will be backed up regularly to prevent loss of the originals).

In one embodiment, the NOC 180 will monitor all multimedia content purchased by the user over the Internet. For example, when the user downloads a new compact disk ("CD") from a music download site, the NOC 180 will record the transaction in the user's profile. As such, the user does not need to store all of his/her multimedia content locally on the home media server 110. Rather, because the NOC 180 keeps track of all the content to which the user has access rights, the user can offload storage to the NOC 180 and re-download the content when necessary (e.g., following a hard drive failure on the home media server 110).

Registration/configuration. In one embodiment, users may be required to register with the NOC 180 upon purchasing a home media server 110 and related network devices 150–151, 160–166. The NOC 180 may prompt each user to respond to a series of question directed to the user's preferences, the type/level of NOC 180 services desired by the user, the authorization level of each user in the home media server 110 household (e.g., children may be provided with limited limited functionality), and any other user-related data which may aid the NOC 180 in providing user services. In one embodiment, the NOC 180 will automatically detect the home media server 110 configuration and store this data in a user database (e.g., to be used for software upgrades, troubleshooting, . . . etc).

Bridge to Satellite/Cable Operations. In one embodiment, the NOC 180 will coordinate communication between the home media server 110 and any satellite/cable services to which the user has subscribed. For example, the NOC 180 may forward pay-per-view requests transmitted from the home media server 110 to the various cable/satellite operators, and perform the back-end processing (e.g., authentication, billing) required for the pay-per-view transaction. Because a persistent communication channel exists between the NOC 180 and the home media server 110 (e.g., through DSL or cable modem), no dial-up processing is required (unlike current pay-per-view cable and satellite systems).

E-commerce Support. In one embodiment, rather than acting merely as a conduit between the home media server 110 and other e-commerce Internet sites, the NOC 180 may perform various e-commerce functions itself. For example, the NOC 180 may market and sell products on behalf of other online retailers (e.g., Amazon.com®). The NOC 180 of this embodiment may perform the back-end processing (e.g., billing and record keeping) required for each e-commerce transaction.

Application Support. In one embodiment, the NOC 180 will provide support for applications executed on the home media server 110. For example, the NOC 180 may provide a compact disk database containing CD titles, track information, CD serial numbers, etc. When a user copies his CDs onto the mass storage device 230 of the home media server 110, the home media server 110 may query the database (as described in greater detail below) and download title and track information (or other information) used to identify/index each CD and each track. In one embodiment, public CD databases (e.g., such as the database maintained at "www.cddb.com") may be filtered and improved by the NOC 180 to remove errors. Various other types of application support may be implemented at the NOC 180 consistent with the underlying principles of the invention.

Remote-Access Gateway. In one embodiment, the NOC 180 may be used as a gateway to access to the home media server 110 from a remote location. For example, a user from a PC connected to the Internet may log in to his home media server 110 through the NOC 180.

In one embodiment, the home media server 110 is configured to make outgoing connections only (i.e., to reject direct incoming connections). As described briefly above, the home media server 110 may poll the NOC 180 periodically (e.g., every few seconds) and transmit a status update. During this periodic poll the home media server 110 may query the NOC 180 to determine whether anyone is attempting to access the home media server 110 from a remote location. If so, then the NOC 180 transmits specific information related to the connection attempt to the home media server 110 (e.g., authentication data such as user ID's, passwords, . . . etc). The home media server 110 may then initiate a connection with the remote user (e.g., using the remote user's IP address and encryption key).

In one particular embodiment, the NOC 180 will authenticate the remote user before notifying the home media server 110 of the connection attempt. For example, upon receipt of a remote connection request, the NOC 180 may prompt the user to answer a series of questions (e.g., personal questions, questions related to the user's account, . . . etc). If the user does not answer the questions in a satisfactory manner, a member of the NOC staff may contact the user directly (e.g., via standard telephone or IP telephone). Regardless of how authentication takes place, once a remote user is authenticated, the user's data is transmitted to the home media server 110, which subsequently establishes a connection with the remote user.

Additional Home Media Server Embodiments and Applications

Figure 3:
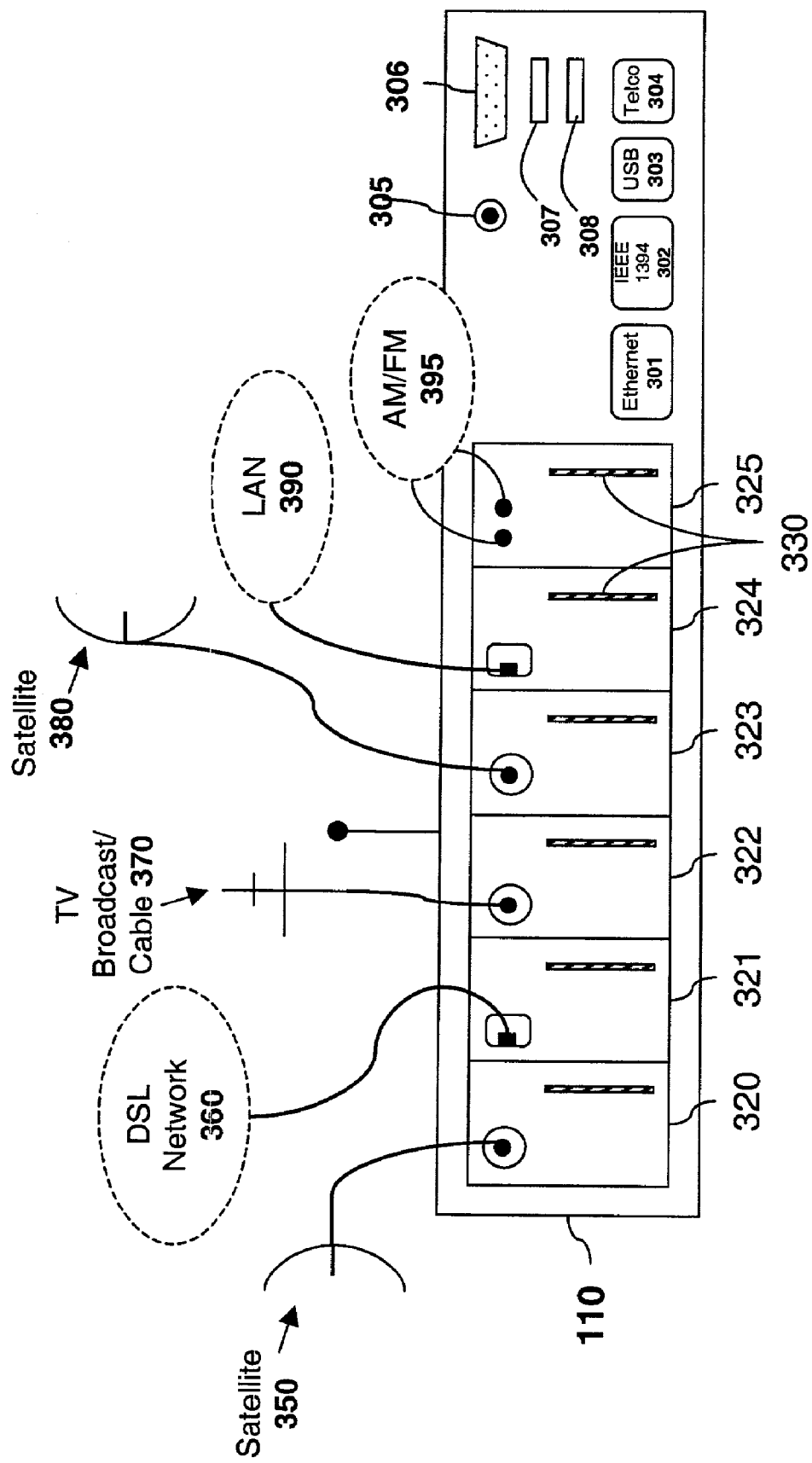
FIG. 3 illustrates a plurality of media modules installed in one embodiment of a home media server.
Figure 4:
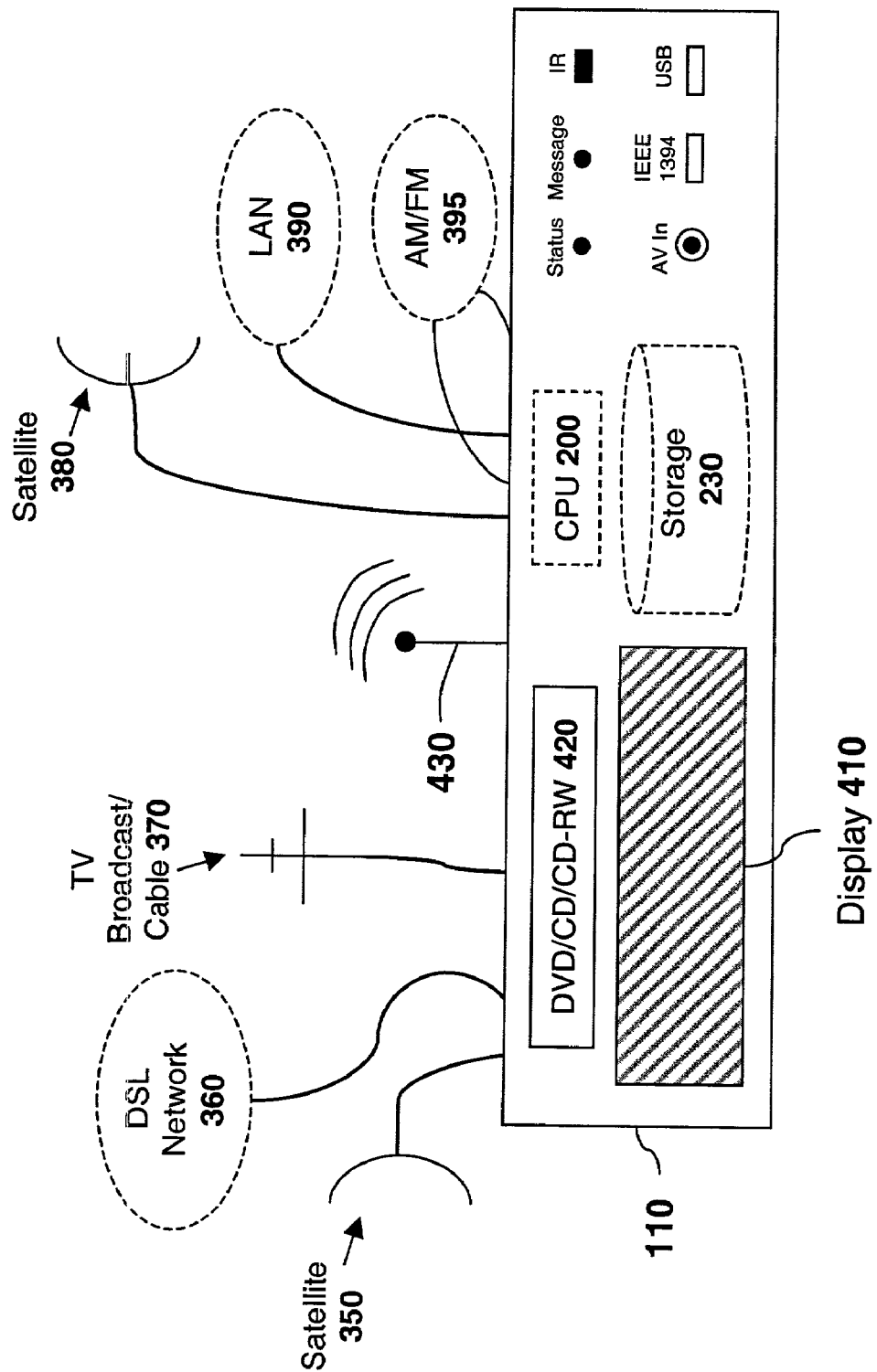
FIG. 4 illustrates one embodiment of a home media server which includes a DVD/CD/CD-RW drive.

An external illustration of one embodiment of the home media server 110 is shown in FIGS. 3 and 4 (from the back and front, respectfully). FIG. 3 shows a home media server 110 with a plurality of different media modules 320–325 installed in its expansion bays (i.e., electrically coupled to its system bus 220). As illustrated, in one embodiment, certain standard communication ports such as Ethernet 301, IEEE 1394 302, USB 303, digital/analog audio 305, standard telephone 304, XGA/HDTV 306, and/or other standard audio/video ports (e.g., AV output ports 307 and 308) may be installed directly in the primary home media server, rather than as an expansion card.

As illustrated in FIG. 4, one embodiment of the system includes a DVD player 420 (and/or a CD player, CD-ReWritable drive, recordable DVD drive or other type of portable digital media player/recorder). The DVD player 420 is capable of playing a DVD directly and/or transferring multimedia content from the DVD to the mass storage device 230. In one embodiment, as multimedia content is transferred to the storage device 230, either from the DVD player 420 or over the Internet 120, an indexing module executed on the home media server 110 indexes the multimedia content in a content database (not shown).

Various DVD/CD identification techniques may be used to identify the particular DVD/CD inserted and copied to the storage device 230. For example, a checksum may be calculated for a known unique portion of the DVD/CD and compared with a CD/DVD checksum database (e.g., maintained at the NOC 180 or other server). Similarly, the serial number may be read from the DVD/CD and compared with a database of DVD/CD serial numbers. Additional DVD/CD identification techniques which may be utilized in accordance with the principles of the invention are disclosed in co-pending applications entitled SYSTEM AND METHOD FOR SCALING A VIDEO SIGNAL, Ser. No. 09/632,458, filed Aug. 4, 2000 which is assigned to the assignee of the present application and which is incorporated herein by reference.

In one embodiment of the system, the storage device 230 (e.g., a hard drive) is preferably large enough to store hundreds of hours of video and/or audio content, as well as a variety of other digital information such as telephone voice messages, computer programs/data . . . etc. The current recommended size for the storage device 230 is at least 80 gigabytes, however the particular size of the storage device is not pertinent to the underlying principles of the invention.

One or more RF transmitters 430 are also provided in one embodiment of the home media server 110. The transmitter 430 (as well as the LAN 390, if one is installed) allows the home media server 110 to simultaneously transmit multimedia content and other types of data to the various media devices 150–151, 160–166 over the home media network 140 (e.g., at least one MPEG-2 video stream and several audio streams).

In one embodiment, the wireless transmission system is capable of handling isochronous multimedia traffic reliably (i.e., without jitter) in a wide range of residential settings. For example, the system must be capable of working in the presence of common residential RF interference such as microwave ovens and cell phones. In one embodiment, these requirements are met through the proper choice of modulation and coding. More specifically, one embodiment employs a modified version of IEEE 802.11b adapted to operate in a real time environment (e.g., using Reed-Solomon forward error-correction and antenna diversity with circular polarization).

Figure 5:
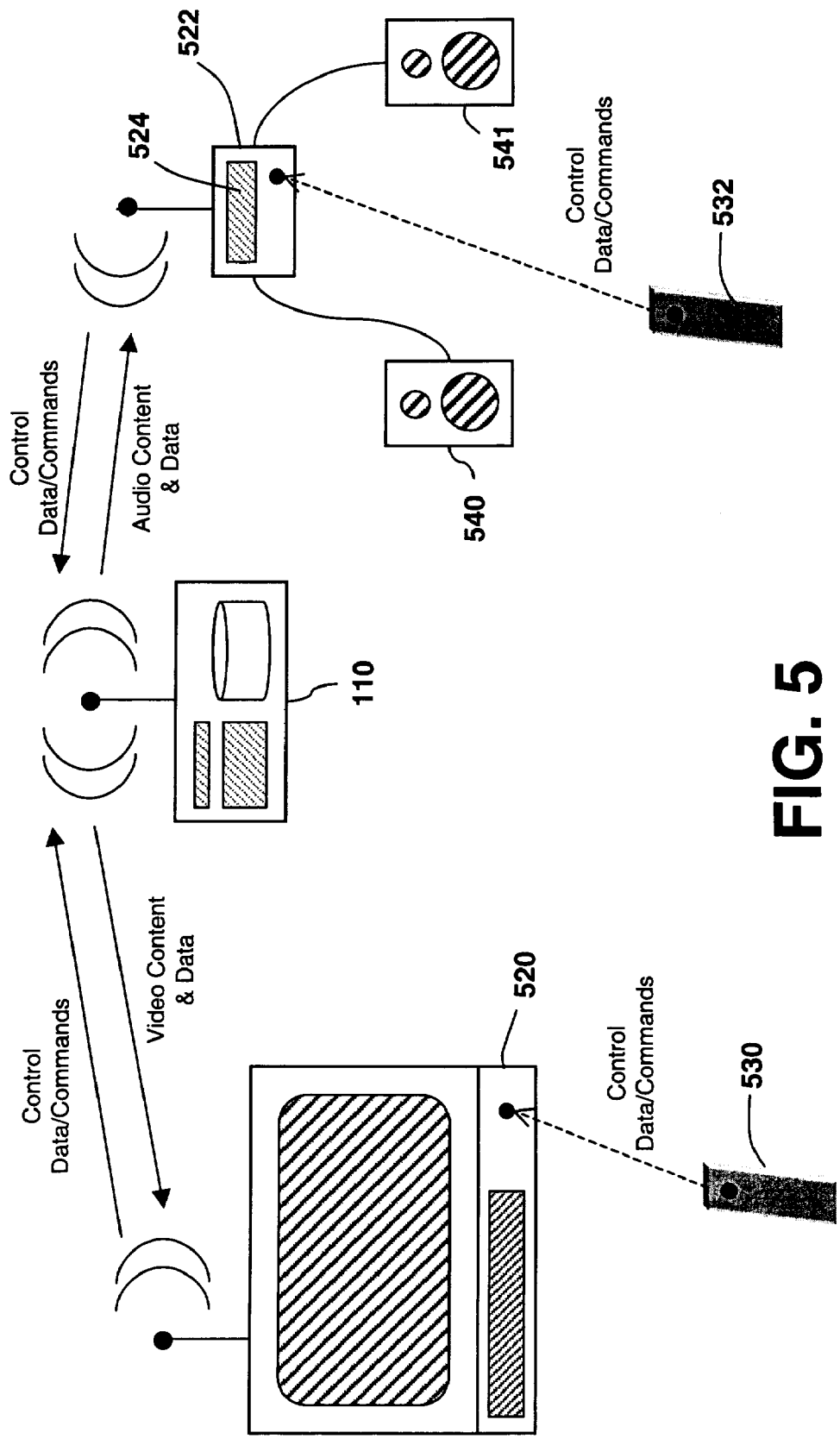
FIG. 5 illustrates a home media server communicating to two audio/video media nodes over a wireless network.

FIG. 5 illustrates a home media server 110 communicating simultaneously with a video node 520 and an audio node 522. Certain multimedia nodes, such as node 522, include an LCD 524 (or other type of display) for displaying information about the multimedia content stored on home media server 110 (e.g., CD and movie titles, CD tracks . . . etc). In one embodiment, the audio node 522 may be electrically coupled to an amplifier for amplifying the transmitted audio signal into a pair of speakers. As described above, in one embodiment, the individual multimedia nodes also include local storage devices (not shown) for locally caching recently used multimedia content and data.

Data/commands sent from remote control devices 530, 532 are transmitted through the nodes 520, 522 to the home/media server 110 as indicated. In one embodiment, the remote control devices include an LCD (not shown) or other type of display for displaying information about the multimedia content stored on home media server 110 (i.e., instead of, or in addition to, the multi media node 522 display 524).

As described briefly above, using the foregoing system, all of a user's data, music and video may be stored in a single location (i.e., home media server 110) and accessed from anywhere in the house (e.g., stereo node 522) or the car (e.g., via an automotive multimedia node 164 as indicated in FIG. 1). Moreover, if the home media server 110 is connected to the Internet through, for example, a persistent DSL connection 360, the user can access all of the stored content from various other locations across the globe (e.g., a summer home or a hotel while away on business). One embodiment of the system provides a secure, encrypted data stream when content/data is requested from the home media server 110 in this manner, thereby protecting the user's privacy as well as the copyrights to the underlying multimedia content.

If a multimedia node is employed in a user's automobile as described above, when the automobile is parked within range of the media server's RF transmissions, music or other audio/video content may be transmitted and stored on a storage device within the automobile, even when it is not running. The specific type of audio/video content to be transmitted at a particular time during the day or week may be variable, based on users' preferences. For example, the home media server 110 may be configured to transmit up-to-date traffic reports during the morning and evening hours before the user leaves home/work. The user will then receive an instant traffic report as soon as he starts his car in the morning and/or evening, followed by music or video selected based on the user's preferences. Various additional aspects of this feature are set forth in the co-pending applications incorporated by reference above.

In an embodiment which includes a CD-ReWritable ("CD-RW") drive, users can produce custom CDs using the audio content stored on the mass storage device 230 or downloaded from the Internet. The CD-RW drive may utilize serial copy management techniques to produce CDs which cannot themselves be copied, thereby protecting the copyrights to the underlying works. Moreover, in one embodiment, the system will determine whether the content owner or content creator allows copying of the multimedia content. For example, certain content creators/owners may allow a copy to be stored on the home media server mass storage device 230, but may not allow copying to a portable disk (e.g., a CD-RW disk). In one embodiment, content stored on the mass storage device 230 may be labeled as non-copyable by setting one or more "copy" bits, to a particular value (e.g., in a bit field associated with the content).

In one embodiment of the system, a portable music/video player node may be configured to retrieve multimedia content directly from the home media server 110 or via an adapter module. Portable MP3 players such as the Rio™ from Diamond Multimedia™, for example, may be used to store and play back digital audio content transmitted from the home media server in a flash memory module. In one particular embodiment, the CD-RW drive 420 is capable of accepting the ⅓ inch "mini CD" format. Accordingly, users may produce unique mini CDs (e.g., using tracks stored on the mass storage device 230), for playback on MP-3 players capable of playing mini-CDs.

MPEG conversion logic is configured on one embodiment of the home media server 110 (e.g., in software, hardware or any combination thereof), allowing the home media server 110 to convert from one MPEG format to another. Using the MPEG conversion logic, video content stored in MPEG-2 format may be converted to MPEG-1 format and recorded on a "video CD" (a compact disc format used to hold full-motion MPEG-1 video). As such, users may store video on a portable medium, even on a home media server 110 which is not equipped with a recordable DVD drive.

In another embodiment of the system, home appliances (e.g., the refrigerator, the toaster, the air conditioner) and other home systems (e.g., security, air conditioning) are all provided with RF transmission devices to communicate with the home media server 110. Each device may also be configured with it's own internal network address and/or Internet address. Users may then access information pertaining to these devices and/or control these devices from any room in the home or over the Internet. In one particular embodiment, the user's automobile is outfitted with an RF transmitter and a network address. Thus, in this embodiment, the automobile is capable of reporting maintenance information to the user via the home media server 110 (e.g., low brake pads, oil change needed . . . etc).

In one embodiment, a user may publish a home Web page containing up-to-date information on each home appliance or other network device. Accordingly, users of this embodiment are able to monitor and control home appliances and systems from anywhere in the world. In one embodiment this includes the ability to select broadcast listings and direct the home media server 110 to make recordings (e.g., based on date/time or broadcast ID code). In addition, in one embodiment, users may connect remotely to the home media server to review email and/or voicemail listings (which may be displayed to the user in the form of a single, generic "message" box). Voicemail messages may be streamed to the remote user's location over the Internet or other network.

Telephony Embodiments

Figure 7A:
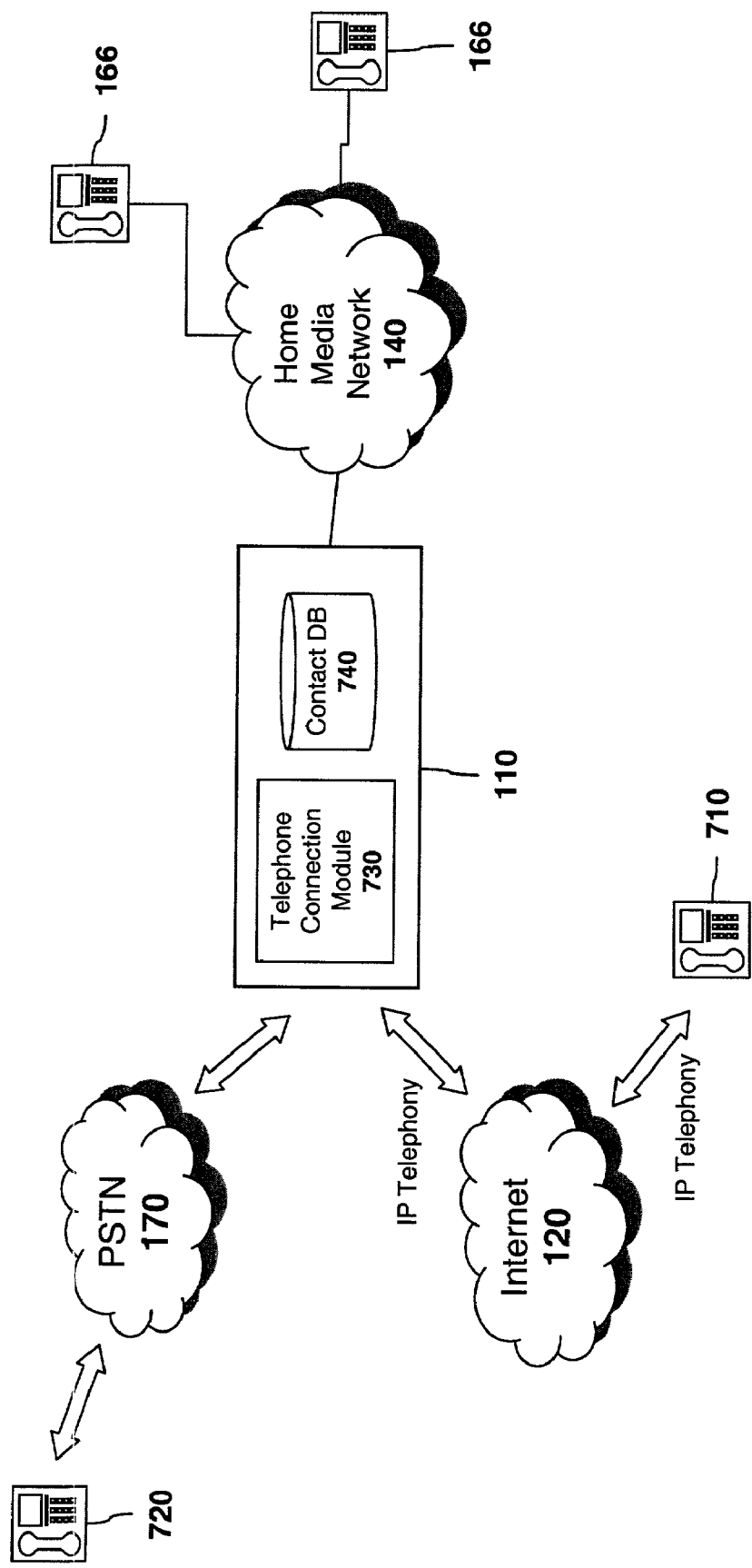
FIG. 7a illustrates one embodiment of a home media server for coordinating between standard telephone services and IP telephone services.

As illustrated in FIG. 7*a*, in one embodiment, home telephone devices 166 may also be configured to run through the home media server 110. In this embodiment, incoming faxes and voicemail are stored on the home media storage device 230 and may be accessed from any room in the house (e.g. from telephone devices 166, personal computers 160, PDAs 165, and/or video systems 151/171). In addition, phone number and address information may be stored in a contact database 740 on the home media server 110 and accessed through the various telephone devices 166 (or other home media devices). Offloading user contact data from the telephone devices 166 in this manner allows telephone devices 166 to be manufactured will less memory and less processing power, further decreasing costs to the end user.

As illustrated in FIG. 7*a*, in one embodiment, the home media server 110 includes a telephone connection module 730 which coordinates between standard telephony calls placed/received over the public switched telephone network ("PSTN") 170 and calls placed over the Internet 120 using IP telephony protocols. The telephone connection module 730 will automatically route incoming calls from both sources to the same set of home telephone devices 166 (or other home media devices such as the user's personal computer 160).

Users may specify whether a particular outgoing call should be placed over the Internet 120 (e.g., to an IP telephony device 710) or over the PSTN 170 (e.g., to a standard telephone device 720). In one embodiment, the telephone connection module 730 analyzes each outgoing telephone connection request to determine whether the call should be routed through the Internet 120 or through the PSTN 170. The telephone connection module 370 may factor in various types of connection data to make telephone connection determinations. For example, a user may specify certain contacts within the contact database 740 for which IP telephone connections should be used and certain contacts for which standard telephone connections should be used. In one embodiment, the telephone connection module 730 will select a particular connection based on whether it is the least expensive option for the user (e.g., for contacts with both IP and standard telephone capabilities). Another variable which may be factored into the selection process is the connection throughput available to the user over the Internet. More specifically, the telephone connection module 730 may initially test the connection throughput (including the availability of a reliable connection) over the Internet 120 and place an IP telephony call only if some minimum level of throughout/reliability is available. Any of the foregoing variables, alone or in combination, may be evaluated by the telephony connection module 730 to select and appropriate telephone connection.

One embodiment of a protocol architecture for supporting IP telephony and related communication functions on the home media server 110 is illustrated in FIG. 2*b*. Various telecommunication standards are supported by this embodiment, including the H.248 media gateway control standard ("MEGACO") standard; the ITU-T H.323 and session initiation protocol ("SIP") standards for multimedia videoconferencing on packet-switched networks; the Realtime Control Protocol ("RTCP") standard—a companion protocol to the realtime transport protocol ("RTP") (described above) used to maintain a minimum QoS; and the ITIJ T.120 standard for realtime data conferencing (sharing data among multiple users).

In addition, various audio and video codecs are supported by the illustrated embodiment, including G.711, G.723, and G.729 (for audio); and H.261 and H.261 (for video). As illustrated, each of these codecs may be executed above RTP, an IP protocol that supports realtime transmission of voice and video. Each of the foregoing IP communication protocols may be utilized by media server 110 application programs through the programming interfaces of the media toolkit 260.

Figure 7B:
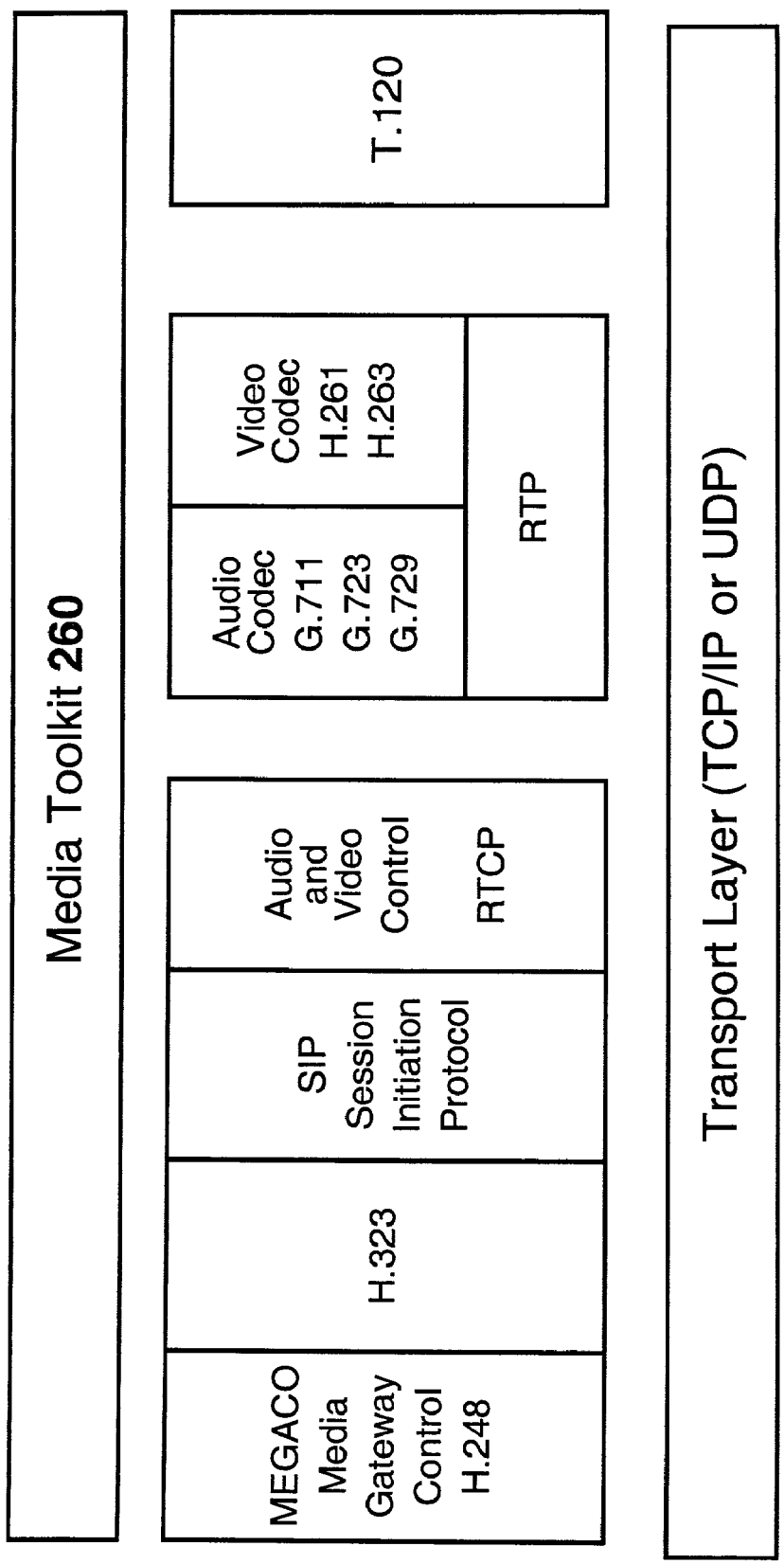
FIG. 7b illustrates one embodiment of a software architecture for implementing standard telephone, IP telephone and/or video conferencing.

It should be noted that, although the embodiment illustrated in FIG. 7*b* includes a specific set of communication protocols, various other communication protocols may be implemented within the home media server 110 while still complying with the underlying principles of the invention. For example, in one embodiment, new protocol stacks (both proprietary and industry-standard) may be automatically transmitted from the NOC 180 and installed on the home media server 110 as they become available.

Figure 7C:
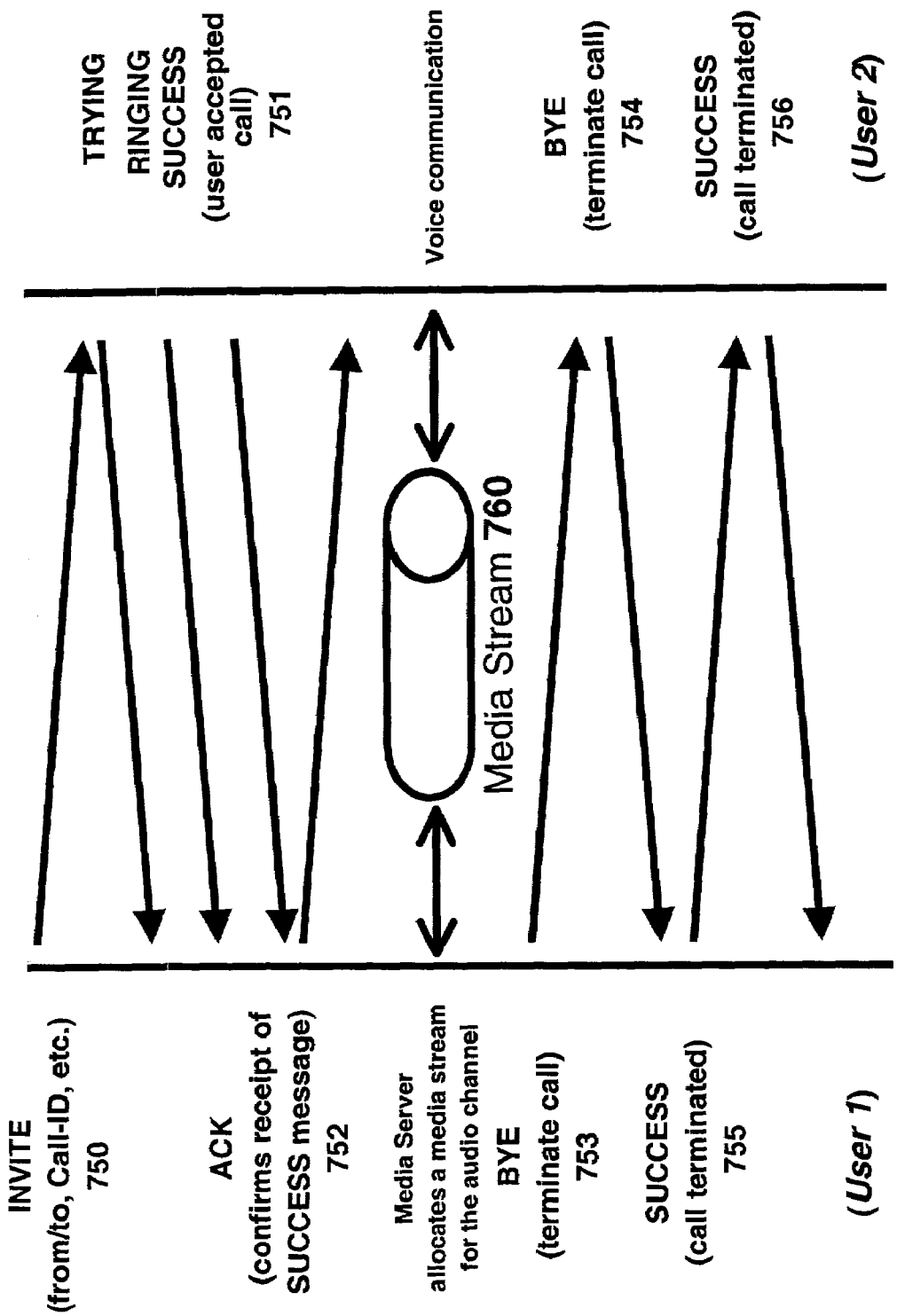
FIG. 7c illustrates a signal diagram of communication between a home media server and telephone.

FIG. 7*c* illustrates a signal diagram representing the set up and termination of a telephony connection according to one embodiment of the home media server 110. At 750, the home media server transmits a call connection "invitation" on behalf of User 1 to User 2. Once User 2 accepts the call, a "success" message is transmitted back to the home media server 110 at 751. In response, the home media server 110 acknowledges receipt of the "success" message at 752 and allocates a media stream 760 to support bi-direction audio communication between User 1 and User 2. To tear down the media stream 760, one of the users must hang up the phone, resulting in a "bye" message 753, 754 followed by a termination acknowledgement ("success") from both sides 755, 756.

Broadcast and Packet-Switched Channel Coordination

Figure 8A:
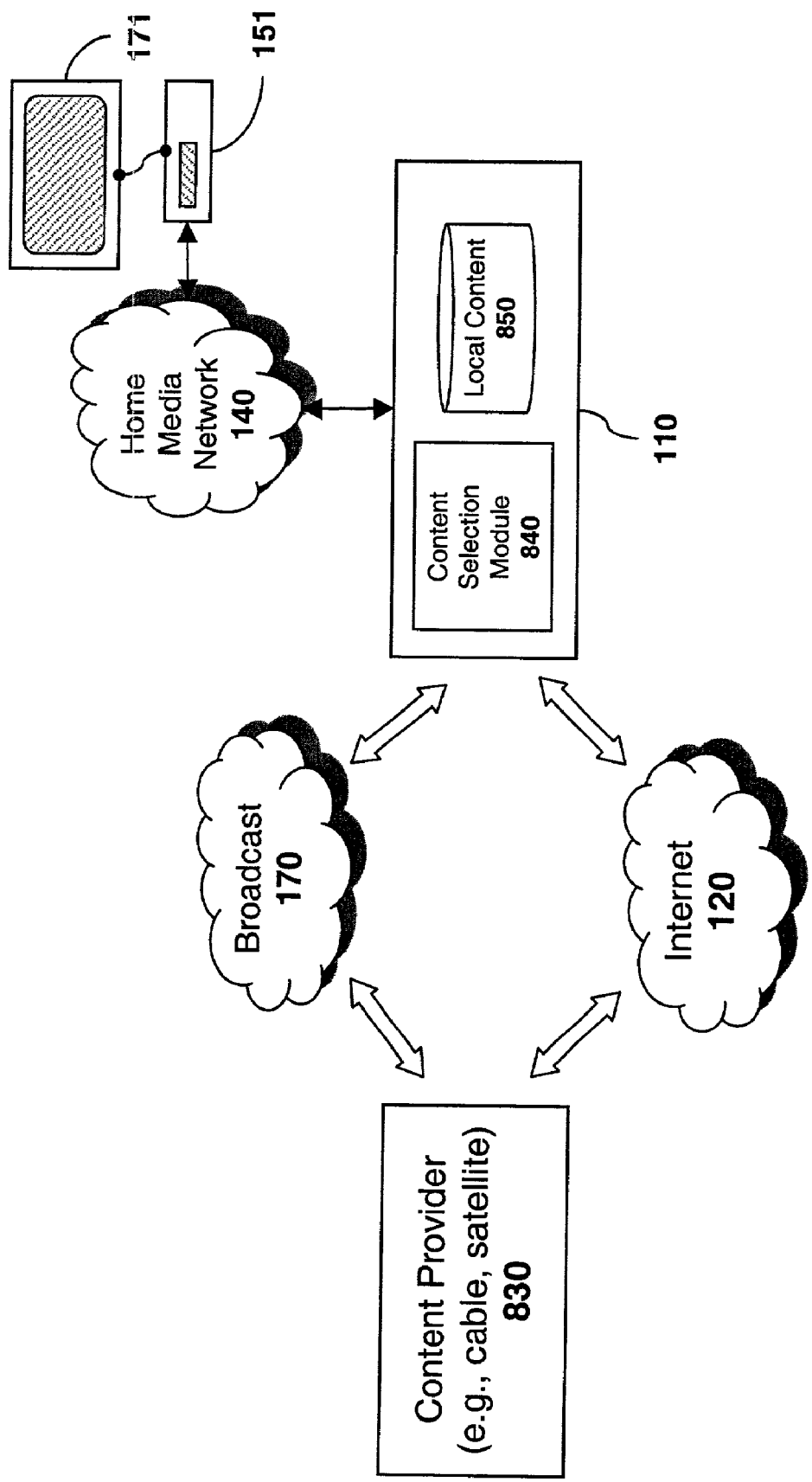
FIG. 8a illustrates a home media server coordinating between standard broadcast channels and packet-switched channels (e.g., the Internet).
Figure 8B:
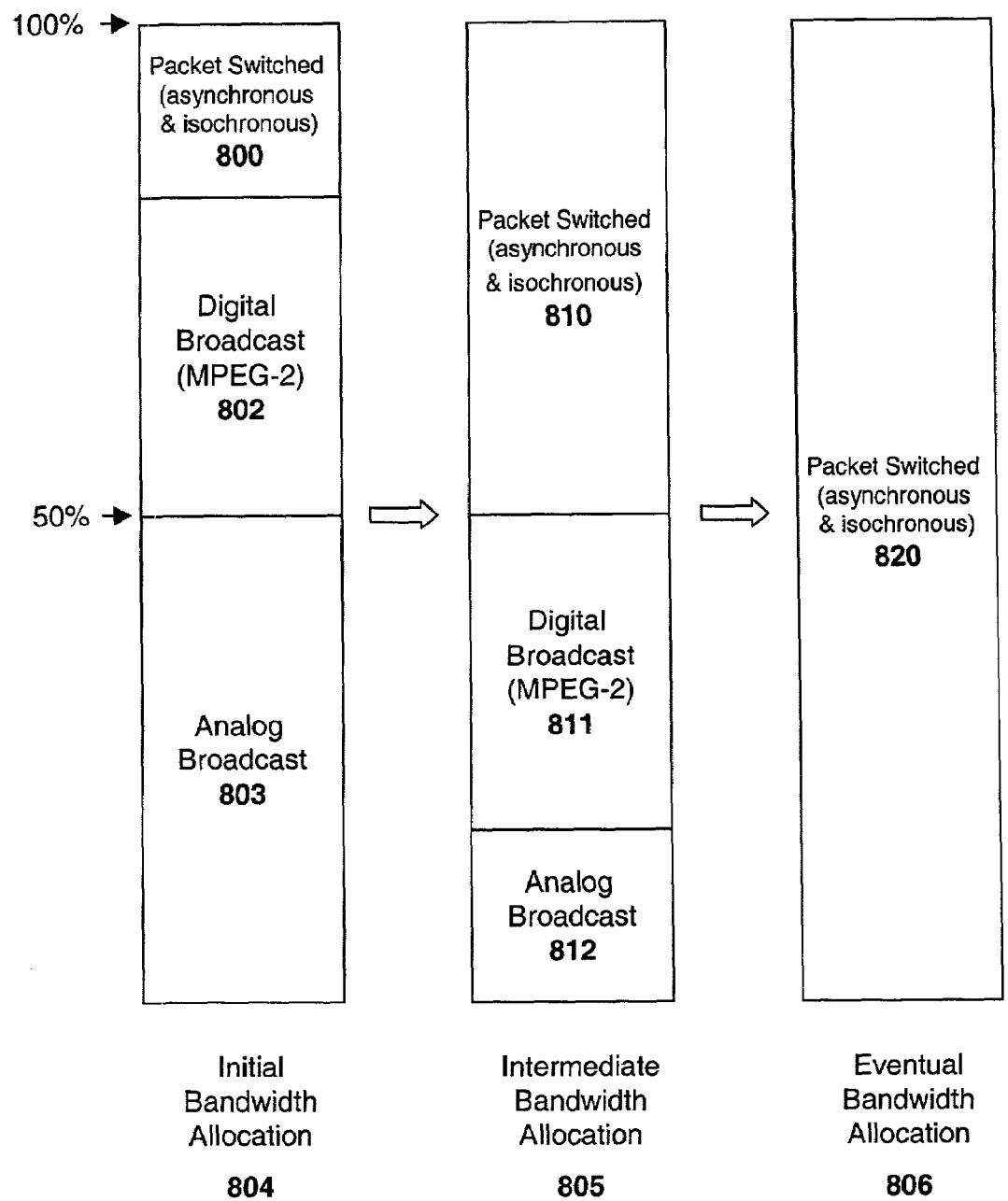
FIG. 8b illustrates a potential progression of bandwidth allocation between packet switched channels and analog/digital broadcast channels.

In one embodiment illustrated in FIG. 8*b*, content providers 830 may transmit content to home media server 110 over Internet channels 120 as well as standard broadcast channels 170. The transmitted content may then be cached locally in a content database 850. When a user subsequently requests the same content to be played back on an audio device or video device 171 (e.g., via media node 151), it will be replayed to the user directly from the local content database rather than over a broadcast channel. In one embodiment, a content selection module 840 will determine whether to retrieve the content through a broadcast channel or directly from the content database 850.

In one embodiment, the home media server 110 and/or the content provider 830 will monitor the preferences of each user in the media server 110 household to determine the content which will be requested during certain times of the day, and/or days of the week. For example, if a user watches "the Simpsons®" at 6:00 PM, the home media server 110 and/or content provider 830 will record this behavior. The content provider 830 may then transmit the latest Simpsons episode to the home media server 110 over the Internet 120 before its scheduled broadcast at 6:00 PM (e.g., during periods of the day or evening when traffic on the Internet 120 is low). Various other pre-recorded broadcast programs may be transmitted to the home media server 110 over the Internet rather than over a dedicated broadcast channel, thereby freeing up a substantial amount of inefficiently used broadcast network bandwidth (pre-recorded content currently represents the vast majority of all broadcast content).

As indicated in FIG. 8*b*, this embodiment of the home media server 100 will provide a seamless mechanism for transitioning from standard digital broadcast channels (e.g., MPEG-2 channels) and analog broadcast channels to packet switched isochronous channels (for live broadcasts) and asynchronous channels (for pre-recorded broadcasts). Initially, the breakdown between broadcast and packet switched channels (e.g., TCP/IP) will be similar to that illustrated in column 804, with analog broadcast 803 taking up approximately half of the available bandwidth, with the other half split between digital broadcast 802 and packet switched channels 800. As content providers begin to switch over to a packet-switched transmission scheme, this breakdown will change as indicated at bandwidth allocation 805, with packet-switched channels taking up approximately half of the available bandwidth and the remainder split between analog broadcast 812 and digital broadcast 811.

Finally, when standard analog and digital broadcast channels have been phased out completely, all content will be delivered over packet switched channels as indicated in bandwidth allocation 806. Many packet switched protocols support both asynchronous and isochronous data transmissions. Accordingly, several isochronous channels may be provided to support live, real time events, (e.g., sports events, the evening news, . . . etc) and the remainder of the bandwidth may be allocated to pre-recorded events (e.g., sitcoms, game shown, talk shows, . . . etc). These pre-recorded events/shown may be asynchronously downloaded to the home media server 110 at any time of the day or evening (e.g., during periods of low network activity), resulting in a much more efficient allocation of available transmission bandwidth.

Because embodiments of the home media server 110 described above are capable of receiving, storing and coordinating content transmitted from both packet switched channels (e.g., TCP/IP) and standard broadcast channels, the transition illustrated in FIG. 8*b* may be accomplished seamlessly, while at the same time improving the overall quality of service to the end user.

Figure 8C:
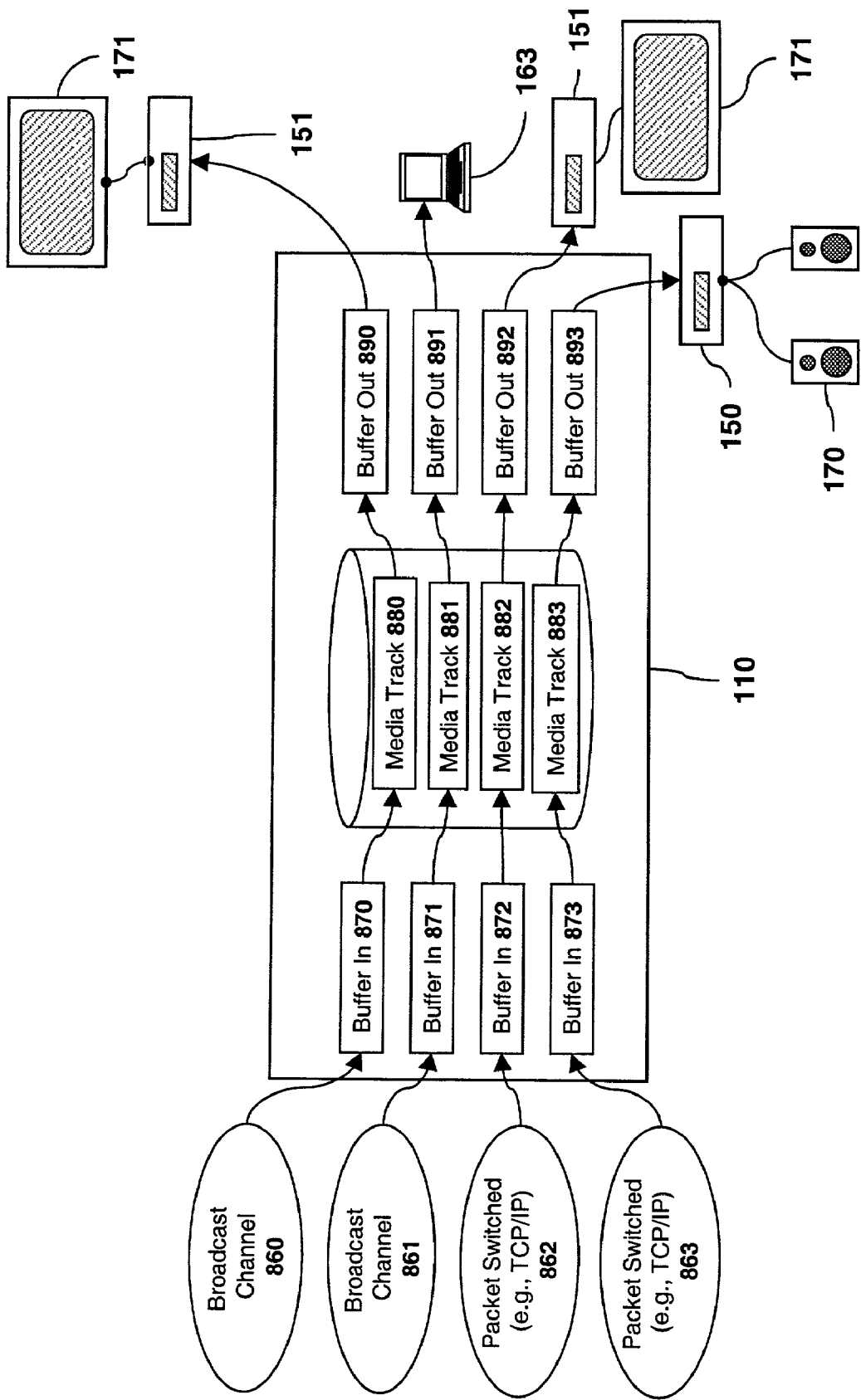
FIG. 8c illustrates multimedia buffering according to one embodiment of the invention.

In one embodiment, several concurrent, real-time multimedia streams are supported by the home media server 110 through buffering and/or disk storage techniques as illustrated in FIG. 8*c*. More specifically, incoming multimedia content 860–862 from several different channels (e.g., standard broadcast channels 860, 861 and packet switched channels 862, 863) may be buffered in a set of input buffers 870–873 and output buffers 890–893 on the home media server 110. The input buffers and output buffers 870–873 and 890–893, respectively, may be portions of memory allocated within the main memory 201 (see FIG. 2). Alternatively, or in addition, the input/output buffers may be configured on the communication modules 240–245, within the system ASIC 210, and/or as separate modules on the home media server 110 motherboard.

In one embodiment, the mass storage device 230 reads the multimedia data from each of the input buffers 870–873 and writes the data to a set of multimedia tracks 880–883. The multimedia data is subsequently read from each of the multimedia tracks 880–883 to a set of output buffers 890–893, from which it is transmitted to one or more of the destination multimedia devices 150, 151, 163. Buffering data streams on the home media server 110 in this manner provides significant cost efficiencies for the entire system. Specifically, because the multimedia data is buffered at a single distribution point within the home media network 140 (i.e., the home media server 110), no buffering is required at each of the individual multimedia devices 150, 151 and 160–166, thereby significantly reducing the cost and complexity of these devices.

The mass storage device 230 of this embodiment has enough bandwidth in its read/write operations to support several multimedia streams at once. Although the seek time of the mass storage device 230 (i.e., the time required to jump from one track to another) may be relatively low (i.e., relative to its read/write bandwidth), buffering of the multimedia data in input and output buffers as described ensures that the various streams will be provided to their respective multimedia devices 150, 151 and 160–166 without interruption.

In one embodiment, each of the multimedia streams 860–863 operate independently of one another. For example, if playback of a particular multimedia stream is paused, e.g., from multimedia device 150, the home media server 110 will interrupt transmission of multimedia content from the output buffer 893 associated with that device 150, and will begin storing subsequent, incoming multimedia content on the mass storage device 230 (e.g., within the media track 883). However, this will not affect playback at any of the other multimedia devices on the network 140. When playback is resumed, the content will be streamed from the output buffer 893 (and media track 883) from the same point at which is was paused (thereby providing real time, time-shifting functionality for live, real-time broadcasts).

In one embodiment, an indexing module (not shown) will generate a content index for users of the home media server 110 which will provide users with a comprehensive, seamless listing of multimedia content from the Internet (e.g., streaming media content), broadcast channels (including live and pre-recorded broadcast channels), asynchronous/isochronous multimedia channels, and/or various other media sources/channels. Accordingly, this embodiment will provide users with the ability to navigate through and select content from a virtually unlimited number of different multimedia sources and channels having any knowledge of the underlying protocols and communication infrastructure supporting the sources/channels.

Intelligent Buffering and Bandwidth Allocation

Virtually all communication channels are bandwidth-limited in some manner, due to the physical limitations of the underlying transmission medium and/or the signaling limitations of the channel (e.g., the channel's allocated frequency spectrum). For example, a 100 Base-T Ethernet network is capable of providing a total data throughput of 100 Mbps, which is shared by all nodes (e.g., computers) on the network. Similarly, multimedia devices 150, 151; 160–166 communicating on the home media network 140 described above all share some maximum network signaling rate (e.g., if a standard IEEE 802.11b network is employed the signaling rate is 11 Mbps).

Because bandwidth is shared on these systems, overall network performance may degrade as a result of nodes performing concurrent, high-bandwidth network transactions. This can be particularly problematic on networks such as the home media network 140 which support real-time multimedia services. More specifically, high quality audio and video signals transmitted from the home media server 110 to multimedia nodes 150, 151, require some minimum level of network bandwidth to be rendered properly (i.e., without distortion or interruption). Accordingly, one embodiment of the invention includes intelligent buffering and bandwidth allocation techniques to ensure smooth playback of the multimedia signal at each of the multimedia nodes 150, 151.

Figure 9A:
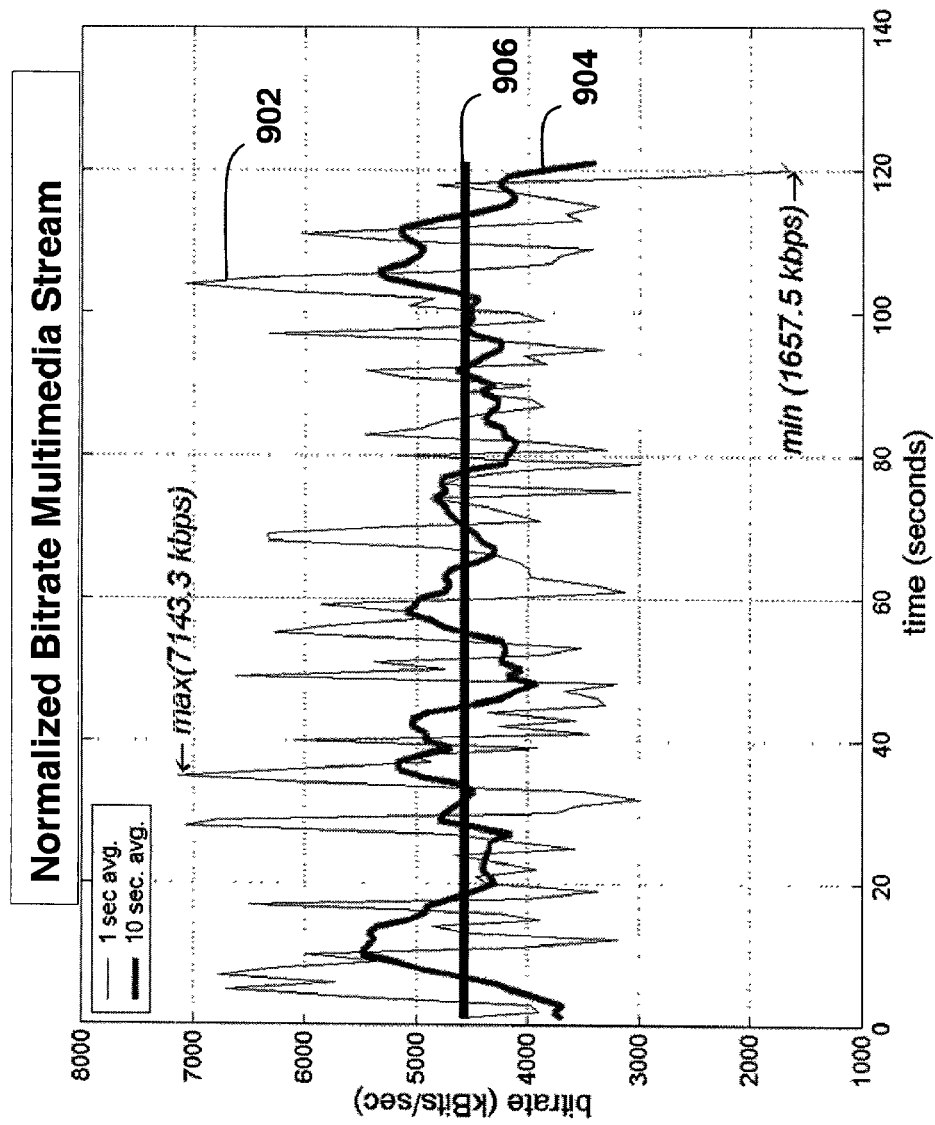
FIG. 9a illustrates a histogram showing a normalized bitrate for a particular multimedia stream.

FIG. 9*a* illustrates a histogram of normalized bitrate data for a particular multimedia stream (e.g., a DVD) over a period of 120 seconds. Curve 902 shows the bitrate averaged at one second intervals whereas curve 904 shows the bitrate averaged at 10 second intervals. The average bitrate over the entire 120 second interval is represented by curve 906 (approximately 4.7 Mbps). Accordingly, based on the histogram data, the effective bitrate required to properly render the video stream at multimedia node 150 fluctuates significantly—from a maximum throughput of 7.143 Mbps to a minimum throughput of 1.657 Mbps.

Figure 9B:
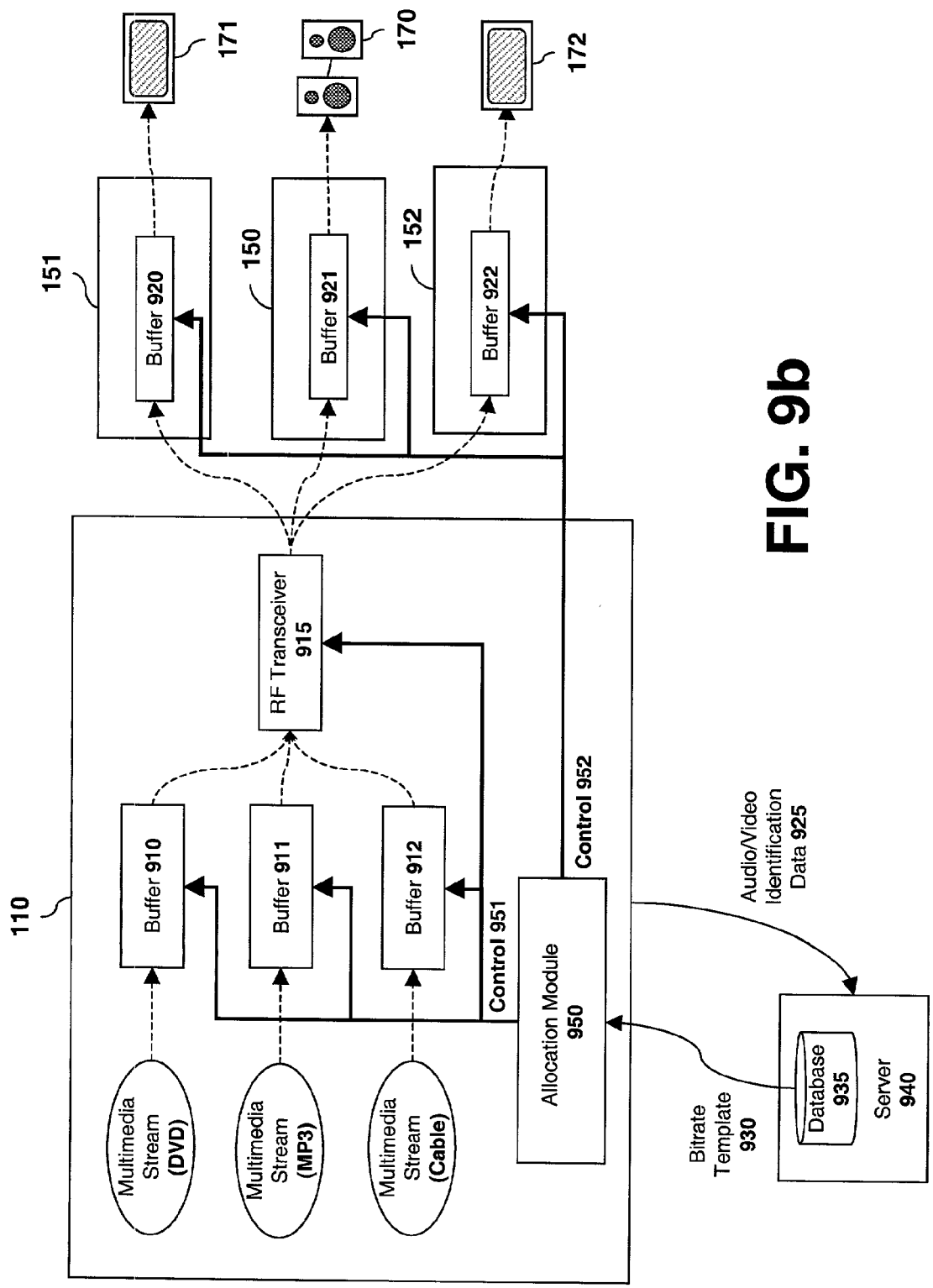
FIG. 9b illustrates one embodiment of a system for intelligent bandwidth allocation and buffering.
Figure 9C:
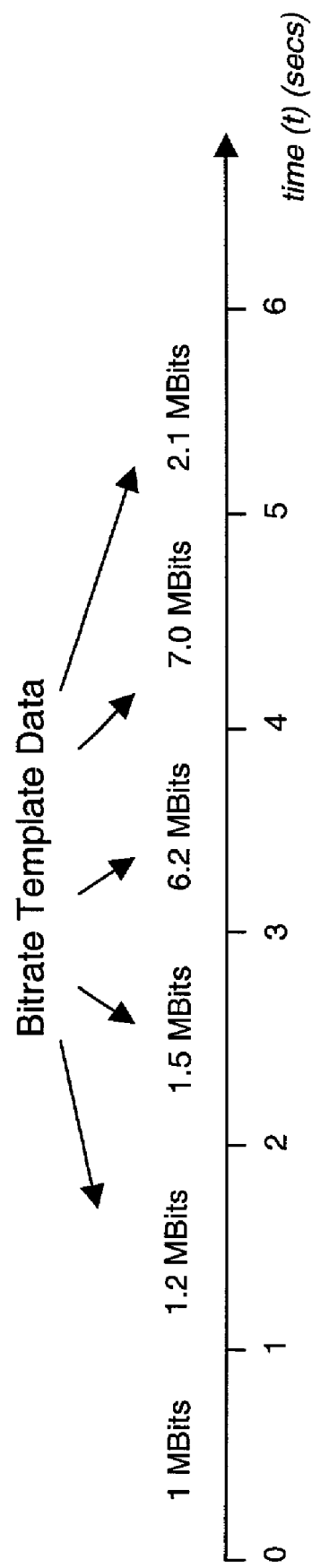
FIG. 9c illustrates bitrate data normalized at one second intervals.
Figure 9D:
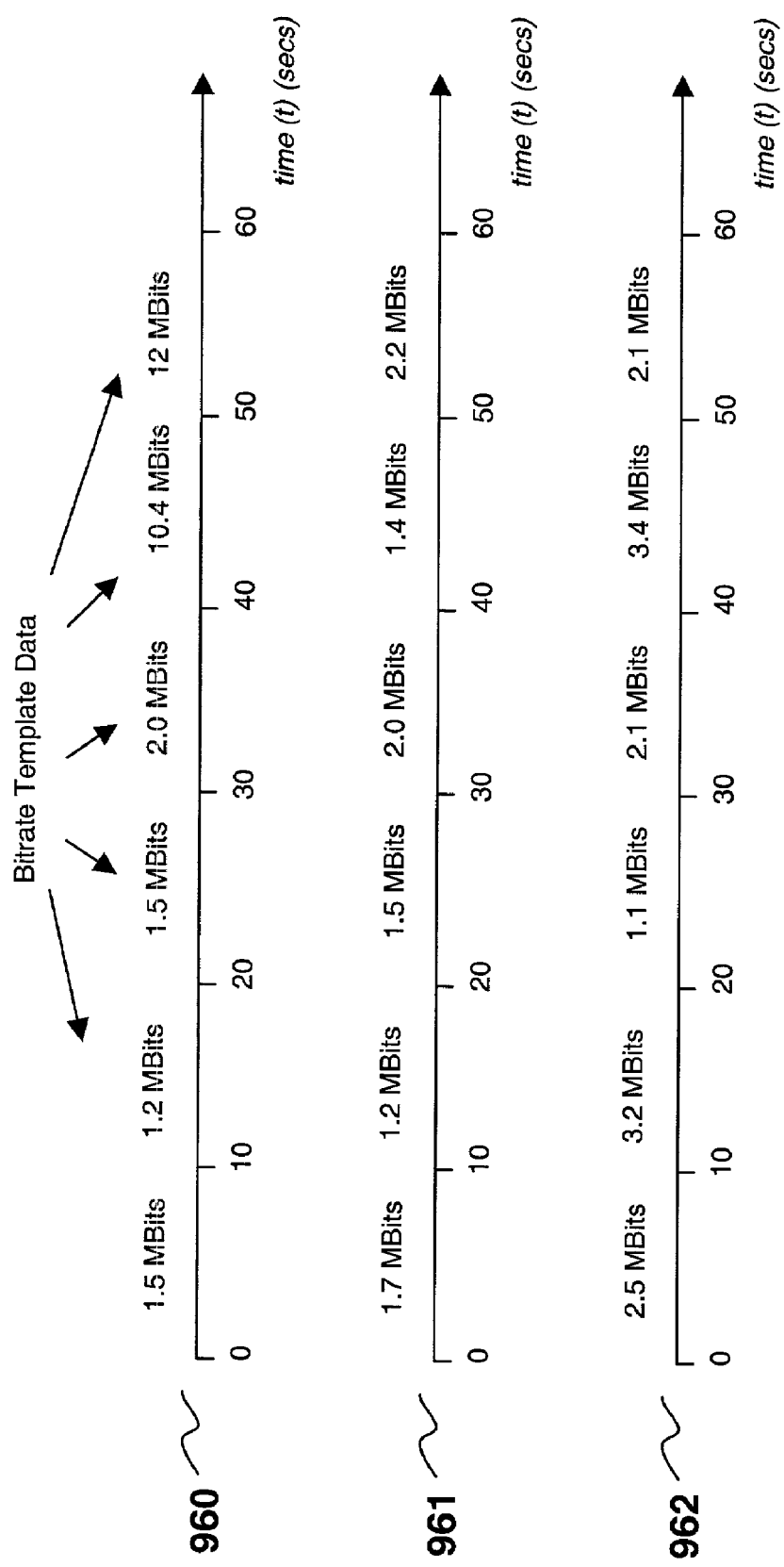
FIG. 9d illustrates bitrate data for three separate multimedia streams normalized at 10 second intervals.

One embodiment of the home media server 110, illustrated in FIG. 9*b*, uses this type of bitrate data to allocate bandwidth and buffering levels for multimedia playback. Accordingly, when a user selects audio or video content (e.g., a DVD) to be transmitted to a multimedia node (e.g., video node 151), the home media server 110 initially retrieves a bitrate template 930 (e.g., a histogram of bitrate data) associated with the requested content from a bitrate database 935. The database 935 may be maintained locally on the home media server 110 and/or, as illustrated, may be maintained on a remote database server 940 (e.g., maintained at the NOC 180). In either case, the database 935 may be continually updated as new multimedia content becomes available. Once the bitrate template 930 is initially downloaded from the remote server 940, a copy may be stored locally on the home media server 110 for future reference. In one particular embodiment, the bitrate template 930 may be transmitted along with the underlying multimedia signal (e.g., embedded within the MPEG-2 stream read from a DVD or broadcast over a cable channel), rather than maintained in a separate database 935.

If the bitrate template 930 is maintained in a database 935, various types of identification data 925 may be used to identify the correct template for the multimedia content being played including, but not limited to, those set forth in co-pending application entitled SYSTEM AND METHOD FOR SCALING A VIDEO SIGNAL, Ser. No. 09/632,458 (incorporated by reference above). For example, a checksum may be calculated for a known unique portion of the multimedia content and compared with checksums stored in the database 935. Similarly, if the content is stored on a CD or DVD, the CD/DVD serial number (or other embedded identification code) may be used to perform a database 935 query. Various other identification techniques may be used to identify the multimedia content while still complying with the underlying principles of the invention. Once the correct bitrate template 930 is identified, it is transmitted from the remote server 940 to the home media server 110. Alternatively, if the data is stored locally on the home media server 110, it is retrieved directly from the home media server's storage device 230.

In one embodiment, an allocation module 950 running on the home media server 110 analyzes the bitrate template 930 to establish an efficient bandwidth allocation and/or buffering policy for transmitting the multimedia stream(s). The allocation module 950 acts as a data "throttle," increasing or decreasing the data throughput from the home media server 110 to the multimedia nodes 150–151 as necessary to meet the bitrate requirements of each multimedia stream (e.g., through control of the home media server output buffers 910–912 and/or RF transceiver 915). The goals of one embodiment of the system are (1) to ensure that the underlying multimedia content is reproduced at the multimedia node 151 without interruption/jitter; (2) to minimize the memory requirements at the multimedia node 151; (3) to minimize the playback delay experienced by the end user; and/or (4) to minimize the bandwidth required to accurately reproduce the multimedia content at the node 151. Any of these goals, alone or in combination, may be factored into the allocation module's 150's bandwidth/buffering allocation policy.

In one embodiment, the allocation module 950 analyzes the bitrate template 930 to ensure that the amount of multimedia content in each multimedia node buffer—e.g., buffer 920 of multimedia node 151—is sufficient to handle upcoming spikes. For example, given the bitrate template data set forth in FIG. 9*c*, the multimedia node buffer 920 must have sufficient multimedia data (i.e., an adequate number of bits) to handle the bitrate spike between 3 seconds and 4 seconds (i.e., 6.2 Mbps). As such, by analyzing the bitrate template 930 as a whole, the allocation module 950 may increase the allocated data throughput between 1 second and 3 seconds to sufficiently fill the buffer 920 by the time the bitrate spike arrives (i.e., at 3 seconds). Thus, the number of bits consumed during the spike (6.2 Meg) must be less than or equal to the number of bits in the buffer at start of spike period (3 seconds) minus the bits added to buffer during spike period (i.e., the per-second bitrate). Otherwise, playback of the multimedia stream will stall due to an underrun condition (i.e., a lack of multimedia data at the multimedia node 151).

The allocation module 950 may also factor in bitrate templates 930 of other multimedia streams when making allocation decisions for a given stream. For example, when making allocation decisions for the DVD stream in FIG. 9*b* (which passes through buffers 910 and 920), the allocation module 950 may evaluate the bitrate requirements of the other two streams (i.e., the MP3 stream and Cable stream passing through buffers 911, 921 and 912, 922, respectively). As such, if one particular stream requires a significant amount of throughput at a given point in time, the allocation module will take anticipatory steps to ensure that sufficient multimedia data will be available. For example, in FIG. 9*d*, the bitrate data illustrated in timeline 960 indicates a severe bitrate spike between 40 and 60 seconds. The spike is severe enough that in order to properly render the multimedia stream associated with it, the allocation module 960 may need to fill the multimedia node buffer by the time the spike arrives (i.e., at 40 seconds) and also divert a significant amount of the system bandwidth to the stream to avoid an underrun condition. As such, in anticipation of the spike, the allocation module 950 may attempt to fill all the buffers on the system including the buffers of the other two streams (associated with the bitrate data shown in timelines 961 and 962) so that by the time the spike arrives, it can divert bandwidth from these streams to the stream with the bitrate spike. It should be noted that the foregoing bandwidth/buffer allocation example was for the purpose of illustration only and should not be read to limit the scope of the invention.

In one embodiment, the when a new playback stream is requested at a multimedia node 151, the allocation module 950 will initially allocate all system bandwidth available at that time to the stream. It will subsequently decrease the bandwidth (i.e., the "throttle") only when other multimedia nodes require additional bandwidth and/or when the buffer at the multimedia node 151 fills up. Accordingly, one goal of this embodiment is to keep the buffer at the multimedia node 151 filled to its limit at all times (e.g., so that it will be ready for upcoming spikes).

Figure 9E:
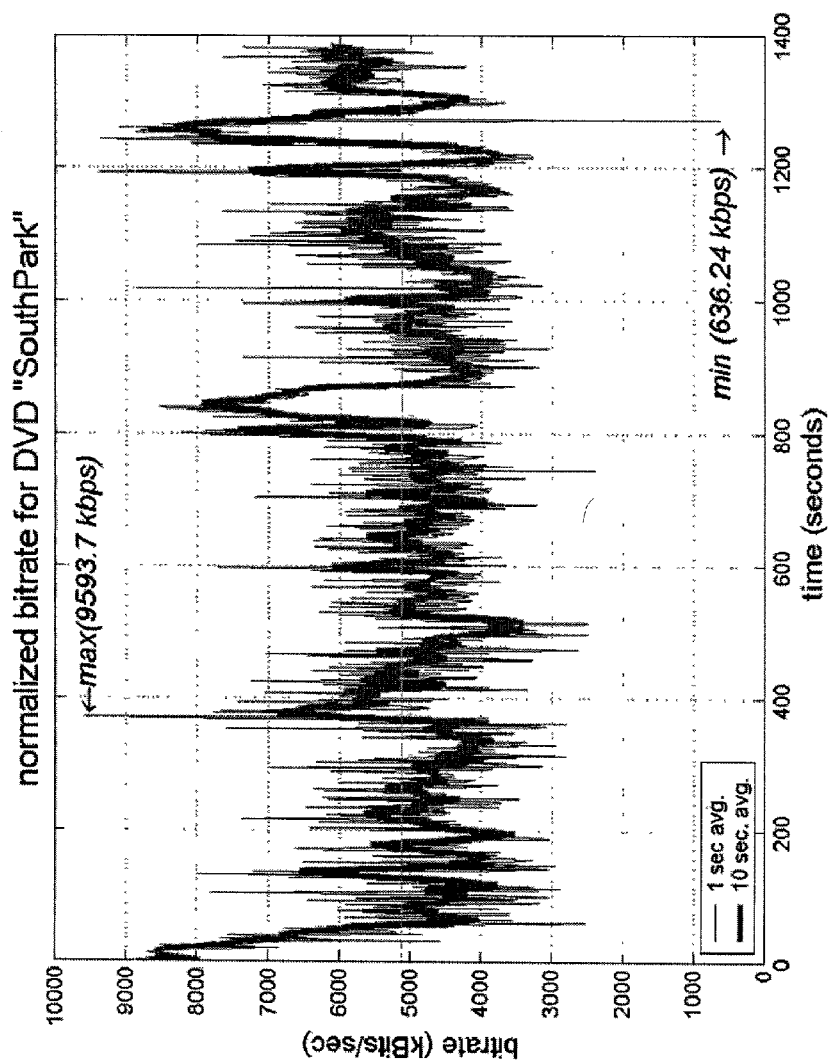

Playback of the multimedia data from the multimedia node buffer 920 may start at different times, depending on the histogram data associated with the content. For example, the bitrate for certain high definition television broadcasts or DVDs such as the one illustrated in FIG. 9e (which shows bitrate data for the movie "South Park") may start off at a relatively high value (i.e., approximately 8.6 Mbps). As such, it may be necessary to accumulate a certain amount of multimedia data in the multimedia node buffer 920 before initiating playback. The table 970 illustrated in FIG. 9e shows the amount of data that must be buffered before playback (column 972), given a particular multimedia stream bitrate (column 971). The table 970 also indicates the amount of time which a user must wait before playback begins (column 973). As indicated in the bottom row of the table 970, at a bitrate of 9 Mbps, no buffering of the multimedia signal is required. In one embodiment, playback is initiated by the allocation module 950 (as indicated by the control signal 952 in FIG. 9b).

Figure 9F:
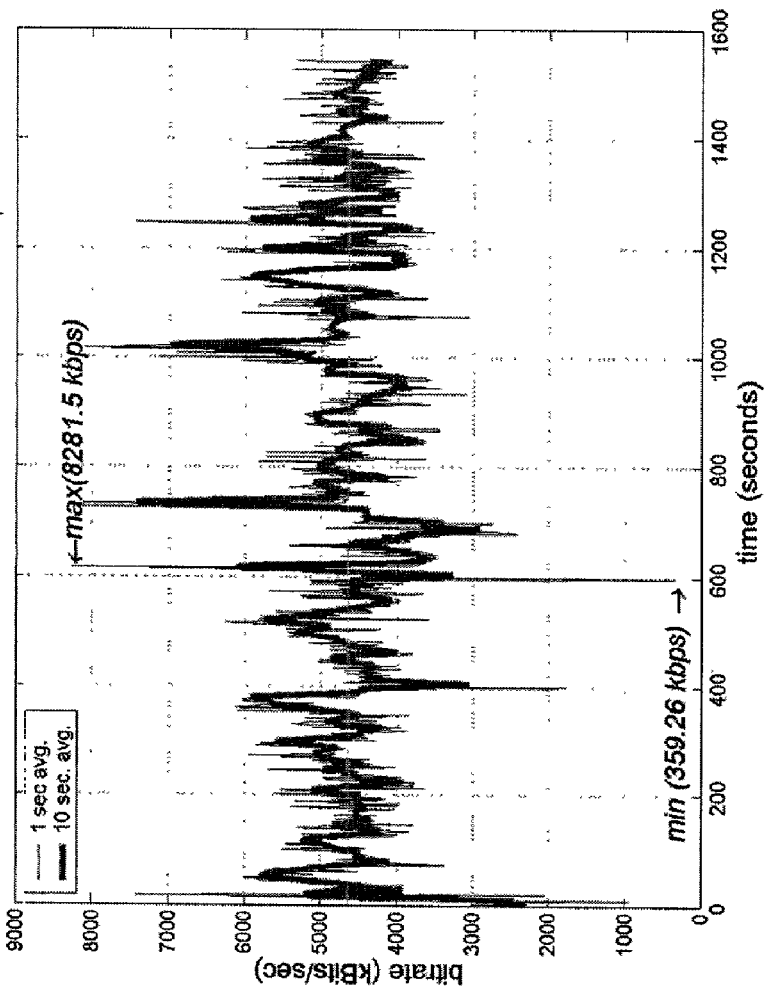
Figure 9G:
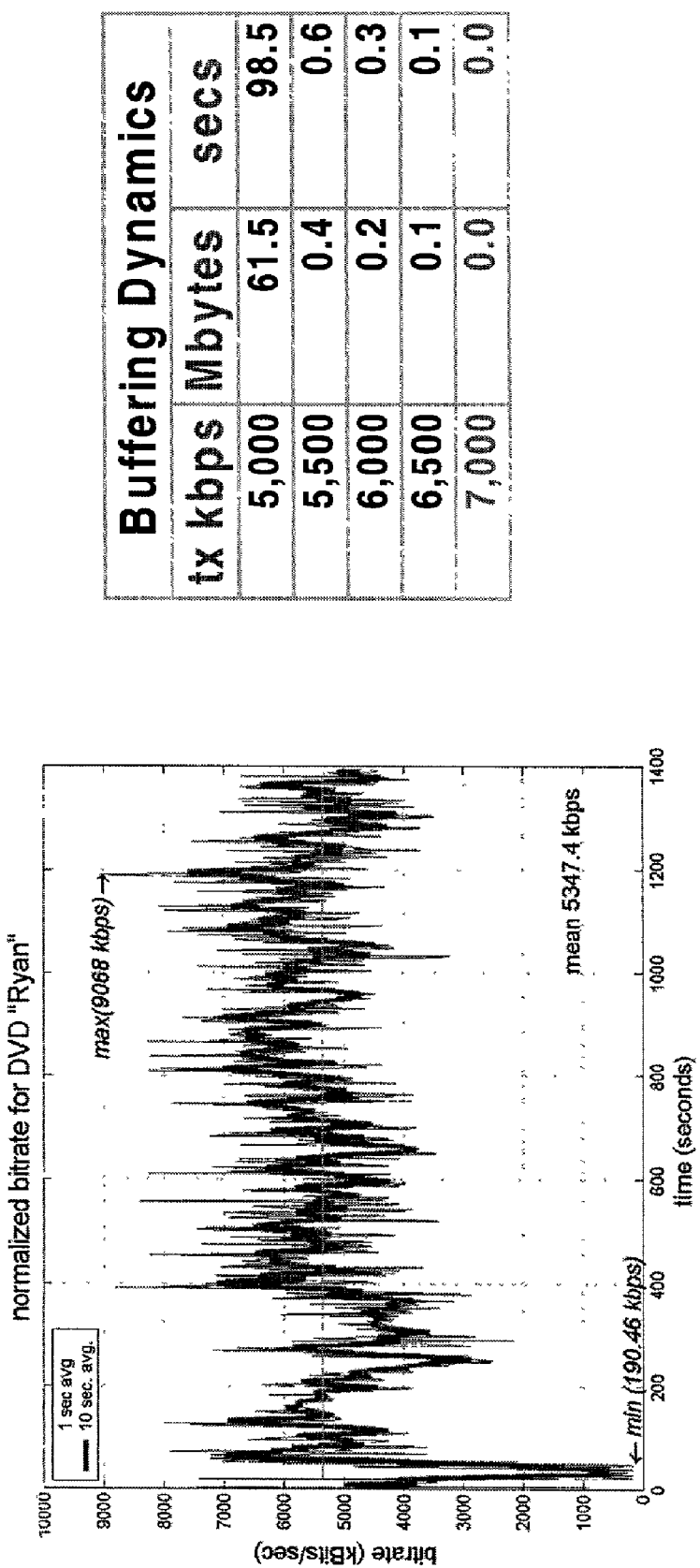
Figure 9H:
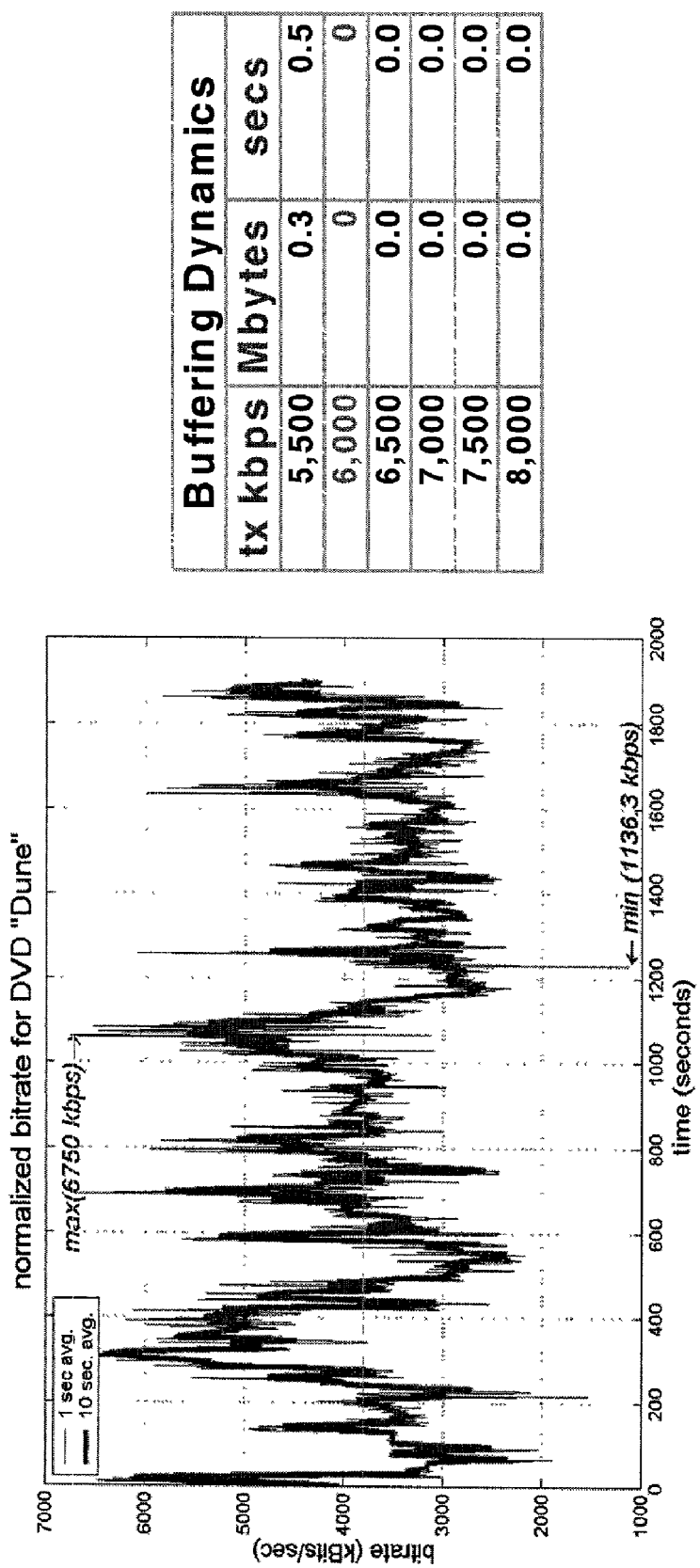
Figure 9I:
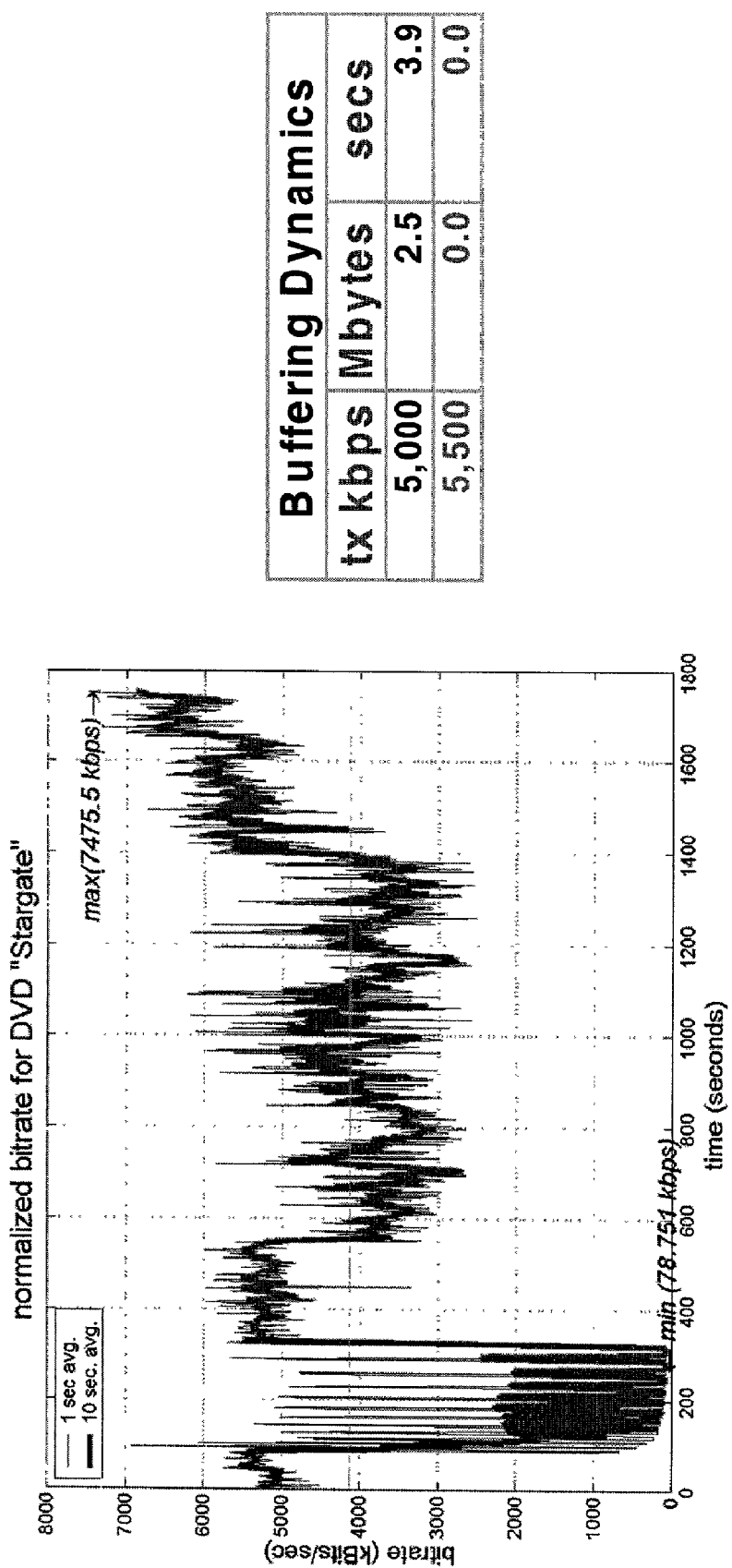
Figure 9J:
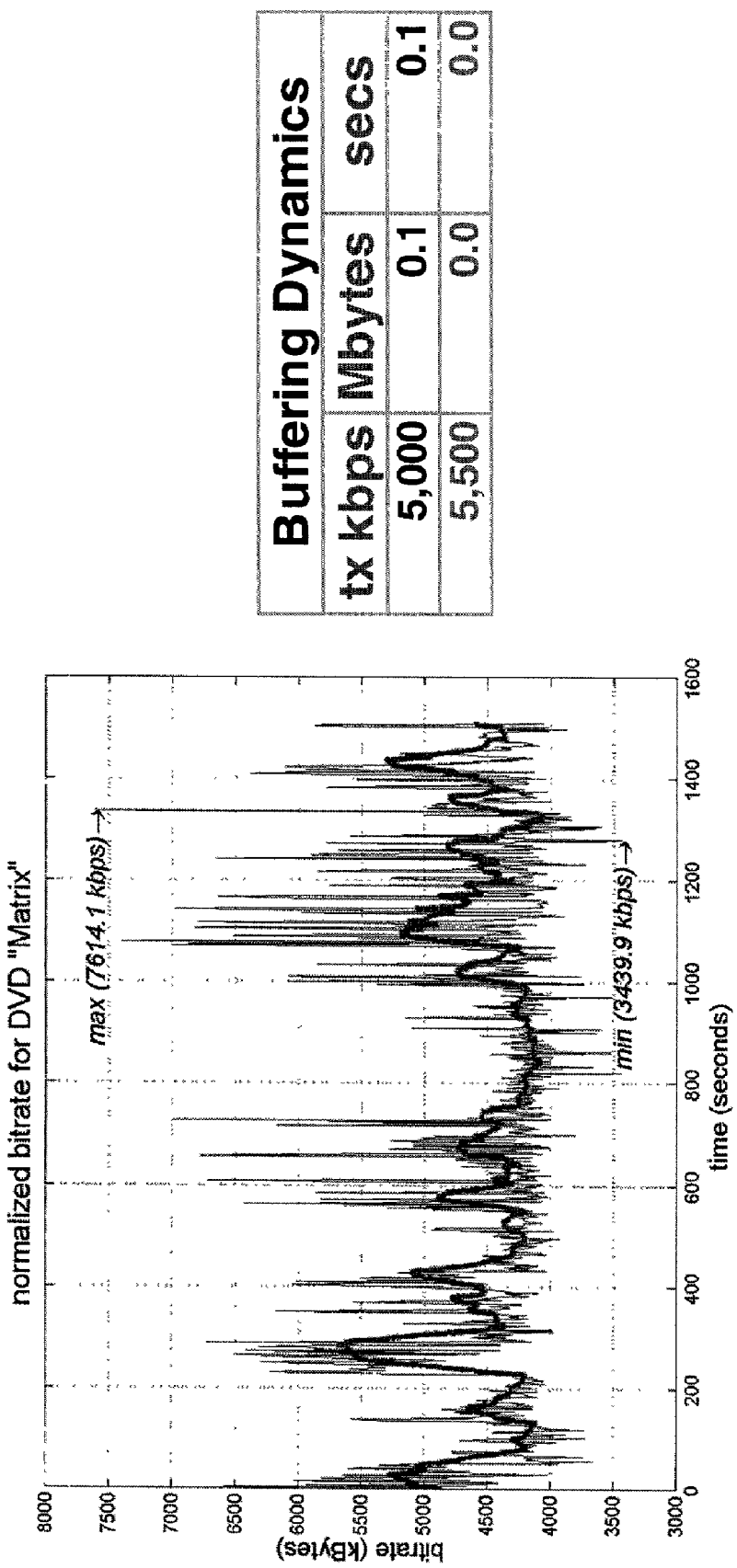
Figure 9K:
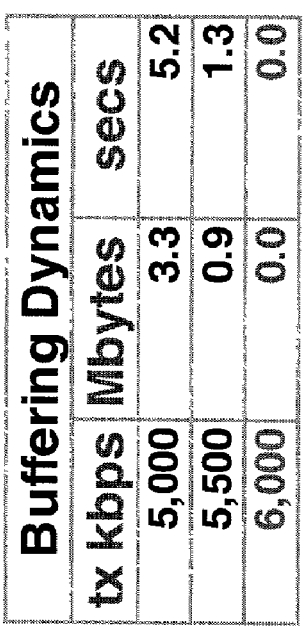
Figure 9K:
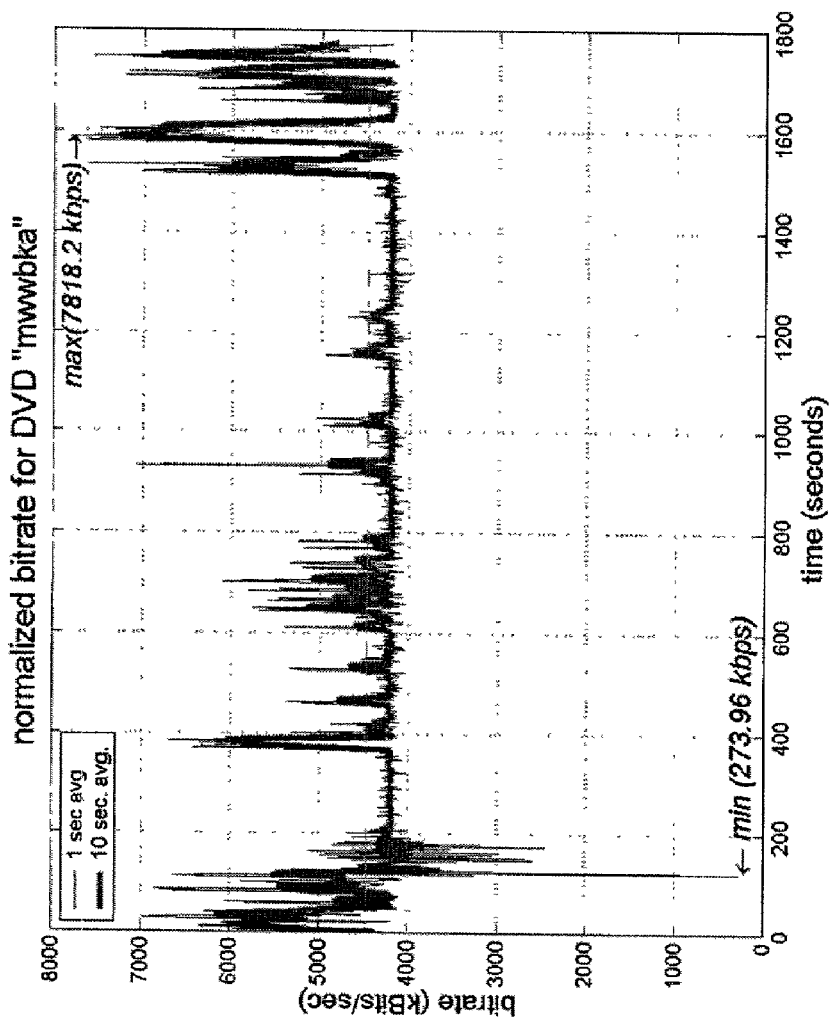
Figure 9I:
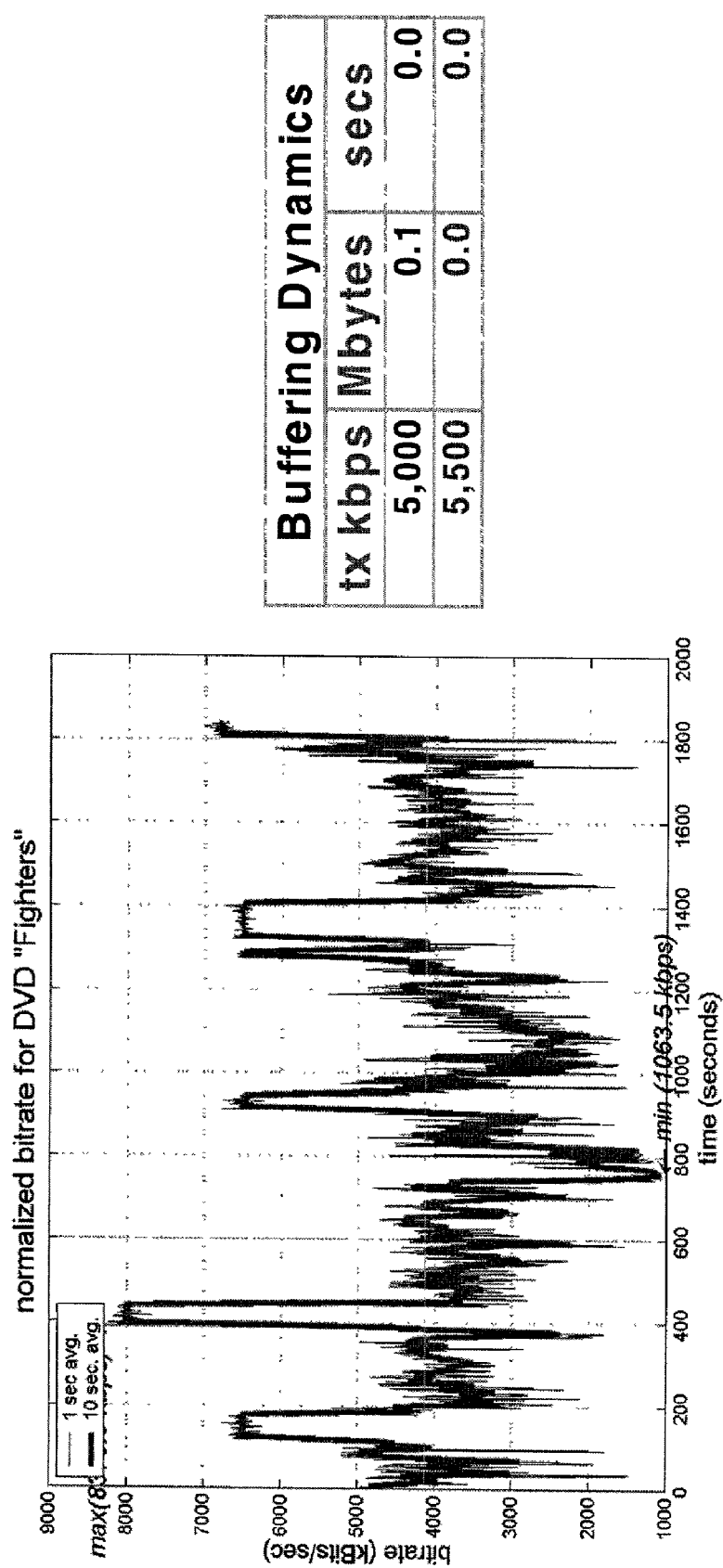
Figure 9M:
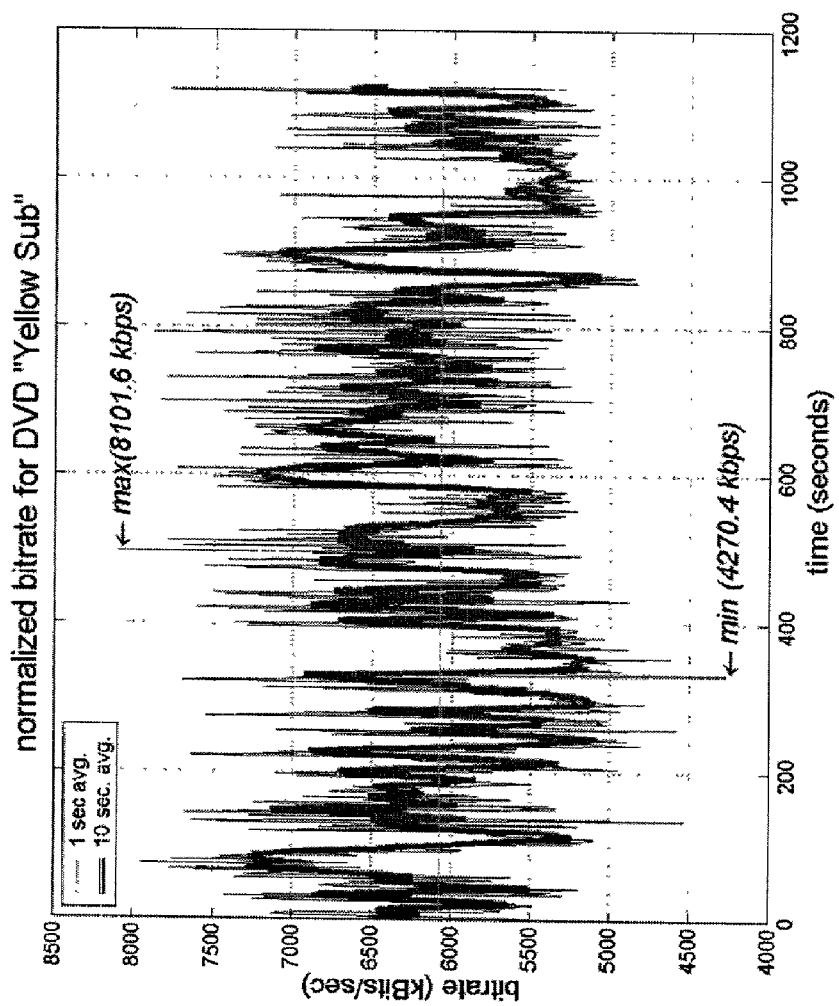

In contrast to multimedia stream described by the histogram of FIG. 9e, the multimedia stream described by the histogram illustrated in FIG. 9f (the DVD for the movie "Species 1") requires significantly less buffering before playback. More particularly, as indicated in table 975, no pre-playback buffering is required at a bitrate of 5 Mbps. As such, if 5 Mbps or more system bandwidth is available, playback may begin as soon as the stream reaches the multimedia node 151. In addition, in one embodiment, the allocation module 950 may initially allocate more bandwidth than required to fill the multimedia node buffer 920 during playback (e.g., so that more system bandwidth may be allocated elsewhere once the buffer is full).

In one embodiment, when a new playback stream is requested from a multimedia node 151, the allocation module 950 may initially allocate just enough system bandwidth to meet some minimum playback delay threshold. Thus, if this; minimum delay threshold is set at 4.5 seconds, the allocation module 650 must allocate at least 7 Mbps to reproduce the multimedia content represented by the histogram of FIG. 9e (see Table 970, 5$^{th}$ row). By contrast, to meet the minimum delay threshold for the multimedia content represented by the histogram of FIG. 9f, the allocation module 950 may allocate a bitrate of less than 5 Mbps (see Table 975). After the initial bandwidth allocation, the allocation module may use the histogram data to ensure that the amount of multimedia content in the multimedia node buffer 920 is sufficient to handle upcoming spikes in bitrate (as described above).

Various additional bitrate histograms and related bandwidth allocation tables are set forth in FIGS. 9g through 9m. It should be noted, however, that these histograms are provided merely for the purpose of illustration, and should not be read to limit the scope of the present invention.

Moreover, although the examples set forth above focus on the reproduction of DVD movies at multimedia nodes on a home media network, it should be noted that the underlying principles of the invention may be implemented on virtually any system in which time-based data is transmitted over a bandwidth-limited network. Accordingly, the scope and spirit of the present invention should be judged in terms of the claims set forth below.

Conditional Access and Encryption

Figure 10:
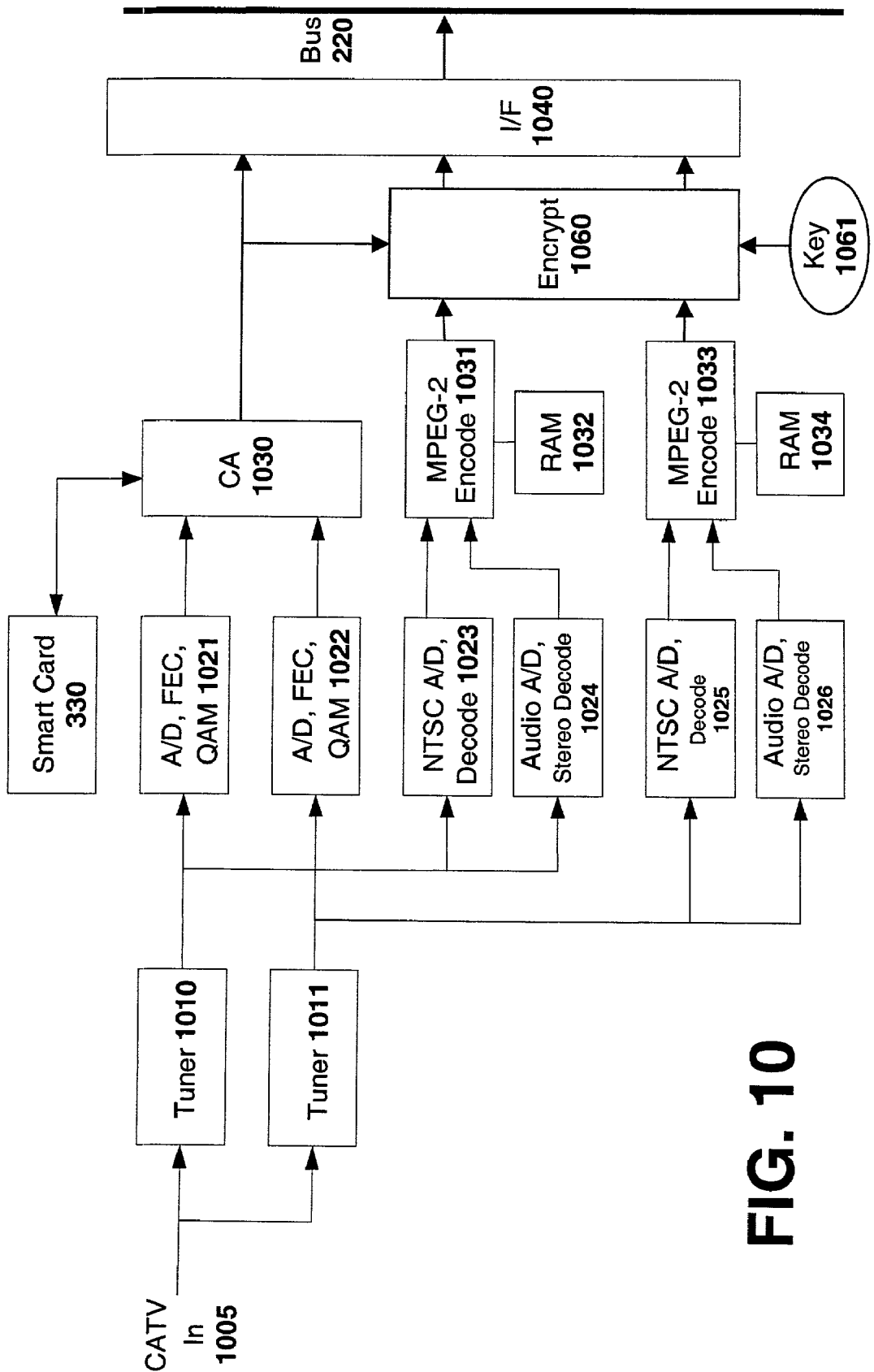
FIG. 10 illustrates a cable television module according to one embodiment of the invention.

One embodiment of a cable broadcast module for receiving one or more broadcast channels is illustrated in FIG. 10. This embodiment includes two tuners 1010, 1011 for concurrently tuning to two separate broadcast channels (e.g., to be viewed at two separate multimedia nodes on the home media network 140). Additional tuners may be included within the cable broadcast module as necessary (i.e., for receiving additional broadcast channels).

In one embodiment of the system, a smartcard 330 (see also FIG. 3) inserted into one or more of the media modules 320–325 may be programmed with a specific set of access rights defining the particular channels to which users are permitted access. The smartcard 330 may work in conjunction with a conditional access module 1030, which will prevent certain channels/content from being transmitted on the system which the user does not have the right to receive. In one embodiment, different members of a family may be assigned smartcards 330 with different access privileges. For example, children may be assigned smartcards 330 which limit the channels and/or Internet sites which they are permitted to access.

In the illustrated embodiment, the signal outputs from each of the tuners 1010, 1011 are fed into separate audio and video analog-to-digital decoder modules 1024, 1026 (audio) and 1023, 1025 (video), respectively. In one embodiment, the signals are then re-encoded with a compression codec. For example, in the embodiment shown in FIG. 9, MPEG-2 encoder modules 1031, 1033 encode the audio/video signals into MPEG-2 format (i.e., which may subsequently be decoded by any multimedia devices 150, 151 on the home media network 140). It should be noted that various other digital compression codecs may be used (e.g., AC-3, MPEG-1, . . . etc) while still complying with the underlying principles of the invention.

In addition, in one embodiment, before being transmitted onto the system bus 220, the encoded multimedia signals are encrypted by an encryption module 1060 using a unique encryption key 1061. As such, in this embodiment, all multimedia data stored on the home media server 110 (i.e., on the mass storage device 230) and transmitted across the home media network 140 are encrypted, thereby preventing copying and playback by any unauthorized devices listening in one the network 140 or on the system bus 220. Moreover, authorized multimedia devices 150, 151, 160–166 (i.e., those certified by the NOC 180) communicating on the home media network 140 are configured with the same unique encryption key 1061, thereby allowing them to properly decode the multimedia data transmitted from the home media server 110.

In one embodiment, the encryption key 1061 is transmitted securely to the home media server 110 and media devices 150, 151; 160–166 through the conditional access system. Alternatively, or in addition, the key 1061 may be transmitted using conventional secure communication techniques such as Secure Sockets Layer ("SSL") or Data Encryption Standard ("DES").

Figure 11:
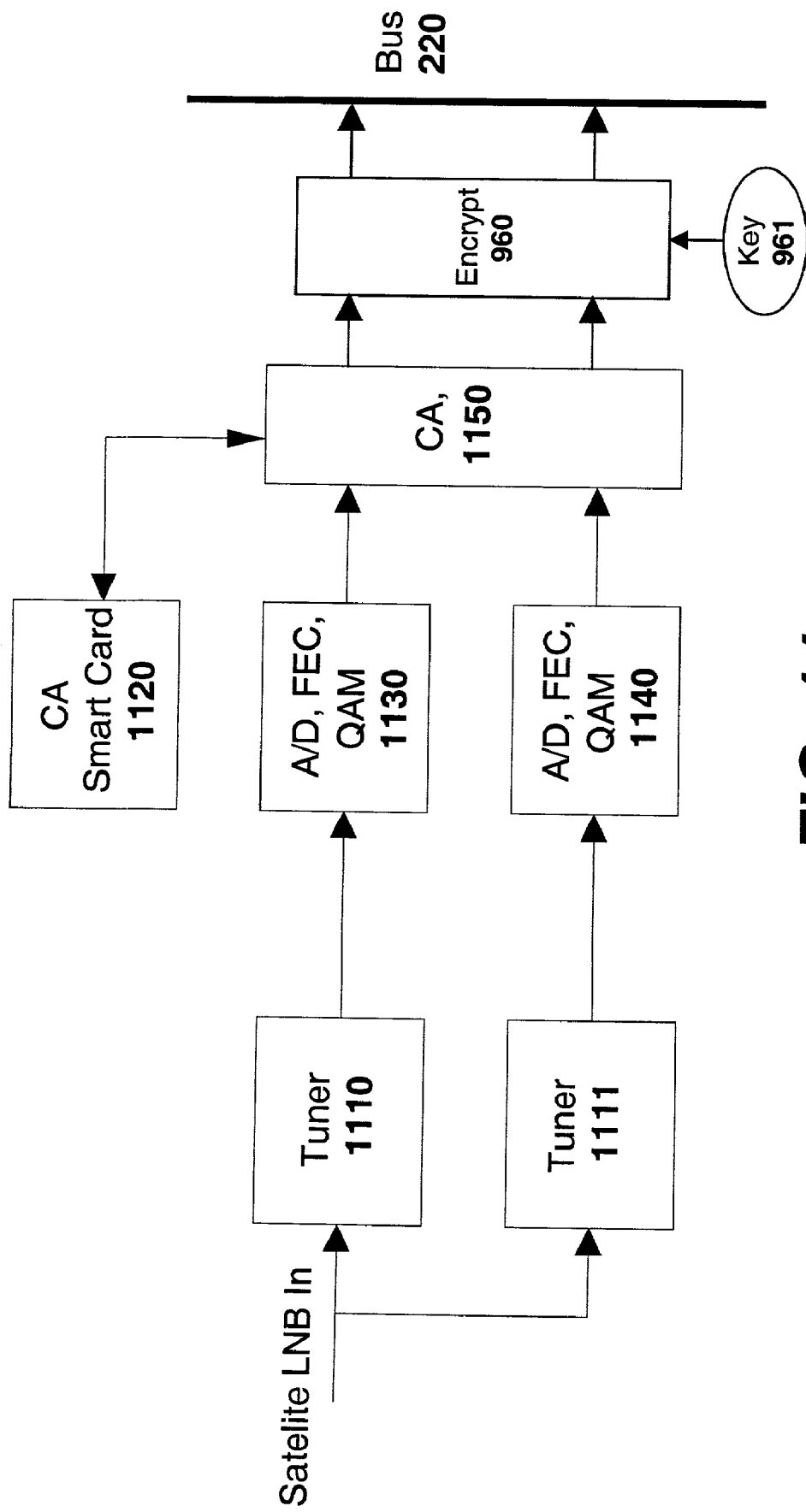
FIG. 11 illustrates a satellite module according to one embodiment of the invention.

One embodiment of a satellite module for connecting the home media server 110 over a satellite channel is illustrated in FIG. 11, including multiple tuners 1110, 1111; forward error correction modules 1130, 1140; a smartcard 1120 and associated conditional access module 1150; and an encryption module 960 for encrypting content transmitted onto the system bus 220 (and across the home media network 140). The different decoding, encryption, and authentication features described above with respect to the cable broadcast module illustrated in FIG. 9 are also configured into one embodiment of the satellite module.

Figure 12:
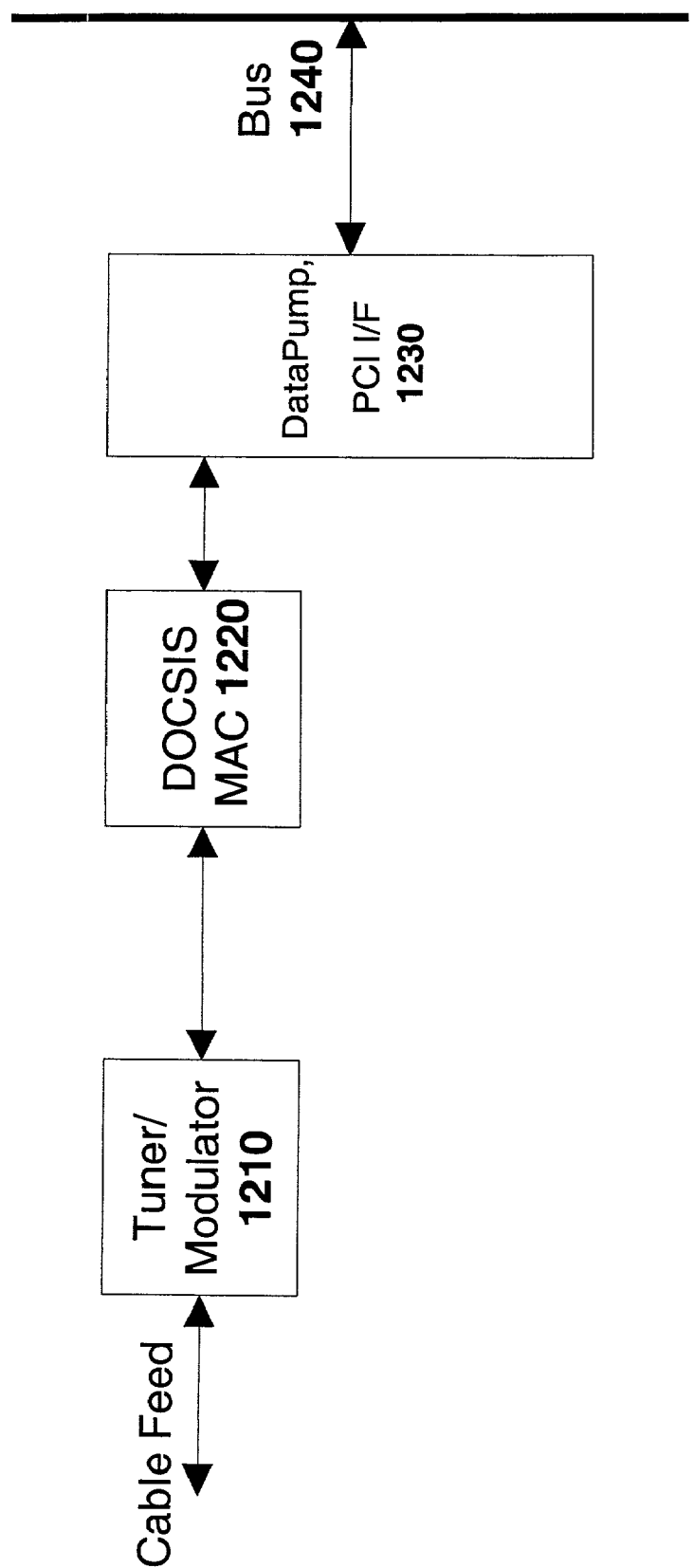
FIG. 12 illustrates a cable modem module according to one embodiment of the invention.

One embodiment of a cable modem for connecting the home media server 110 over a cable channel is illustrated in FIG. 12. The cable modem includes a modulator unit 910, a Data Over Cable Service Interface Specification ("DOCSIS") module 920, and a data pump/PCI interface unit 930. Various different types of cable modems may be coupled to the home media server 110 while still complying with the underlying principles of the invention.

Figure 13:
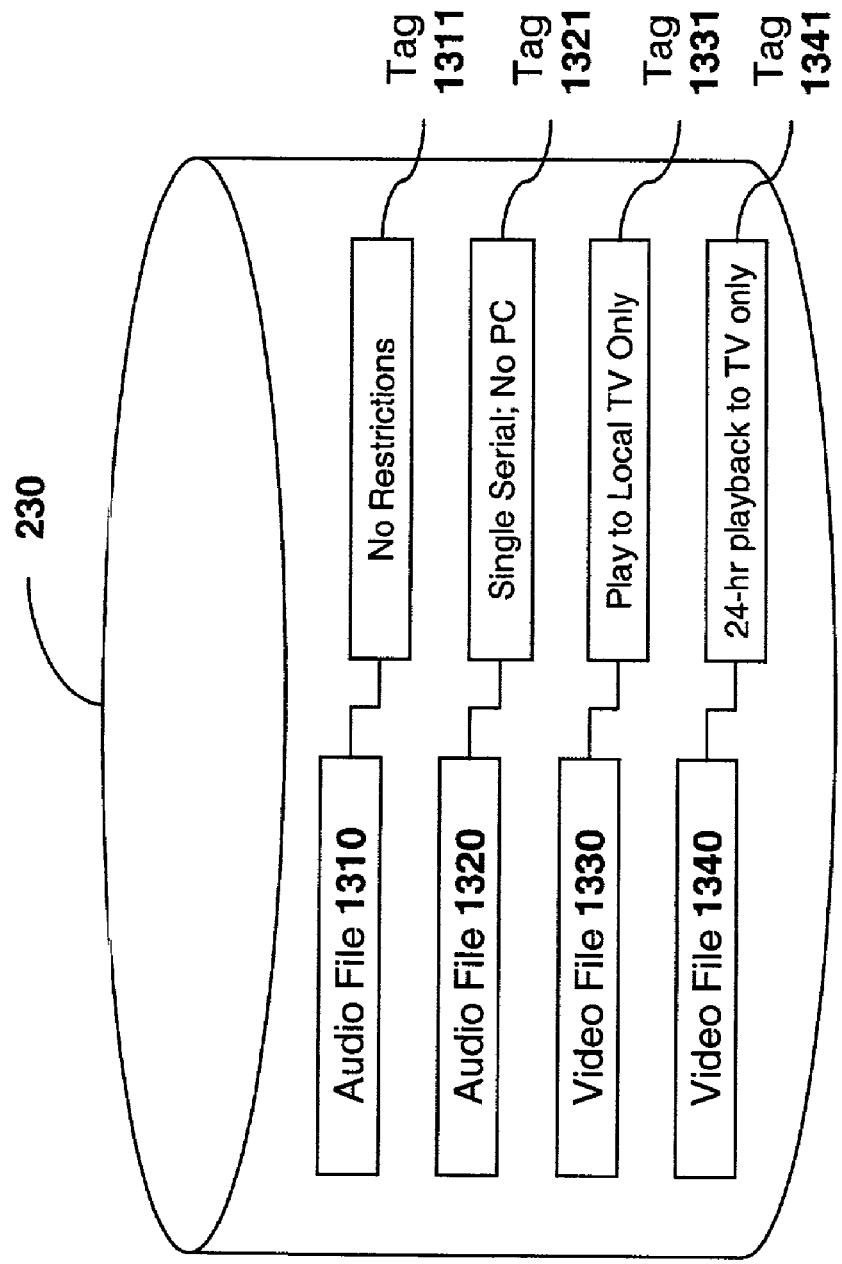
FIG. 13 illustrates copyright tags implemented in one embodiment of the invention.

In addition to the encryption system described above, one embodiment of the system provides copyright protection through the use of copyright tags associated with content stored on the home media server 110. The tags of this embodiment identify which types of content/information may be copied or streamed to which multimedia devices. As illustrated in FIG. 13, tags may be set to a variety of copy/playback levels, including, for example, a tag 1311 indicating no restrictions on copying for audio file 1310; a tag 1321 allowing only a single serial copy (e.g., to a CD-RW disk) with no copying to personal computers for audio file 1320; a tag 1331 permitting playback to local TVs (i.e., within the home media network 140) for video file 1330; and a tag 1341 allowing 24-hour playback to local TVs only (e.g., similar to a pay-per-view feature) for video file 1340. Accordingly, this embodiment provides an additional mechanism for providing secure storage and transmission of copyrightable material. In one particular embodiment, content providers (e.g., cable and satellite providers) are provided with the ability to program tags into their content as necessary.

A System and Method for Multimedia Stream Conversion

Introduction

In one embodiment of the invention, the Media Server 110 or other multimedia receiver system (e.g., a standard cable/satellite receiver) is configured to process and render audio, video and sub-picture content from a DVD using a transport stream decoder. Certain relevant features of MPEG compression, MPEG transport and program streams, and supplemental DVD media types and metadata will now be provided followed by a detailed description of embodiments of the invention.

MPEG Compression

Figure 14:
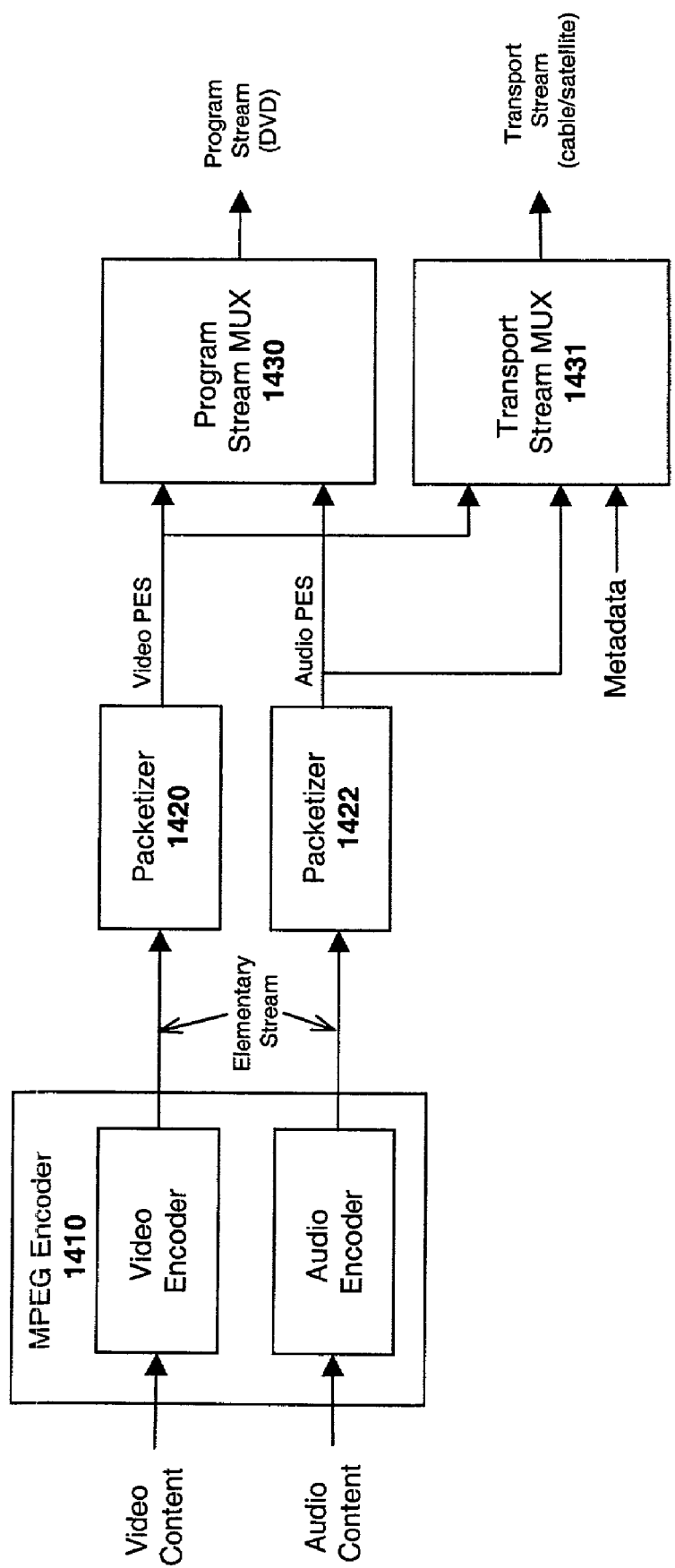
FIG. 14 illustrates transport stream and program stream generation from packetized elementary streams.

As illustrated in FIG. 14, an MPEG2 "elementary stream" is the raw MPEG-compressed audio/video data generated by an MPEG-2 encoder 1410. The MPEG-2 encoder exploits both spatial redundancies and temporal redundancies in the video images provided at its input. Spatial redundancies are exploited by using field-based Discrete Cosine Transform ("DCT") coding of 8×8 pixel blocks followed by quantization, zigzag scan, and variable length coding of runs of zero-quantized indices and amplitudes of those indices. Quantization scaling factors and quantization matrices are used to effectively remove the DCT coefficients containing perceptually irrelevant information, thereby increasing the MPEG-2 coding efficiency. Temporal redundancies are exploited by inter-coding, or transmitting only the differences between pictures. A "macroblock" is the graphical unit used for temporal calculations and is comprised of four 8×8 luminance (grayscale) (Y) components and two 8×8 chromatic (color) components (one for Cb and one for Cr).

In MPEG-2, three different types of "frames" or "pictures" are used to exploit the spatial and temporal redundancies of the sequence of video frames while minimizing error propagation:

"I frames" or "I pictures" are individually DCT-coded pictures that need no additional information for decoding. As such, they require a significant amount of data compared to other frame types, and therefore they are not transmitted any more frequently than necessary. I frames consist primarily of DCT transform coefficients and have no vectors (i.e., only spatial redundancies are exploited to generate I frames).

"F frames" or "P pictures" are forward-predicted from an earlier frame, which could either be an I frame or another P frame. P frame data consists of vectors describing where, in the previous frame, each macroblock should be taken from, and not of transform coefficients that describe the correction or difference data that must be added to that macroblock. P frames require roughly half the data of an I frame.

"B frames" or "B pictures" are bi-directionally predicted from earlier or later I or P frames. B-frame data consists of vectors describing where in earlier or later frames, data should be taken from. It also contains the transform coefficients that provide the correction. Because bidirectional prediction is so effective, the correction data are minimal and this helps the B frame to typically require one quarter the data of an I frame.

Packetized Elementary Streams

Audio and video PES packetizers 1420 and 1422, respectively, split each elementary stream into variable-length packets to form a Packetized Elementary Stream ("PES"). Each PES packet includes a header which contains information about the encoding process required by the MPEG decoder (e.g., such as an indication as to whether the packet contains audio or video content). In addition, in order to keep the audio and video locked together, time stamps are periodically incorporated within PES packets. A PES time stamp is a 33-bit number that is a sample of a counter driven by a 90-kHz clock.

Transport Streams and Program Streams

To create a transport stream, a transport stream multiplexer 1431 splits PES packets into fixed-length 188 byte transport stream packets with a minimum 4-byte header and a maximum 184-byte payload. In addition, a significant amount of metadata is multiplexed in the transport stream. For example, during the formation of a transport stream, program specific information ("PSI") packets may be inserted containing tables required to demultiplex the transport stream and conditional access ("CA") tables may be inserted containing information needed by the receiver to decrypt certain programs (e.g., subscription-based programs such as HBO). In order to keep the bitrate constant at the receiver, null packets containing "stuffing" bytes may also be inserted to fill the intervals between information-bearing packets.

The different programs multiplexed within the transport stream may have originated in different places that are not necessarily synchronized. As such, the transport stream must provide a separate synchronization mechanism for each transmitted program. To this end, 33-bit sequential program clock reference ("PCR") values are inserted into the optional header fields of certain transport stream packets. The PCR values recreate a stable reference clock that can be divided down to create a time line at the decoder, so that the time stamps for the elementary streams in each transport stream become meaningful. Consequently, one definition of a "program" within a transport stream is a set of elementary streams sharing the same timing reference.

As described in ISO/IEC 13818-1, the program stream was designed for use in relatively error-free environments and is particularly suitable for applications which may involve software processing of system information (e.g., such as DVD applications). Program stream packets may generally be of a variable length. The DVD specification calls for program stream packets of 2048 bytes in length.

The program stream generated by a program stream MUX 1430 is a multiplex of PES packets that, unlike the transport stream, were all encoded using a common time reference (i.e., the same master clock or system time clock). The timestamps embedded within program stream packets are known as system clock reference ("SCR") values. Like the PCR values used within the transport stream, SCR values are 33 bits in length. However, as will be described in detail below, as a user navigates through multimedia content stored on a DVD the SCR values for program packets read from the DVD are not necessarily consecutive.

A DVD program stream may depart from the MPEG specification in that multiple "programs" (in the sense of multiple sets of elementary streams, each set sharing a timing reference independent of the other sets) are allowed as interleaved units. If present, these extra streams share the same stream ID, making them completely unplayable by any strictly conforming program stream decoder or transport stream decoder, without the repacketizing techniques described below.

Additional DVD Media Types and Metadata

As mentioned above, in addition to the raw program stream packets stored on a DVD, the DVD specification defines additional media types and data structures that are not part of the MPEG specification. In particular, non-MPEG audio formats (e.g., AC-3, PCM, DTS, . . . etc), subpicture data, and navigation packs are packaged in private data stream PES packets whose payload format is outside of the MPEG specification. Each DVD-Video disc also includes a main directory known as the VIDEO_TS directory which contains two types of files: ".IFO" files and ".VOB" files (i.e., indicating the file extension). During playback, these files are sorted by a DVD video player to form video "title" sets, which are groupings of all files necessary to play a particular DVD video "title" (e.g., a movie). Each video title set is composed of one .IFO file and one or more .VOB files.

The .VOB file(s) which contain the underlying multimedia data and are referred to as the video object set (VOBS). The location and format of the multimedia data stored in the VOBS is defined by the associated .IFO file. More specifically, the .IFO file contains the navigational data structures and a processor-independent interpreted language which specifies how the data structures are arranged.

The data structures themselves are composed of various objects known as "program chain objects," "program objects," and "cell objects." Program chain objects link related program objects (e.g., particular scenes) within a title and thereby govern the playback of the program objects. Programs, in turn, point to one or more cells for presentation. A particular title may contain only a single program chain. More complex titles may contain two or more program chains to allow random access to a variety of programs. As will be described in greater detail below, the cells allocated within a single program or between different programs may be connected seamlessly (i.e., using a common time base) or non-seamlessly (i.e., using different, unrelated time bases).

Figure 15:
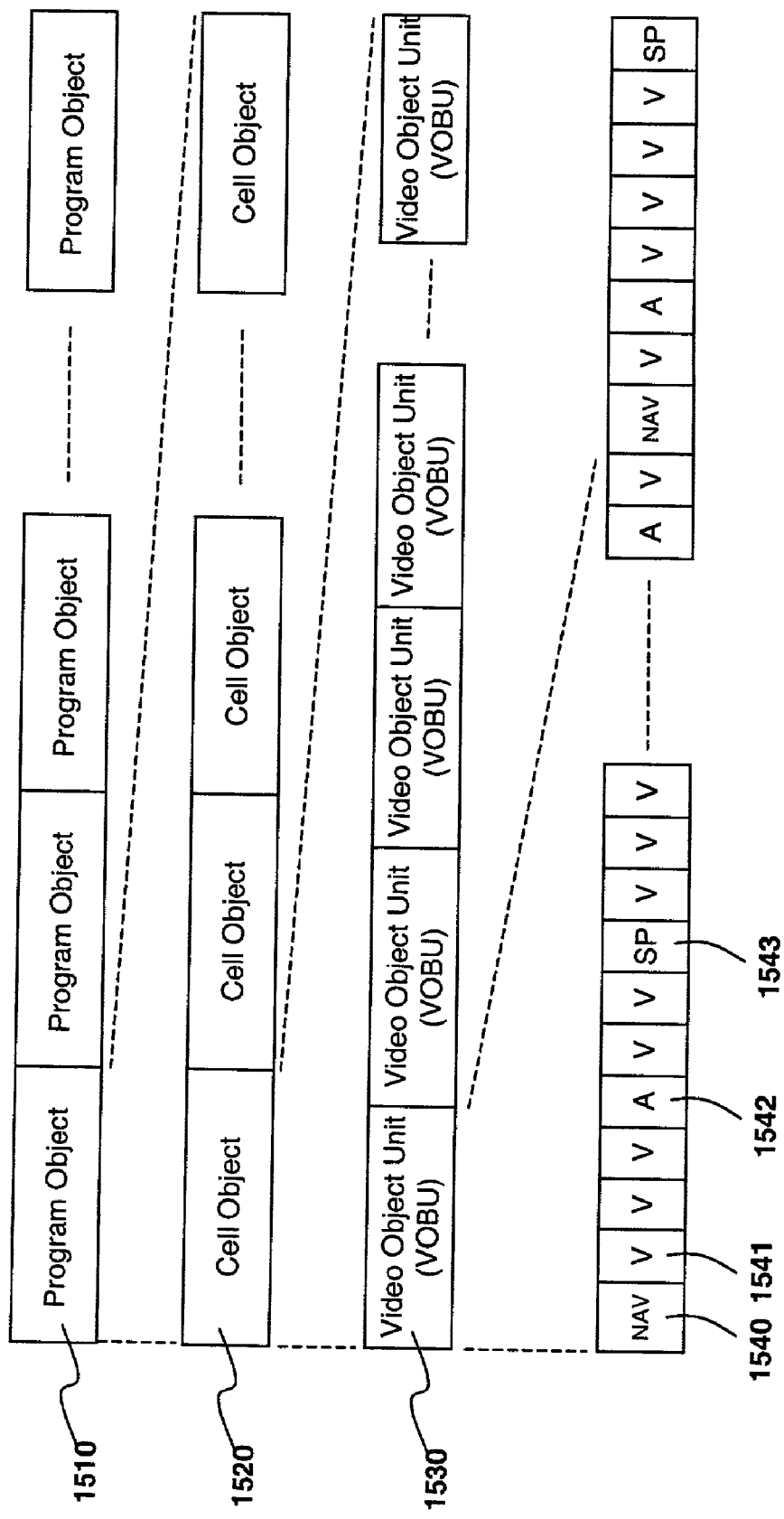
FIG. 15 illustrates the manner in which audio, video and subpictures are stored on a digital versatile disk (DVD).

As indicated in FIG. 15, each program object 1510 in a program chain is composed of "cell objects" 1520 which identify to a DVD player the portion of the multimedia data to decode from one of the .VOB files. The data structures within cell objects 1520 are defined in the .IFO file. Each cell object directs the DVD player to begin playback at a specific location in the .VOB file referred to as a video object unit (VOBU) 230. A VOBU is a container object that includes a navigation header 1540, referred to as a navigation pack, audio and video program stream packets 1541 and 1542, respectively, and packets containing sub-picture data 1543. The navigation header 1540 includes the presentation control information (PCI) and data search information (DSI) mentioned above.

EMBODIMENTS OF THE INVENTION

Figure 16A:
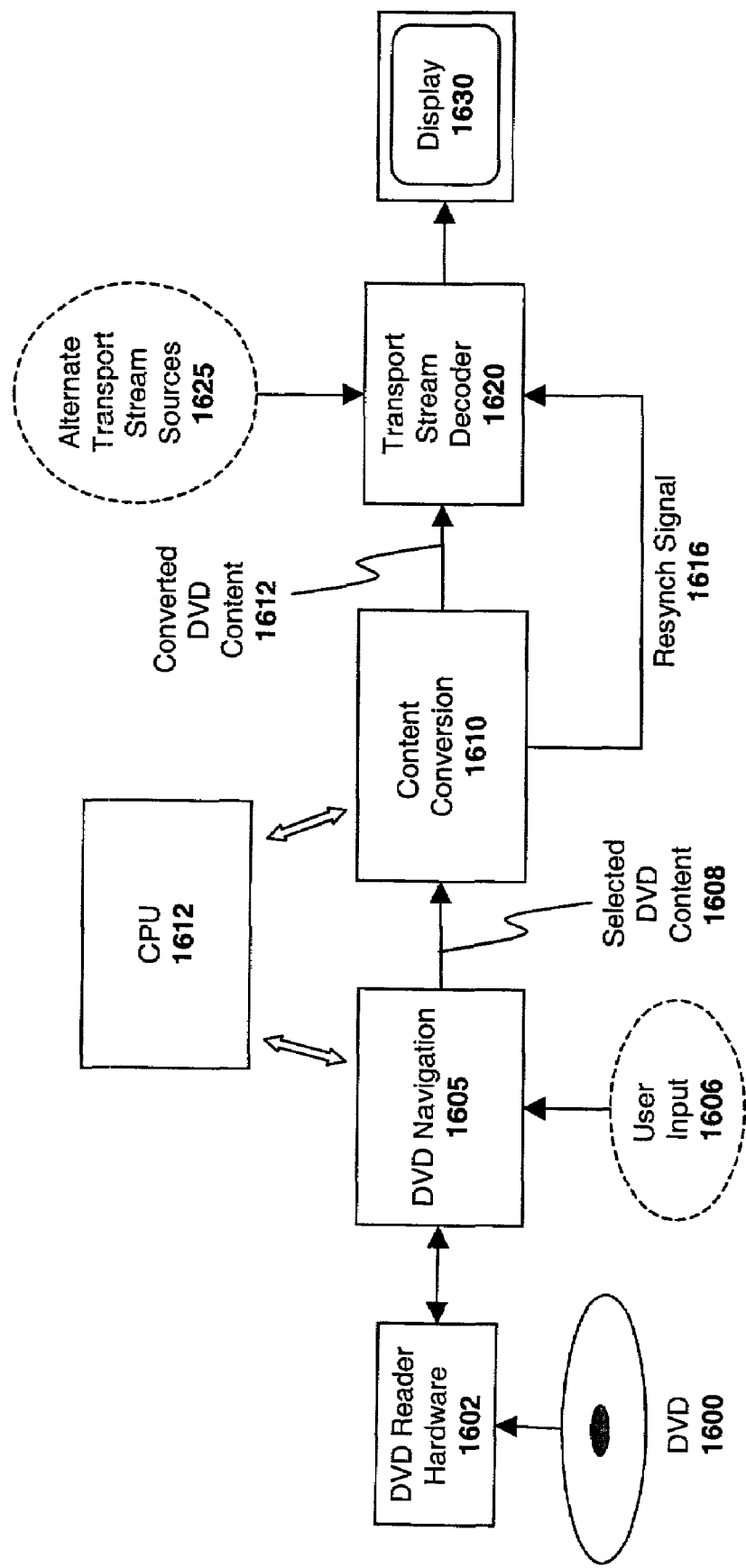
FIG. 16a illustrates one embodiment of the invention for multimedia stream conversion.

FIG. 16*a* generally illustrates one embodiment of a multimedia system configured to process and render audio, video and sub-picture content from a DVD 1600 using a transport stream decoder 1620. In response to user input selections 1606 and navigation data stored on the DVD 1600 (e.g., contained in the .IFO files), a DVD navigation module 1605 navigates a play path through the DVD 1600 via DVD hardware 1602. The DVD hardware 1602 is comprised of well known optical and mechanical components required to read content from a DVD. The content selected by the DVD navigation module 1605 is transmitted to a content conversion module 1610 which translates the DVD content into a format which the transport stream decoder 1620 can process and render on a display 1630 (e.g., a standard television display, a computer display, . . . etc). In addition, in one embodiment, a resynchronization signal 1616 is generated by the content conversion module 1610 to cause the transport stream decoder 1620 to resynchronize with the converted DVD content 1612 under certain conditions, described in detail below.

In one embodiment, the DVD navigation module 1605 and content conversion module 1610 are implemented in software executed by a central processing unit ("CPU") 1612 configured within a PVR system or standard multimedia receiver system. It should be noted, however, that the DVD navigation module 1605 and content conversion module 1610 may be implemented in hardware, or any combination of hardware and software while still complying with the underlying principles of the invention.

As indicated in FIG. 16*a*, in addition to processing converted DVD content 1612, the transport stream decoder 1620 may also process transport streams from one or more alternate sources 1625. The alternate transport stream sources 1625 may include, for example, cable and satellite channels received by the multimedia receiver system on which the transport stream decoder 1620 is configured (e.g., such as the Media Server 110 or standard video receiver systems described above).

Figure 16B:
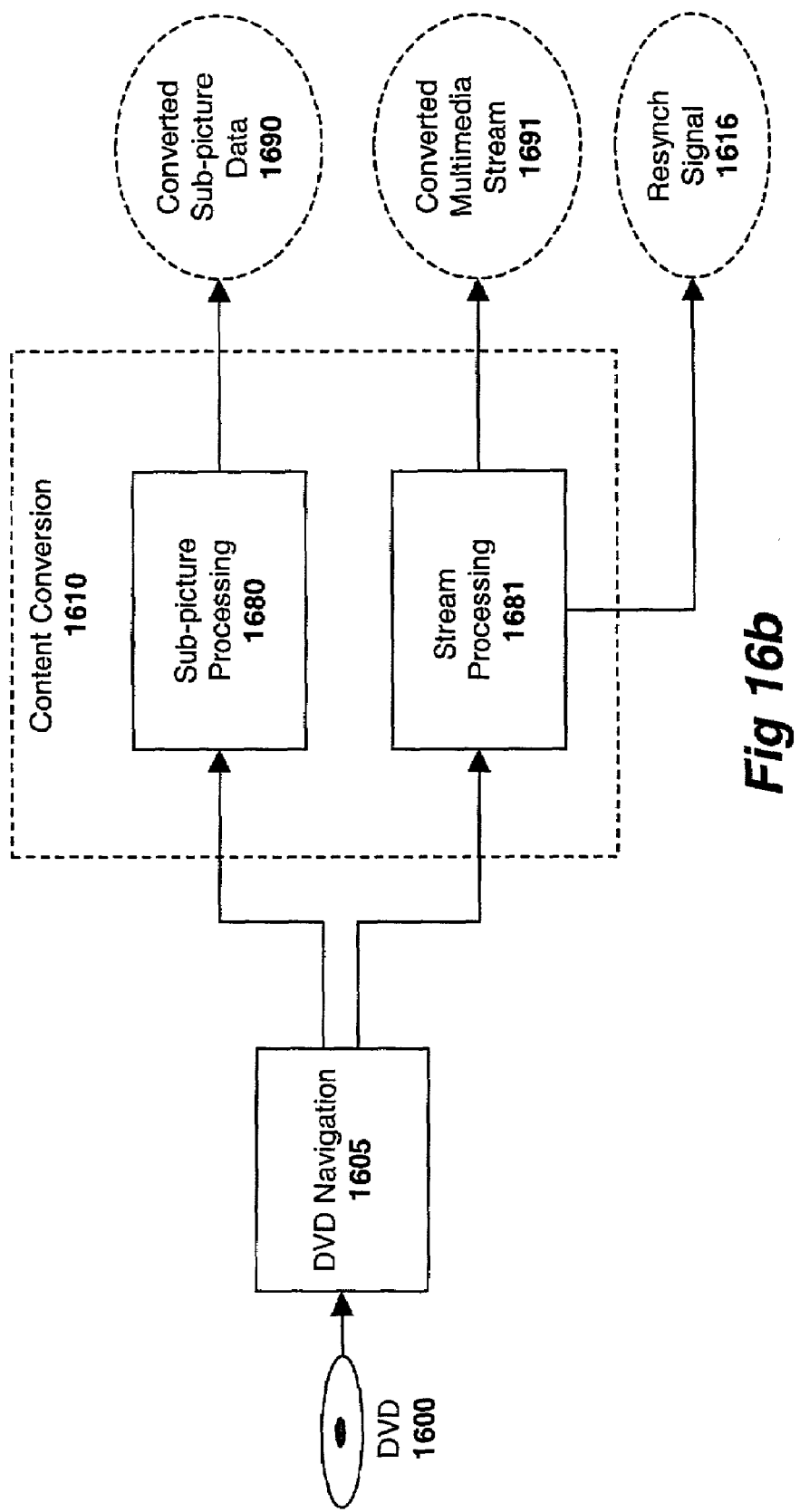
FIG. 16b illustrates a content conversion module according to one embodiment of the invention.

Referring now to FIG. 16b, one embodiment of the content conversion module 1610 is comprised generally of subpicture processing logic 1680 for implementing the subpicture processing techniques described below, and stream processing logic 1681 for implementing the stream conversion techniques described below.

Stream Processing Logic

Figure 16C:
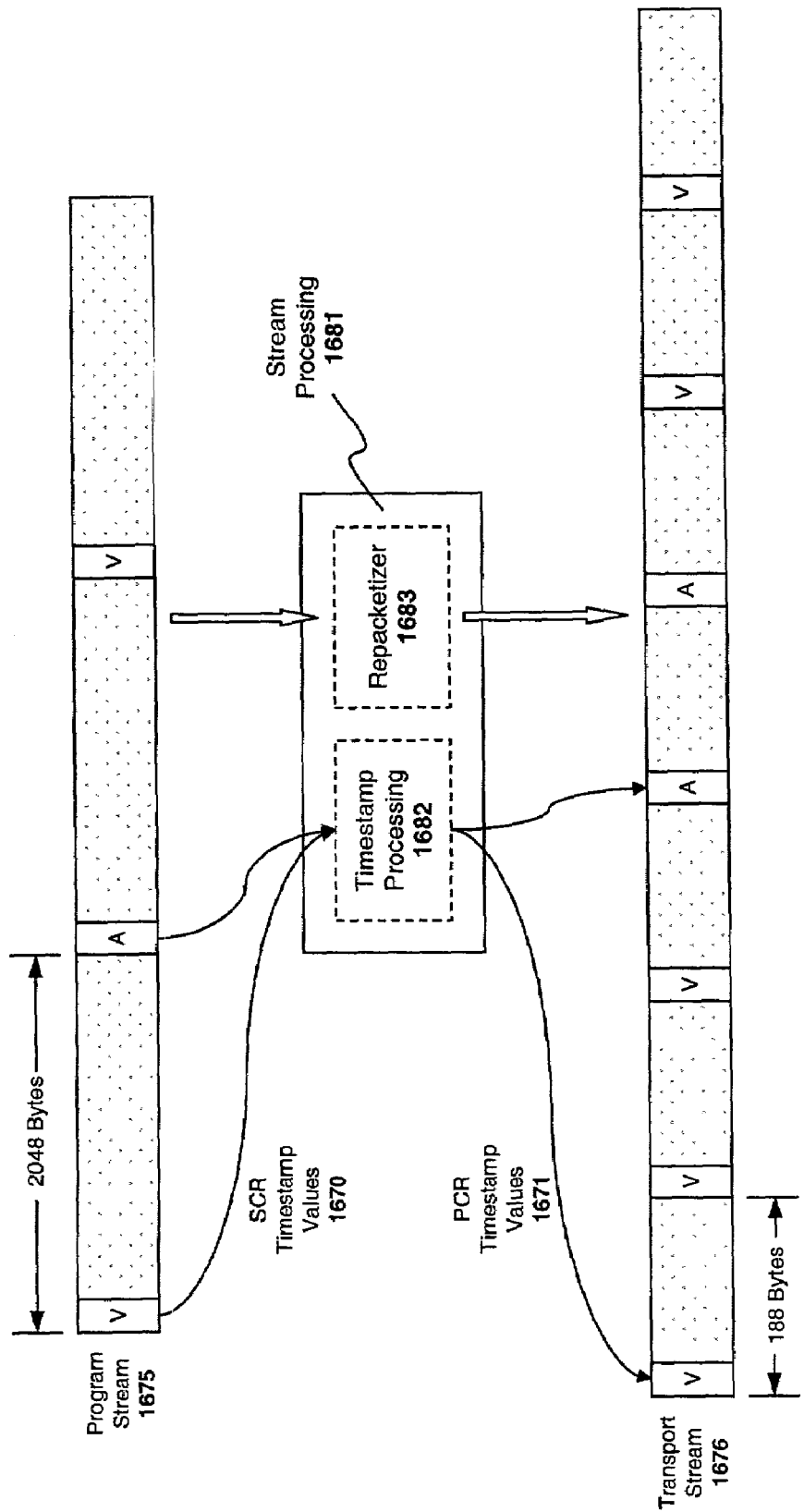
FIG. 16c illustrates timestamp conversion and repacketization logic according to one embodiment of the invention.

As illustrated in FIG. 16c, in one embodiment, the stream processing logic 1681 is comprised of repacketizer logic 1683 for converting program stream packets 1675 provided by the DVD navigation module 1605 into transport stream packets 1676. In addition, in order to provide an accurate program clock reference required by the transport stream decoder 1620, in one embodiment, the stream processing logic 1681 includes timestamp processing logic 1682 for converting the System Clock Reference ("SCR") timestamp values 1670 stored within the program stream headers into Program Clock Reference ("PCR") values 1671.

Figure 16D:
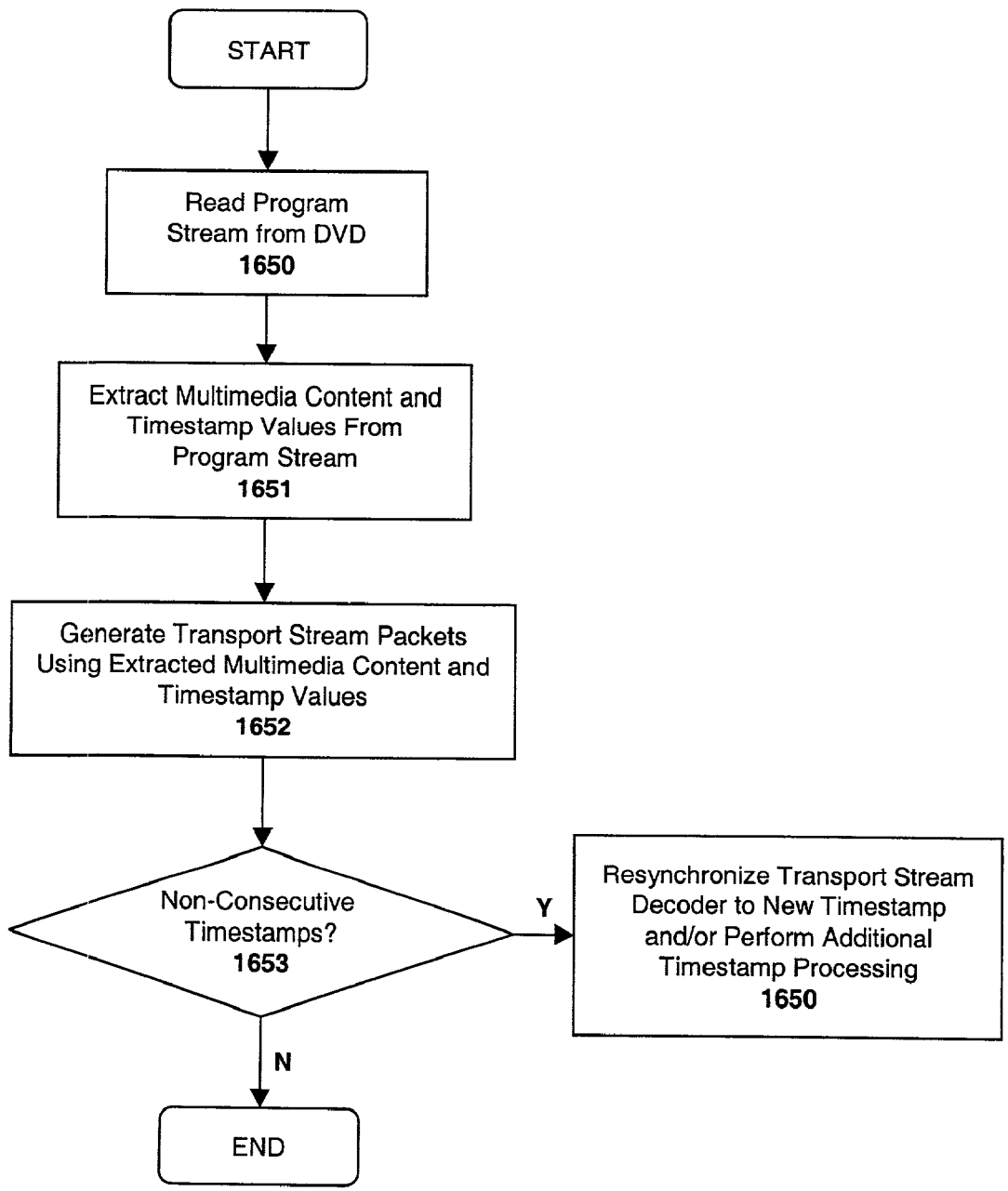
FIG. 16d illustrates a method for converting program stream packets to transport stream packets according to one embodiment of the invention.

FIG. 16d illustrates one particular method implemented by the stream processing logic 1681 and DVD navigation module 1605 to perform the stream conversion. At 1650, the DVD navigation module 1605 extracts the program stream from the DVD based on user selections and/or on the navigation metadata stored on the DVD (e.g., by interpreting the .IFO files as described above). At 1651 the repacketizer logic 1683 depacketizes the program stream by extracting the underlying audio/video content and discarding the program stream headers. In one embodiment, the result of the depacketization process is the Packetized Elementary Stream ("PES") described above. In addition, the timestamp processing logic 1682 extracts the SCR timestamp values from the headers of the program stream packets.

AL 1652, the repacketizer 1683 generates 188-byte transport stream packets using the audio and video content from the PES. In one embodiment, each video transport packet is assigned a first specified packet ID ("PID") value and each audio transport packet is assigned a second specified PID value. The transport stream decoder 1620 uses these preassigned PID values to identify which PID packets contain video and which contain audio. In one embodiment, the audio and video PID values are maintained, regardless of which particular program stream is being read from the DVD.

Interleaved video units consist of two or more video and audio streams of potentially independent timebases broken into chunks and interleaved on the disc as a contiguous stream. In one embodiment, the interleaved pieces are identified through use of DVD metadata (.IFO files and/or navigation pack data) and packets from each logical stream are assigned to a PID value separate from the other stream. In another embodiment, only the video and audio from the currently playing video is repacketized. Switching logical streams results in the new stream being assigned to the PID values in use.

Similarly, the multiple audio and subpicture tracks allowed by a DVD can either be assigned to separate PID values or be filtered in such a way as to repacketize only the active tracks into the active PID values.

In addition, the repacketizer logic 1683 periodically inserts PCR timestamps into the PID packet headers based on the SCR values read from the program stream packets. Both the SCR and PCR timestamp values are 33 bits in length and both have a resolution of 27 MHz. Accordingly, for consecutive SCR values representing sequential portions of the audio/video stream, the conversion process is relatively straightforward: each consecutive SCR timestamp read from the program stream is replaced with a sequential PCR timestamp in the transport stream.

Figure 17:
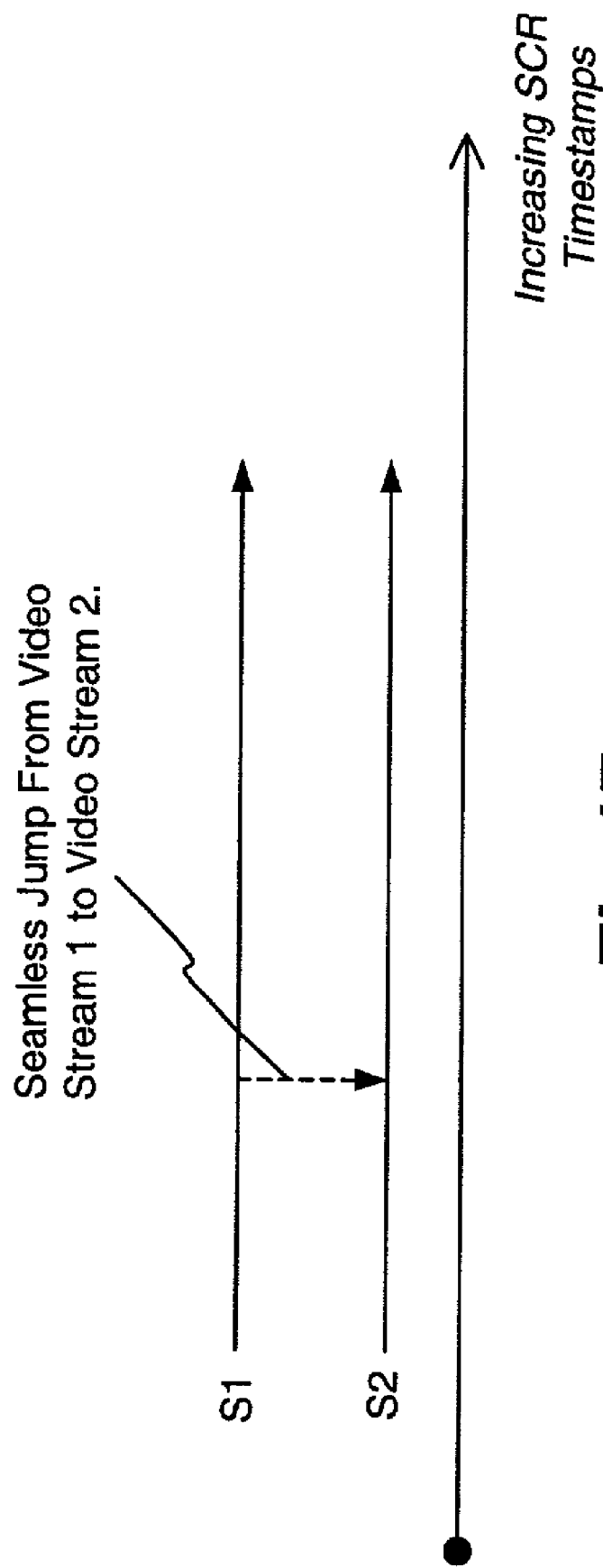
FIG. 17 illustrates seamless angles on a DVD where two video streams share a common time base.
Figure 18:
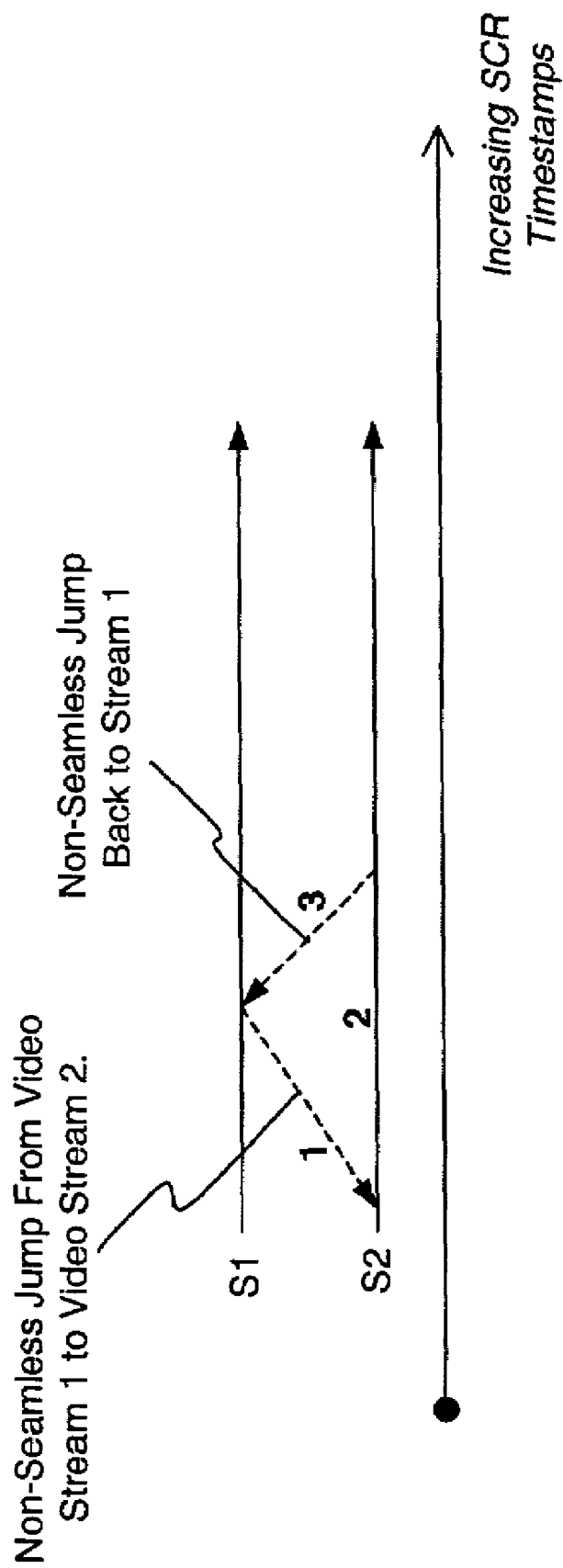
FIG. 18 illustrates non-seamless angles on a DVD where two video streams use unrelated time bases.

In some cases, however (determined at 1653 in FIG. 16d), the SCR values 1670 read from the program stream packets 1675 will not be consecutive. This may occur, for example, if the DVD navigation module 1605 jumps from one particular program stream on the DVD to a different program stream (e.g., in response to user input). FIGS. 17 and 18 graphically illustrate the differences between certain program stream jumps for which timestamps remain consecutive, and jumps for which timestamps become non-consecutive. As indicated in FIG. 17, certain DVDs may be encoded with two or more program streams that progress in parallel, using a common timeline (commonly referred to as "seamless angles"). For example, the two video streams may represent two different perspectives of the same football game or scene from a movie. Because the streams, progress using a common timeline, the SCR timestamps remain consecutive, even when the user jumps from stream S1 to S2 as indicated. Accordingly, the conversion from SCR to PCR values remains relatively straightforward.

By contrast, as illustrated in FIG. 18, certain program streams may not share a common timeline (referred to as "non-seamless angles"). For example, a DVD may be encoded with a primary video stream (e.g., a movie) and one or more secondary streams (e.g., short presentations of how certain scenes of the movie were produced). Because the secondary streams do not necessarily share a common timeline with the primary stream, when the DVD navigation module 1605 jumps from one stream to the next (e.g., from S1 to S2 in FIG. 18), the SCR values may become non-consecutive.

One problem with non-seamless jumps is that the transport stream decoder 1620 may not be capable of properly rendering a stream with non-consecutive timestamps. For example, on a non-seamless jump, the decoder 1620 may stop decoding until it receives a packet with the next consecutive timestamp (which may never arrive). Accordingly, in one embodiment, at 1650, when the stream processing logic 1681 detects a non-consecutive jump in the SCR/PCR timestamps, it will activate the resynchronization signal 1616, directing the transport stream decoder to resynchronize itself to the new PCR timeline. Alternatively, or in addition, in one embodiment, the timestamp processing logic 1682 may simply continue to provide consecutive PCR values to the transport stream decoder notwithstanding the fact that a non-consecutive jump in the SCR values has occurred. As long as a consecutive PCR value is substituted for each SCR value (consecutive or not) the transport stream decoder 1620 will not need to be resynchronized.

Fast Forward and Rewind

Figure 19:
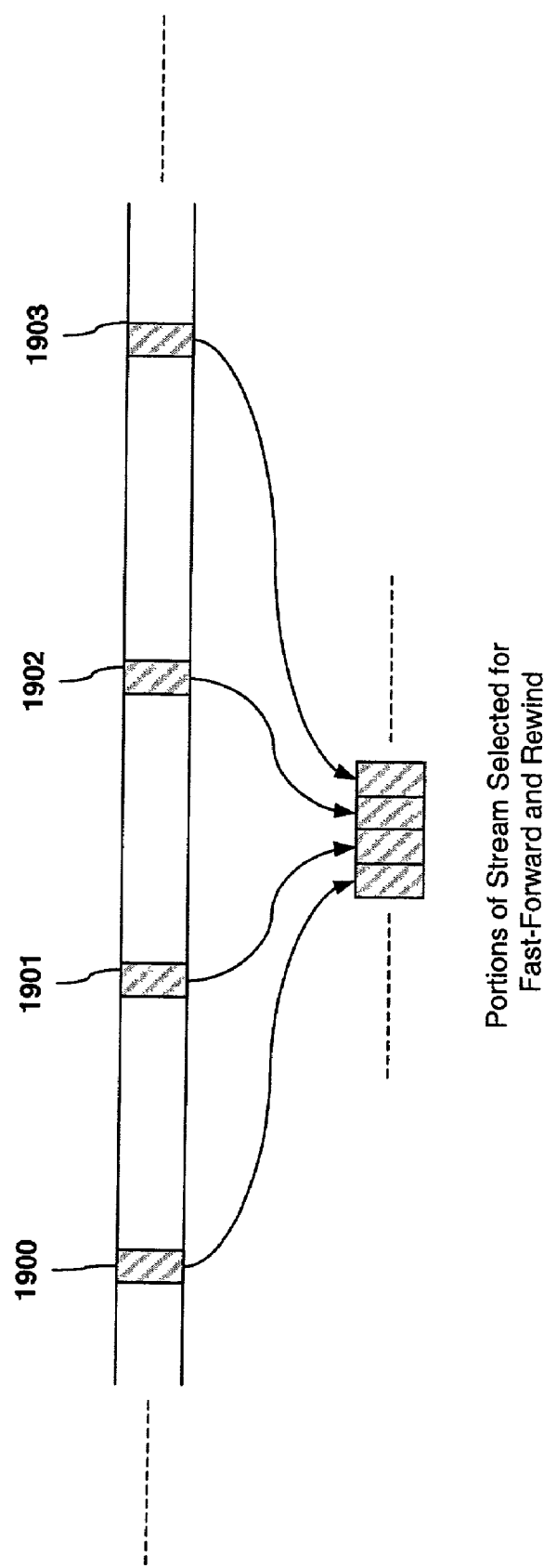
FIG. 19 illustrates fast-forward and rewind techniques employed by one embodiment of a stream processing system.

The DVD navigation module 1605 and/or content conversion module 1610 may employ additional stream processing techniques to execute fast forward and rewind functions. As illustrated in FIG. 19, to fast forward or rewind through content stored on a DVD, the DVD navigation module 1605 reads only certain specified groups of frames 1900–1903 from the DVD, each separated by a particular amount of time. Different levels of fast-forward and rewind are possible (e.g., 2×, 4×, . . . etc), each corresponding to a different amount of time between selected frames 1900–1903 (e.g., the jump between frames for a 4× fast forward would be twice as large as for a 2× fast-forward). The Data Search Information ("DSI") embedded within the navigation pack of a VOBU indicates how far the DVD navigation module 1605 should jump to reach a decodable reference frame for a given fast-forward/rewind rate, and how much audio/video content the DVD navigation module 1605 should process on each jump.

When jumping from frame to frame in this manner, the SCR timestamps 1670 associated with each frame will jump accordingly. As such, in one embodiment of the invention, the content conversion module 1610 will assert the resynchronization signal 1616 on each jump, thereby resynchronizing the transport stream decoder 1620 on each jump as described above. Alternatively, if the transport stream decoder 1620 supports a non-synchronized playback mode (many do), the content conversion module 1610 may simply assert a non-synchronization control signal (not shown), causing the transport stream decoder 1620 to decode the selected frames 1900–1903 without PCR timestamp synchronization. Because fast-forward and rewind functions are not typically executed with audio, synchronization between the audio and video streams is not necessarily required.

Figure 20:
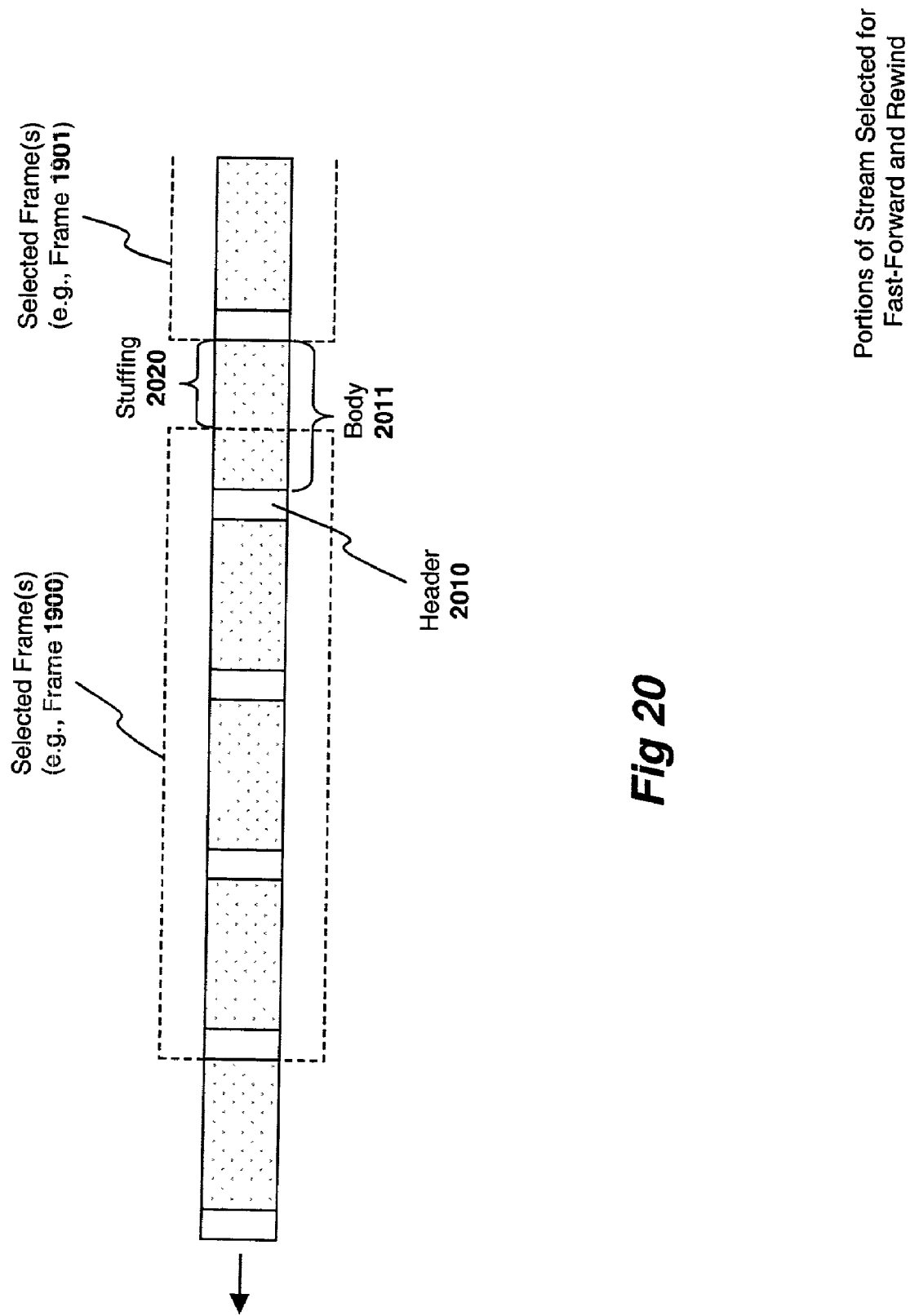
FIG. 20 illustrates a mechanism for performing fast forward and rewind of DVD content on a transport processor.

As illustrated in FIG. 20, it is likely that the boundaries of a picture extracted from a PES stream will not cleanly align to the PES packet boundary. If that succeeding partial picture is fed to the transport stream decoder, the decoder may become confused and output corrupted video. Accordingly, in one embodiment, the repacketizer logic 1683 fills the remainder of the final PID packet body 2011 (i.e., following the selected frames) with stuffing bytes 2020, and modifies both the PES header and the final PID packet header 2010 to indicate where the stuffing bytes 2020 begin. The next frame or group of frames (e.g., 1901) will then start at the beginning of the next packet.

Video Stills

Several video still modes are defined in the DVD specification in which a designated video image is decoded and held on screen for a period of time, both with and without an accompanying audio track (e.g., such as the still image displayed behind the opening DVD menu on many DVD movies). While standard DVD players/decoders are capable of properly rendering these still images along with the background audio content, certain problems may result when using a transport stream decoders.

Figure 21A:
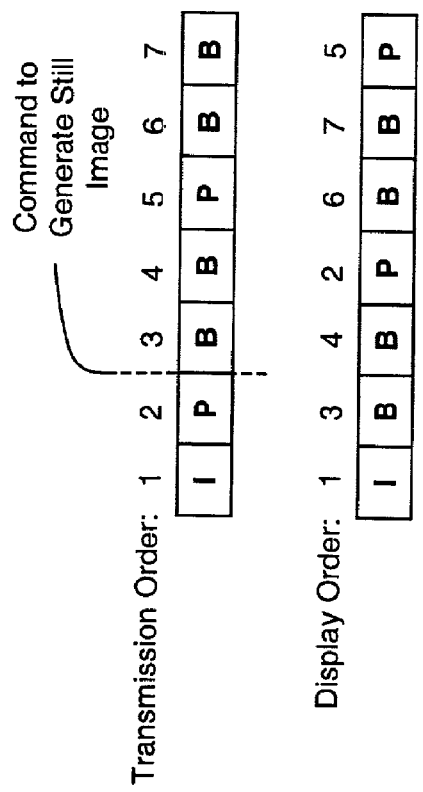
FIGS. 21a–b illustrate issues surrounding displaying still video images using a transport processor.
Figure 21B:
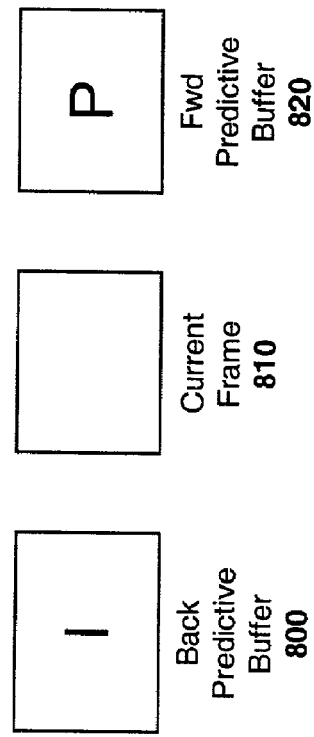

One particular problem and embodiments of a solution will be described with respect to FIGS. 21a and 21b. FIG. 21a shows the order in which a typical sequence of I, B and P frames are read from the DVD and received by the transport stream decoder 1620. As illustrated, the transmission order (e.g., IPBB . . . ) is different from the display order (e.g., IBBP . . . ), due to the manner in which the vector-based B and P frames rely earlier and/or later I or P frames. For example, FIG. 21b illustrates a back-predictive buffer 800, a current frame buffer 810 and a forward predictive buffer 820 employed during the decoding process within the transport stream decoder. The current frame buffer 810 contains the frame currently being rendered on the video display. In the illustrated example, the transport stream decoder 1620 has successfully received the first I frame and the first P frame. To display the first B frame (which will be the next frame displayed in succession following the I frame) the initial I frame and the initial P frame are stored in the back predictive buffer 800 and the forward predictive buffer 820, respectively. Accordingly, if the command to generate the still video image occurs when the buffers are in the state shown in FIG. 21b (i.e., at the point indicated in FIG. 21a), then the current frame buffer will never be filled and no still video image will be displayed. The transport stream decoder may simply continue to wait for the B frame to arrive without displaying a video image.

To solve this problem, one embodiment of the invention "forces" the still image into the current frame buffer 810 and onto the screen by transmitting a series of "null P frames" to the transport stream decoder after a command to display a still video image. Null P frames are P frames in which all motion vectors are equal to zero. As such, the image generated upon receipt of a P frame will be the same as the previously-generated image (e.g., the original I frame shown in FIG. 21b).

In one embodiment, the content conversion module 1610 continues to transmit null P frames in succession to the transport stream decoder 1620 as the still video image is displayed. Alternatively, after forcing the still video image into the current frame buffer 810, the content conversion module 1610 may transmit stuffing bytes within the video stream packets. The determination as to whether to use stuffing bytes may be based on the particular type of transport stream decoder 1620 employed in the system.

Another type of DVD still occurs when one or more consecutive VOBUs contain solely a navigation pack. Since these navigation packs are filtered out of the stream before being fed to the transport decoder, the decoder receives no input and does not pause. In one embodiment, the content conversion module 1610 scans the multimedia stream for this situation and responsively generates a null P frame that is timestamped with the PCR (converted SCR) of the navigation pack that was filtered out of the stream. As some implementations of a transport decoder do not recognize the resulting PCR delta as a still image, another embodiment may force the decoder into a pause mode, use an external timer to mark the calculated duration of the still and unpause the playback engine when the duration has passed. The duration is calculated by subtracting the SCR of the last submitted media packet (audio or video) from the SCR of the first navigation pack following the media-less (no audio or video) VOBU section.

Once the still image is successfully displayed, another problem which may result is that the background audio content extracted from the DVD may begin to accumulate within the transport decoder input buffer. This is due to the fact that the video content provided to the transport stream decoder 1620 (i.e., contained via the null P frames) may only take up a small fraction of the transport stream relative to a standard video signal once the still video image has been generated (null P frames may be on the order of 200 bytes in length). Because the space set aside for the transport decoder input buffer is of a fixed size, the audio may begin to take up a disproportionate share of the input buffer, resulting in large latencies (i.e., several seconds) in data submission, playback and stream control.

In order to prevent this from happening, in one embodiment, the content conversion module 1610 spaces the audio segments out by a predetermined amount using stuffing packets. The stuffing packets are simply discarded by the transport stream decoder 1620. In one embodiment, the number of stuffing packets generated by the content conversion module 1610 is based on the bitrate of the audio content. In one embodiment, the content conversion module 1610 parses the headers of the AC-3 packets contained within the audio stream to determine the approximate audio bitrate (as defined by the DVD specification, AC-3 packet headers include an indirect indication of bitrate through the number_of_frame_headers field).

AC-3 Audio Conversion

Figure 22:
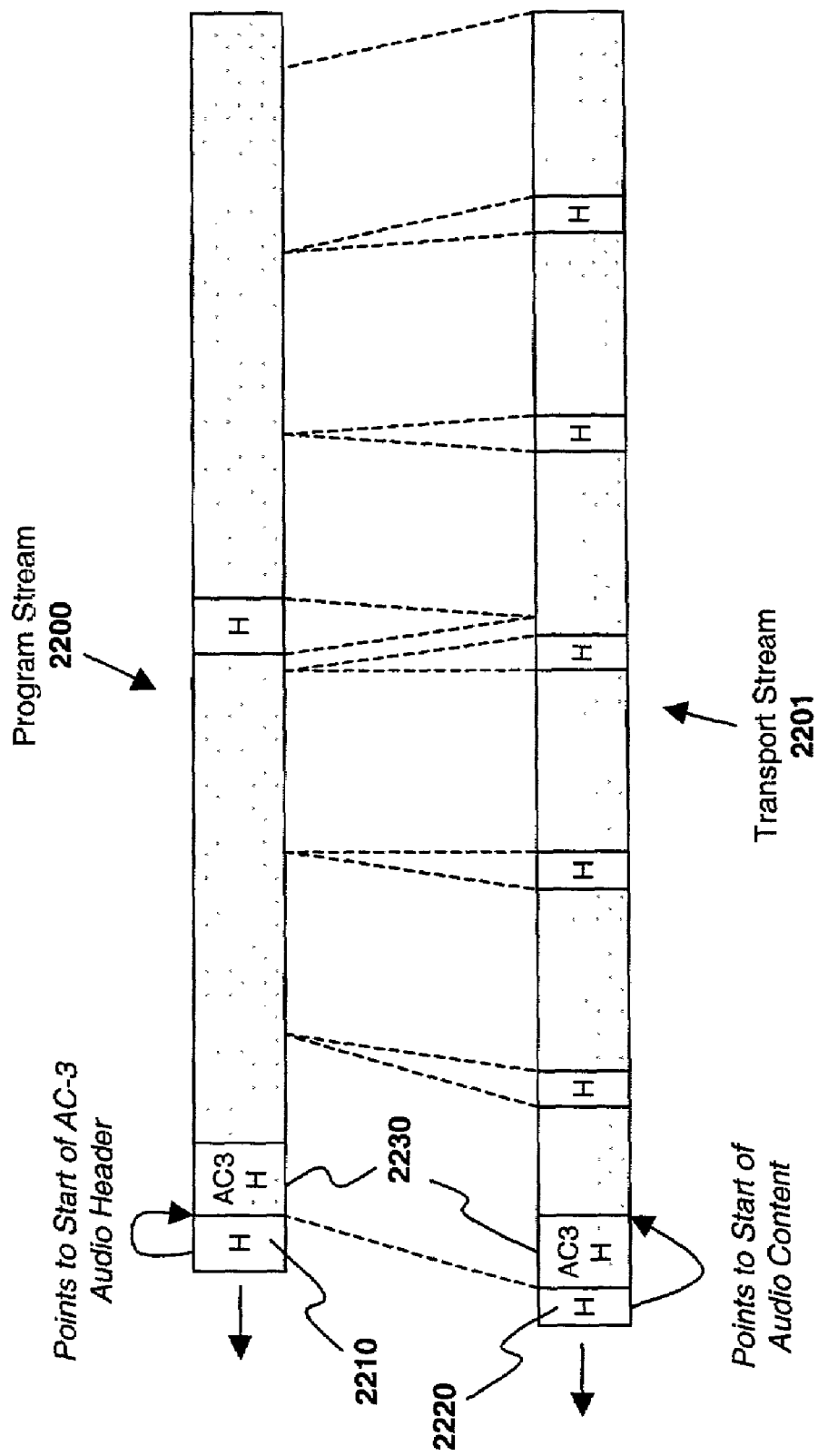
FIG. 22 illustrates one embodiment of the invention for processing AC-3 audio content.

The AC-3 format used for DVDs is slightly different than the AC-3 format processed by transport stream decoders. In particular, as illustrated in FIG. 22, an additional AC-3 header 2230 is employed within the DVD program stream 2200 which a standard DVD player is capable of processing, but which a transport decoder is not. The PES header 2210 contains a field (PES_header_data_length) which points to the beginning of the packet payload. In a DVD stream, the packet payload begins with the additional AC-3 header described 2230. Accordingly, in one embodiment, in order to bypass the AC-3 header information, the content conversion module 1610 modifies the PES_header_data_length field to indicate that the packet payload begins at the start of the actual AC-3 audio content rather than the AC-3 header.

Subpicture Processing

Referring again to FIG. 15, each VOBU 1530 may include subpicture data packets 1543 multiplexed with audio and video program stream packets 1541 and 1542, respectively. Subpictures are graphical images superimposed over the decoded video images. Subpictures are used to provide subtitles and to construct user interface features such as interactive navigation menus. Each subpicture data packet 1543 includes a header, a pixel data block, and a command data block. The header identifies the packet as a subpicture data packet. The pixel data block contains run-length encoded ("RLE") bitmap image data. The command data block identifies the location and size of the subpicture. Additional data contained within the Presentation Control Information (PCI) block of a navigation pack specifies the location and size of highlight areas within the subpicture. Highlight areas are one or more smaller areas within the subpicture that may have unique color and contrast (i.e., alpha blending) values applied. A color lookup table is separately extracted from the .IFO data files and provides a palette of color and alpha values that are legal to use during the valid period of that palette.

Figure 23:
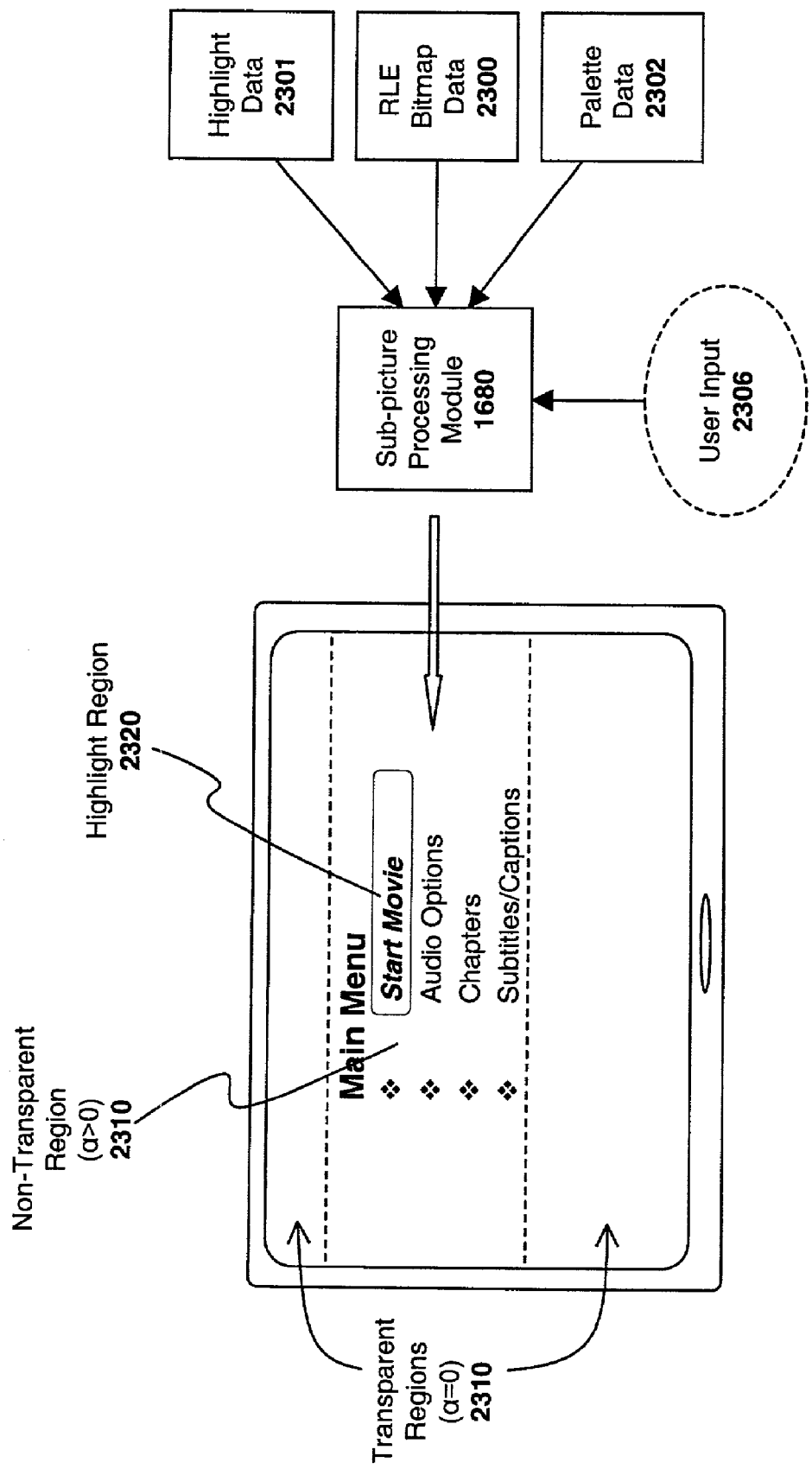
FIG. 23 illustrates subpicture processing according to one embodiment of the invention.

As illustrated in FIG. 23, the subpicture processing module 1680 generates subpicture images by interpreting the RLE bitmap data 2300 in light of color palette data 2302, and highlight data 2301. The color palette data 2302 is provided from the .IFO file(s) and the highlight data 2301 is transmitted as Presentation Control Information ("PCI"). The highlight data 2301 identifies certain regions of the subpicture which should be highlighted (e.g., such as a selected menu item). A different portion of the color palette data 2302 is specified for regions of the subpicture which are highlighted.

An alpha value ($\alpha$), which defines the translucence level, is associated with each pixel in the subpicture. The $\alpha$ values range from completely translucent ($\alpha=0$) to complete opaque ($\alpha=100\%$). The RLE bitmap 2300 may describe all or a portion of a full video screen of alpha-blended graphics, notwithstanding the fact that certain regions of the screen (e.g., regions 2310 in FIG. 23) are completely translucent. Thus, to generate subpicture images, standard subpicture processors redraw the entire video screen without consideration of the level of translucence or whether some or all of the non-translucent pixel data has changed from one picture to the next. Continually redrawing an entire screen of graphical content in this manner wastes a significant amount of memory and CPU processing power.

Accordingly, in one embodiment of the invention, the subpicture processing module 1680 performs an analysis of the various graphical data 2301–2302 provided to it, and only draws regions of the sub-picture which are not translucent (i.e., regions such as region 2310 for which the value $\alpha>0$) or are newly translucent (i.e., has been "erased" from one picture to the next). In addition, once an initial subpicture is drawn, one embodiment of the subpicture processing module 1680 only redraws areas which are subsequently modified (e.g., as a result of motion of the highlight region 2320).

Figure 24:
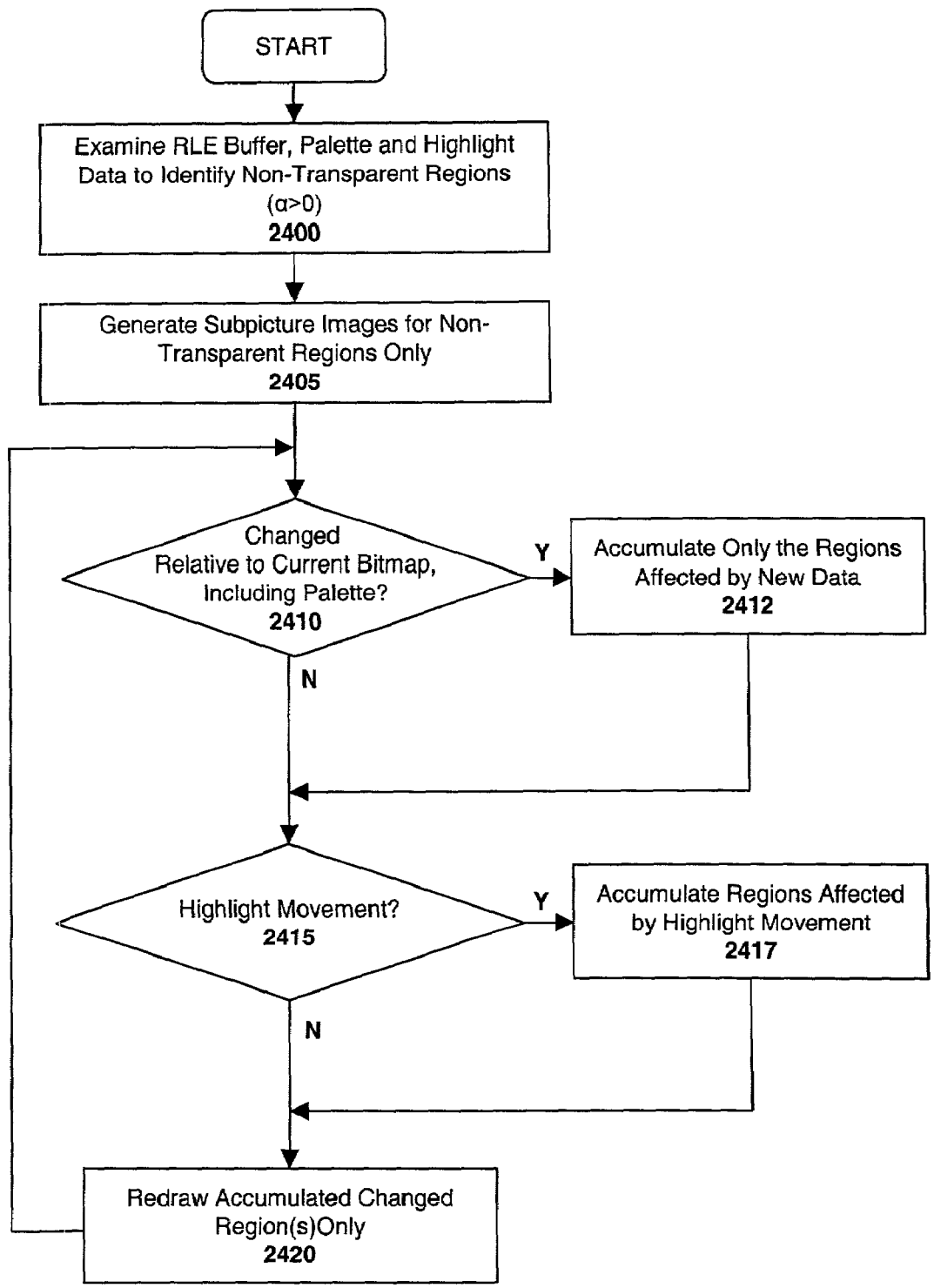
FIG. 24 illustrates a method implemented by a subpicture processor according to one embodiment of the invention.

One embodiment of a method implemented by the subpicture processing module 1680 is outlined in FIG. 24. At 2400, the subpicture processing module 1680 examines the incoming RLE subpicture data in conjunction with the subpicture palette and/or highlight data to identify regions of the screen for which $\alpha=0$. In one embodiment, these regions can be quickly identified based on the existence of an $\alpha=0$ indication in conjunction with a "repeat until end of line" indication (i.e., the "end of line" indicator (fourteen sequential zeros) followed by a palette entry code corresponding to fully transparent alpha; subpictures are defined on a line-by-line basis). This scanning process may be implemented in a highly efficient manner on processor architectures that support hardware-assisted zero run length counting (e.g., as described by the PowerPC cntlzw mnemonic). Another implementation may perform additional processing of subpicture RLE data to more fully constrain the translucent and non-translucent regions.

Once the transparent regions have been identified, the subpicture processing module 1680 filters them out of the subpicture generation process and generates subpicture images for the non-transparent regions only, at 2405, thereby conserving memory and CPU cycles.

At 2410, the subpicture processing module 1680 determines whether the graphical image has changed relative to the current subpicture bitmap. For example, if a user selects a particular menu item, a new menu structure may be displayed further down the menu hierarchy. Similarly, it may be time for the subpicture processing module 1680 to display a new subtitle. In any case, when it is time to generate a new bitmap data, at 2412 the subpicture processing module 1680 identifies and accumulates only those regions of the image affected by the new data.

Figure 25:
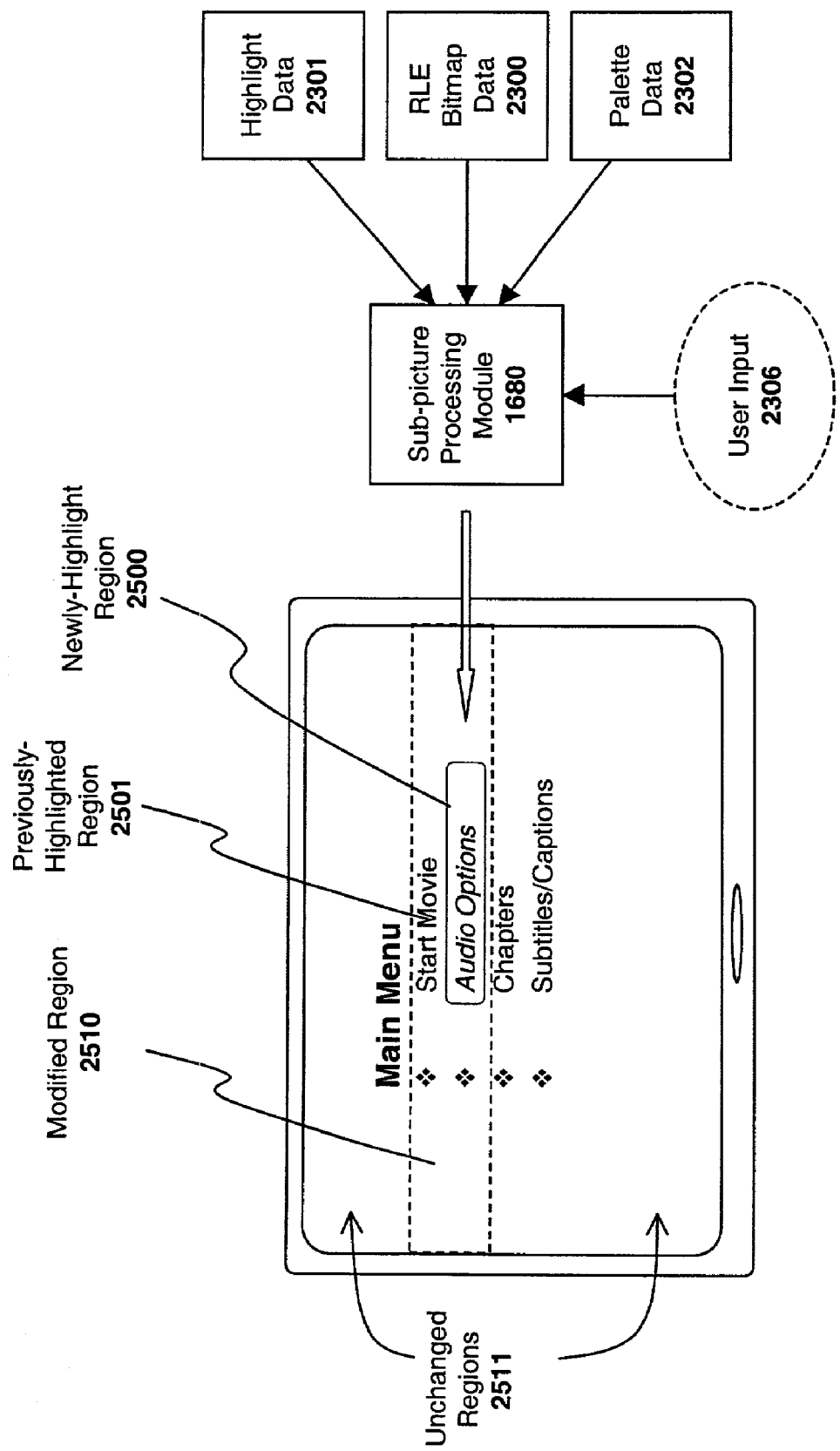
FIG. 25 illustrates subpicture processing according to one embodiment of the invention.

In addition, at 2415, the subpicture processing module 1680 monitors user input to determine whether the highlight region 2320 has been moved. As illustrated in FIG. 25, motion of the highlight region means that the palette data 2302 applied to both the newly-highlighted region 2500 and the previously-highlighted region 2501 will change (i.e., the previously-highlighted region 2501 will use the same portion of the palette data 2302 as the rest of the subpicture and the newly-highlighted region 2500 will use the portion of the palette data 2302 designated for highlighting). Rather than redrawing the entire non-translucent region, however, at 2417, the subpicture processing module 1680 accumulates only those regions affected by the highlight movement (i.e., on a line-by-line basis). That is, only that portion of the subpicture which is either now within the highlight rectangle (e.g., region 2500) or has just come out from a highlight rectangle (e.g., region 2501). Finally, at 2420, the subpicture processing module 1680 only redraws the changed regions accumulated at 2412 and 2417, thereby conserving memory and CPU cycles.

It should be noted that throughout the foregoing description, well-known structures and devices have been shown in block diagram form to avoid obscuring the underlying principles of the invention. For example, the mechanical and optical hardware required to read the content from a DVD is well known in the art and, accordingly, is not illustrated or described above (e.g., with respect to the DVD navigation module 1605). Similarly, the hardware required to superimpose a graphical subpicture image over a video image it is well understood by those of ordinary skill in the art and, therefore, is not illustrated or described. Various other unnecessary details have been omitted to avoid obscuring the principles of the invention.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the stream conversion techniques described above focus on converting DVD program streams to transport streams, the underlying principles may be implemented using a variety of alternate program stream sources. Similarly, while described above in the context of a "Media Server," the underlying principles of the invention may be implemented on any system configured with a transport processor and a DVD reader. Accordingly, the scope and spirit of the invention should be judged in terms of the claims which follow.

What is claimed is:

1. A method for converting a program stream to a transport stream comprising:
    reading program stream packets from a digital versatile disk ("DVD") based on user selections and navigation metadata contained on said DVD;
    extracting audio and video content packetized within said program stream packets;
    reading system clock reference ("SCR") timestamps from said program stream packets, said SCR timestamps Indicating relative times at which said audio and video should be rendered;
    determining a point within consecutively read program stream packets at which said SCR timestamps are non-consecutive;
    converting said SCR timestamps to program clock reference ("PCR") timestamps interpretable by a transport stream decoder;
    generating a transport stream of transport stream packets containing said audio and video content and using said PCR timestamps to provide for decode timing at said transport stream decoder; and
    generating a resynchronization signal causing said transport stream decoder to resynchronize with said transport stream when it receives corresponding non-consecutive PCR timestamps associated with said nonconsecutive SCR timestamps.

2. The method as in claim 1 further comprising:
    decoding said transport stream with said transport stream decoder.

3. The method as in claim 2 wherein said transport stream decoder is further configured to decode transport streams from one or more alternate transport stream sources.

4. The method as in claim 3 wherein one of said alternate transport stream sources is a cable or satellite channel.

5. The method as in claim 1 wherein said point within consecutively read program stream packets at which said SCR timestamps are non-consecutive comprises a non-seamless jump from a first program stream to a second program stream.

6. The method as in claim 1 further comprising
    determining that said audio content comprises AC-3 packets having an AC-3 data and an AC-3 headers; and
    generating audio transport packets with pointers that point to said AC-3 data rather than said AC-3 headers.

7. The method as in claim 1 wherein generating said transport stream further comprises:
    assigning all transport stream packets containing audio content a first packet identification ("PID") value; and
    assigning all transport stream packets containing video content a second PID value.

8. The method as in claim 7 further comprising:
    maintaining said first and second PID values for said audio and video content, respectively, notwithstanding the fact that said audio content and said video content may be read from different and/or unrelated program streams.

9. A system comprising:
    a DVD navigation module to read program stream packets from a digital versatile disk ("DVD") based on user inputs and navigation metadata contained on said DVD;
    a repacketizer module to extract audio and video content packetized within said program stream packets;
    a timestamp processing module to read system clock reference ("SCR") timestamps from said program stream packets, said SCR timestamps indicating relative times at which said audio and video should be rendered, wherein at least some of said SCR timestamps are non-consecutive, said timestamp processing module to further convert said SCR timestamps to program clock reference ("PCR") timestamps interpretable by a transport stream decoder;
    wherein said repacketizer module generates a transport stream of transport stream packets containing said audio and video content and using said PCR values to provide for decode timing at said transport stream decoder; and wherein said timestamp processing module generates a resynchronization signal causing said transport stream decoder to resynchronize with said transport stream when it receives non-consecutive PCR timestamps associated with said non-consecutive SCR timestamps.

10. The system as in claim 9 wherein said transport stream decoder is further configured to decode transport streams from one or more alternate transport stream sources.

11. The system as in claim 10 wherein one of said alternate transport stream sources is a cable or satellite channel.

12. The system as in claim 9 wherein said point within consecutively read program stream packets at which said SCR timestamps are non-consecutive comprises a non-seamless jump from a first program stream to a second program stream.

13. The system as in claim 9 wherein said repacketizer determines that said audio content comprises AC-3 packets having an AC-3 data and an AC-3 headers, and responsively generates audio transport packets with pointers that point to said AC-3 data rather than said AC-3 headers.

14. A method for converting a program stream to a transport stream decodable by a transport stream decoder comprising:
- reading program stream packets from a digital versatile disk ("DVD") based on user selections and navigation metadata contained on said DVD;
- extracting audio and video content packetized within said program stream packets;
- reading system clock reference ("SCR") timestamps from said program stream packets, said SCR timestamps indicating relative times at which said audio and video should be rendered;
- determining a point within consecutively read program stream packets at which said SCR timestamps are non-consecutive;
- generating consecutive PCR timestamps corresponding to said non-consecutive SCR timestamps at said point within consecutively read program stream packets at which said SCR timestamps are non-consecutive; and
- generating a transport stream of transport stream packets containing said audio and video content and using said PCR timestamps to provide for decode timing at said transport stream decoder.

15. The method as in claim 14 wherein said transport stream decoder is further configured to decode transport streams from one or more alternate transport stream sources.

16. The method as In claim 15 wherein one of said alternate transport stream sources is a cable or satellite channel.

* * * * *